US011011919B2

(12) United States Patent
Velderman et al.

(10) Patent No.: US 11,011,919 B2
(45) Date of Patent: May 18, 2021

(54) BATTERY CARRIER SYSTEM

(71) Applicant: Black & Decker Inc., New Britain, CT (US)

(72) Inventors: Matthew J. Velderman, Baltimore, MD (US); Daniel J. White, Baltimore, MD (US); Andrew E. Seman, Pylesville, MD (US); David A. Miller, Baltimore, MD (US); Nathan J. Cruise, Phoenix, MD (US); Geoffrey S. Howard, Columbia, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 16/250,857

(22) Filed: Jan. 17, 2019

(65) Prior Publication Data

US 2019/0157881 A1    May 23, 2019

Related U.S. Application Data

(62) Division of application No. 14/869,297, filed on Sep. 29, 2015, now abandoned.
(Continued)

(51) Int. Cl.
*H02J 7/00* (2006.01)
*G07F 7/06* (2006.01)
*G07F 15/00* (2006.01)

(52) U.S. Cl.
CPC .............. *H02J 7/0027* (2013.01); *G07F 7/06* (2013.01); *G07F 15/006* (2013.01); *H02J 7/00* (2013.01);
(Continued)

(58) Field of Classification Search
CPC ......... H02J 7/0027; H02J 2207/40; H02J 7/00
(Continued)

(56) References Cited

U.S. PATENT DOCUMENTS 6,104,162 A    8/2000  Sainsbury et al.
6,211,652 B1   4/2001  Glasgow
(Continued)

OTHER PUBLICATIONS

Provisional U.S. Appl. No. 61/944,819; titled "Portable Power Supply and Battery Charger." Publicly available when U.S. Patent Application Pub. No. 2015/0171632 A1 was published on Jun. 18, 2015 and again made publicly available when U.S. Pat. No. 10,044,197 issued on Aug. 7, 2018.†

*Primary Examiner* — Richard V Muralidar
(74) *Attorney, Agent, or Firm* — Michael Aronoff

(57) ABSTRACT

A system including a carrier having a plurality of receptacles configured to receive rechargeable, removable battery packs, an AC power input connector for connecting to an AC power supply, a power output connector, a discharge/charge mode switch for switching between (1) a charging mode of operation that charges the battery packs using electrical power input through at least one of the power input connectors and (2) a discharging mode of operation that outputs electrical power from the battery packs through the power output connector, the charge/discharge control module controlling a plurality of charging switches to provide a charging current to the battery packs and an inverter electrically connected to the power output connector for providing an AC output signal at the power output connector.

13 Claims, 70 Drawing Sheets

Related U.S. Application Data

(60) Provisional application No. 62/060,305, filed on Oct. 6, 2014.

(52) U.S. Cl.
 CPC ............ *H02J 7/007* (2013.01); *H02J 7/0045* (2013.01); *H02J 7/00045* (2020.01); *H02J 2207/40* (2020.01)

(58) Field of Classification Search
 USPC .......................................... 320/107, 115, 113
 See application file for complete search history.

(56) References Cited

U.S. PATENT DOCUMENTS

| | | |
|---|---|---|
| 6,528,970 B1 | 3/2003 | Liu et al. |
| 8,203,307 B2 † | 6/2012 | Zick |
| 10,044,197 B2 † | 8/2018 | Fry |
| 10,389,139 B2 † | 8/2019 | Velderman |
| 2008/0036420 A1* | 2/2008 | Zeiler .................. H02J 7/0027 320/107 |
| 2008/0116748 A1 | 5/2008 | Yeh |
| 2016/0233810 A1* | 8/2016 | Williams .............. H02J 7/0027 |

\* cited by examiner
† cited by third party

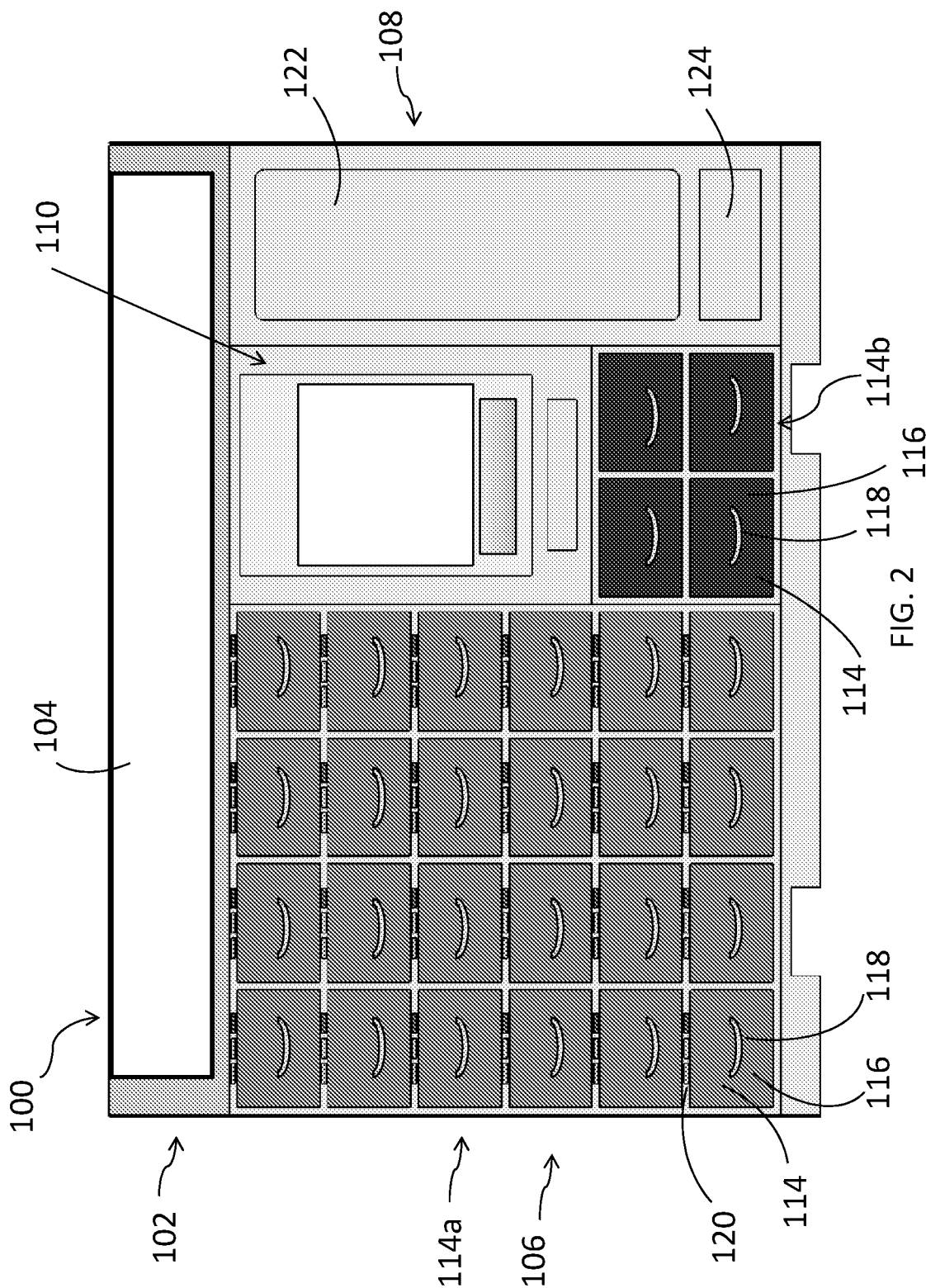

Select Packs for Rental

| Items | Quantity |
|---|---|
| 100% 6 Packs ($10) | |
| 80% 6 Packs ($8) | |
| 60% 6 Packs ($6) | |
| Individual Packs ($2) | |
| Subtotal | |
| Tax | |
| Total | |

[Next]

[Home]

Enter Quantity to Return

Items Rented     Quantity Rented     Quantity To Return

6 Packs

Individual Packs

Next

Back

FIG. 12B

Identify Any Battery Packs As Damaged or Underperforming

| Serial Numbers | Damaged | Underperforming |
|---|---|---|
| 524268-5632 | ☐ | ☐ |
| 524268-5633 | ▨ | ☐ |
| 524268-5634 | ☐ | ▨ |
| 524268-5635 | ☐ | ☐ |
| 524268-5636 | ☐ | ☐ |
| 524268-5637 | ☐ | ☐ |

[Back]  [Next]

Review Terms and Conditions

Important!
- Battery packs are rented by the day.

- Exchange your rented battery packs as many times as you'd like within the day...for *FREE!*

- Packs returned later than 11PM will be charged for the next day's rental.

- Battery packs will deactivate after 3 days
  - The deactivation light will turn on
  - Return the packs to a kiosk -OR-
  - Renew the packs with the phone app

Deactivated after 3 days

Total

Back    I Agree – Proceed to Checkout

Select Items to Purchase

| Items | Price | Quantity |
|---|---|---|
| String Trimmer Line, 200 ft | $6 | |
| Automotive Charger Cord | $15 | |
| 7-Pin Trailer Charger Cord | $20 | |
| Recip Saw Blades, 5 pack | $5 | |
| 4.5" Cutting Wheels, 5 pack | $6 | |
| Impact Driver Bits, 30 pack | $10 | |
| Subtotal | | |
| Tax | | |
| Total | | |

Back  Next

FIG. 15B

Review Cart

| Items | Price | Quantity |
|---|---|---|
| String Trimmer Line, 200 ft | $6 | |
| Automotive Charger Cord | $15 | |
| 7-Pin Trailer Charger Cord | $20 | |
| Recip Saw Blades, 5 pack | $5 | |
| 4.5" Cutting Wheels, 5 pack | $6 | |
| Impact Driver Bits, 30 pack | $10 | |
| | Subtotal | |
| | Tax | |
| | Total | |

Back     Next

FIG. 15C

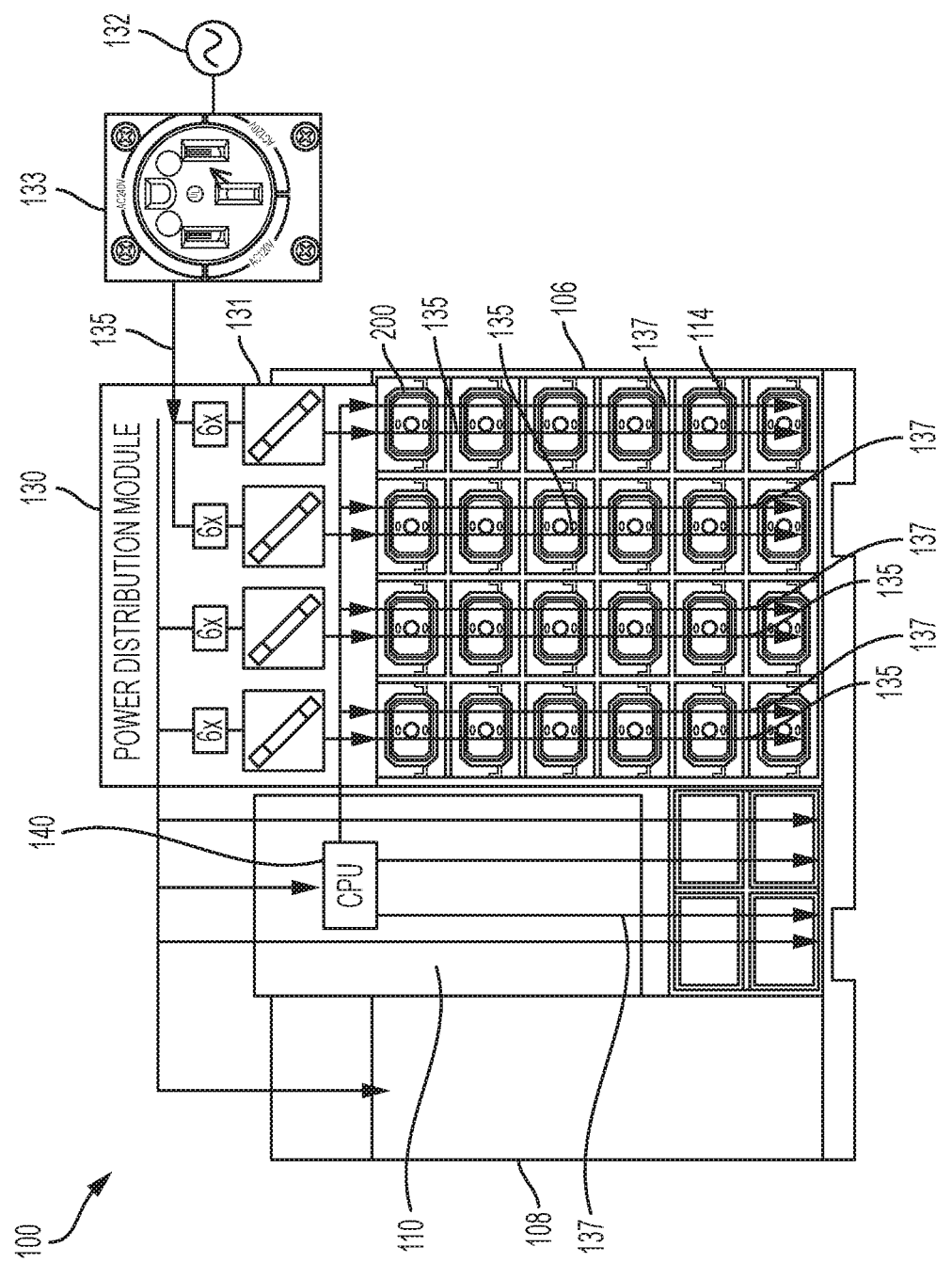

BATTERY CARRIER SYSTEM

RELATED APPLICATIONS

This application is a divisional of U.S. patent application Ser. No. 14/869,297, filed Sep. 29, 2015, which claims priority under 35 U.S.C. § 119(e) to U.S. Provisional Patent Application No. 62/060,305, filed Oct. 6, 2014, titled "System and Method for Renting, Charging, and Discharging Battery Packs," which is incorporated by reference. This application also incorporates by reference U.S. patent application Ser. No. 12/917,128, filed Nov. 1, 2010, titled "Portable Alternating Current Inverter Having Reduced Impedance Losses," U.S. patent application Ser. No. 12/037,290, filed Feb. 28, 2008, titled "Portable Power Supply," and U.S. Provisional Patent Application No. 60/891,540, filed Feb. 26, 2007.

TECHNICAL FIELD

This application relates to a system and method for renting, transporting, charging, and discharging battery packs, e.g., for power tools or other electrical devices. In one implementation, the system includes a kiosk for renting, dispensing and receiving battery packs and a carrier for transporting, charging and discharging the battery packs, e.g., for power tools and other electrical devices.

BACKGROUND

Various types of electric power tools are commonly used in construction, home improvement, outdoor, and do-it-yourself projects. Conventional power tools generally fall into two categories—corded tools that are powered by an AC power source, e.g., an AC mains line, and cordless tools that are powered by one or more DC power sources, e.g., a rechargeable battery.

Corded power tools generally are used for heavy duty applications that require high power and/or long runtimes, such as heavy duty sawing, heavy duty drilling and hammering, and heavy duty metal working. However, as their name implies, corded tools require the use of a cord that can be plugged into an AC power outlet. In many applications, such as on construction sites, it is not convenient or practical to find an AC power outlet and/or AC power must be generated by a generator, e.g. gas powered generator.

Cordless power tools generally are used for lighter duty applications that require low or medium power and/or short runtimes, such as light duty sawing, light duty drilling, and fastening. As cordless tools tend to be more limited in their power and/or runtime, they have not generally been accepted by the industry for all applications. They are also limited by weight since the higher capacity batteries tend to have greater weight, creating an ergonomic disadvantage.

Generally, conventional power tool battery packs may not be able to run conventional corded power tools or other corded electrical devices, while untransformed AC power may not be able to be used to run cordless power tools. Further, the battery packs for cordless power tools may require frequent recharging, may be expensive to purchase, and may be cumbersome to manage on a large construction site.

SUMMARY

An aspect of the present invention includes a vending system comprising a plurality of battery pack carriers, each of the carriers including a battery charging circuit and a receptacle for receiving a battery pack; and a kiosk comprising (1) a storage unit configured to receive, dispense, and store the plurality of battery pack carriers, (2) a power distribution module configured to deliver power to the battery pack carriers, and (2) a controller that is configured to control dispensing of the carriers and supplying charging power to the carriers, wherein each of the carriers is configured to be alternatively powered by the power distribution module when the carrier is inside the kiosk or by an external power source when the carrier is outside the kiosk to enable the carrier charging circuit to charge a battery pack that is received in the receptacle. The receptacle may comprise a plurality of receptacles and each of the plurality of receptacles may receive a battery pack.

Another aspect of the present invention includes a vending system comprising a plurality of battery packs; a plurality of battery pack carriers, each of the carriers including a battery charging circuit and a receptacle for receiving one or more of the plurality of battery packs; and a kiosk comprising (1) a storage unit configured to receive, dispense, and store the plurality of battery pack carriers, (2) a power distribution module configured to deliver power to the battery pack carriers, and (3) a controller that is configured to control dispensing of the carriers and the battery packs from the kiosk and supplying charging power to the carriers, wherein each of the carriers is configured to be alternatively powered by the power distribution module when the carrier is inside the kiosk or by an external power source when the carrier is outside the kiosk to enable the carrier charging circuit to charge the battery pack that is received in the receptacle. The receptacle may comprise a plurality of receptacles and each of the plurality of receptacles may receive a battery pack.

Another aspect of the present invention includes a vending system comprising a power tool; a plurality of battery packs configured to supply power to the power tool; a plurality of battery pack carriers, each carrier including a battery charging circuit and a receptacle for receiving one or more of the plurality of battery packs; and a kiosk comprising (1) a storage unit configured to receive, dispense, and store the plurality of battery pack carriers, (2) a power distribution module configured to deliver power to the battery pack carriers, and (3) a controller that is configured to control dispensing of the carriers and the battery packs from the kiosk and supplying charging power to the carriers, wherein each of the carriers is configured to be alternatively powered by the power distribution module when the carrier is inside the kiosk or by an external power source when the carrier is outside the kiosk to enable the carrier charging circuit to charge the battery pack that is received in the receptacle. The receptacle may comprise a plurality of receptacles and each of the plurality of receptacles may receive a battery pack.

The foregoing exemplary embodiments of the present invention may also comprise circuitry configured to monitor the battery packs in the carriers and to control activation of the carrier charging circuits. The foregoing exemplary embodiments of the present invention may also comprise a communications module configured to facilitate communication between the kiosk and an external computing device. The communications module may be configured to receive signals corresponding to a user's battery pack carrier order to be vended via the external computing device. The communications module may be configured to send signals corresponding to parameters of the battery packs stored in the battery pack storage unit. The kiosk may also comprise a retail vending module configured to dispense merchandise for sale to a user. The kiosk may also comprise a user interface configured to receive a user's battery pack carrier order to be vended. The user interface may comprise a payment processing system. The storage unit may also comprise a plurality of bins, each of the plurality of bines configured to receive one or more carriers. The kiosk may also comprise a display configured to communicate a charge status of the carriers and/or battery packs in the bins.

Each of the bins may include a power connector and the carrier may include a power input connector, wherein the bin power connector is configured to be coupled to the carrier power input connector. Each of the bins may include a communications connector and the carrier may include a communications connector, wherein the bin communications connector is configured to be coupled to the carrier communications connector. The power distribution module may include an input line configured to be connected to an external source of electrical power and a distribution subsystem configured to distribute the electrical power to the carriers that are received in the storage unit.

The controller may control dispensing of the carriers from the kiosk by enabling rental of the carriers and battery packs from the kiosk. The vending system may comprise a central server in electronic communication with the kiosk. The central server may be configured to communicate with a plurality of the kiosks at different geographical locations. The central server may be configured to receive remote user inputs of orders for battery packs and carriers. The central server may be configured to receive the remote user inputs via a telecommunications connection with a remote electronic computing device. The central server may be configured to communicate an order to a kiosk via a telecommunications network.

The carrier power input connector may be configured to receive an input of electrical power for charging a battery pack received in the receptacle. The power input connector may comprise one or more of an AC power input connector and a DC power input connector. The carrier communications connector may be configured to send and/or receive communications with the bin through the communications connectors. The carrier may comprise a power output connector configured to deliver output power from a battery pack received in the receptacle. The power output connector may comprise a DC output connector. The power output connector may comprise an AC output connector.

The carrier may also comprise an inverter circuit configured to convert a DC power output from a battery pack or a plurality of battery packs to an AC power output at the carrier power output connector. The carrier may be configured such that the battery pack(s) generate a DC voltage having a magnitude greater than or equal to a desired AC voltage at the carrier power output connector.

The kiosk may include a processing unit that is configured to prioritize charging of the battery packs in the carriers received in the kiosk based upon at least one parameter of the kiosk, the carrier and/or the battery packs received in the carriers. The at least one parameter may comprise at least one of available charging power in the kiosk, cost of available charging power in the kiosk, state of charge of the battery packs received in the carriers, conditions of the battery packs received in the carriers, and reservation schedules for the carriers.

The carriers and/or battery packs may be configured to power one or more power tools. The battery pack(s) can be configured to operate at a first rated voltage and a second rated voltage, the second rated voltage being different than the first rated voltage.

Another aspect of the present invention includes a vending system comprising a kiosk; a battery pack storage unit in the kiosk configured to receive and store a plurality of battery packs; a battery charger in the kiosk configured to charge one or more of the plurality of battery packs; a power distribution module in the kiosk configured to deliver power to the battery pack charger unit; a controller in the kiosk configured to control vending of the battery packs from the battery pack storage unit; and a processing unit in the kiosk that is configured to prioritize charging of battery packs in the battery pack storage unit based upon at least one parameter of the kiosk and the battery packs received in battery pack storage unit.

Another aspect of the present invention includes a vending system comprising a plurality of battery pack carriers, each of the plurality of carriers includes a battery charging circuit and a receptacle, the receptacle configured for receiving a battery pack; and a kiosk comprising a storage unit that is configured to receive and store the plurality of battery pack carriers, a power distribution module that is configured to deliver power to the battery pack carriers, a controller that is configured to control dispensing of the carriers and battery packs from the kiosk, and a processing unit in the kiosk that is configured to prioritize charging of the battery packs in the battery pack storage unit based upon at least one parameter of the kiosk, the carriers, and the battery packs received in the carriers. The receptacle may comprise a plurality of receptacles and each of the plurality of receptacles may receive a battery pack.

Another aspect of the present invention includes a vending system comprising a plurality of battery packs; a plurality of battery pack carriers, each of the plurality of carriers including a battery charging circuit and a receptacle, the receptacle configured for receiving one or more of the plurality of battery packs; and a kiosk comprising a storage unit that is configured to receive and store the plurality of battery pack carriers, a power distribution module that is configured to deliver power to the battery pack carriers, a controller that is configured to control dispensing of the carriers and battery packs from the kiosk, and a processor unit in the kiosk that is configured to prioritize charging of the battery packs in the battery pack storage unit based upon at least one parameter of the kiosk, the carriers, and the battery packs received in the carriers.

In the foregoing exemplary embodiments of the present invention the at least one parameter may comprise at least one of available charging power in the kiosk, cost of available charging power in the kiosk, state of charge of the battery packs received in the carriers, conditions of the battery packs received in the carriers, and reservation schedules for the carriers.

Another aspect of the present invention includes a vending system comprising a plurality of battery packs; and a kiosk comprising a storage unit that is configured to receive, dispense, and store the plurality of battery packs, a power distribution module that is configured to deliver power to the battery pack carriers, a controller that is configured to control dispensing of carriers and battery packs from the kiosk, and a processor unit in the kiosk that is configured to prioritize charging of the battery packs in the battery pack storage unit; and a user interface configured to allow a user to select a battery pack for rental from among the plurality of stored battery packs based upon user input of a battery pack parameter, wherein prices for the battery packs are set based upon the battery pack parameter.

In the foregoing aspect of the present invention the battery pack parameter may comprise at least one of a state of charge of the battery pack, a condition of the battery pack, and a rated voltage of the battery pack. The battery pack parameter may comprise a state of charge of the battery pack, wherein the prices are set higher for battery packs having a higher state of charge. The battery pack parameter may comprise a condition of the battery pack, wherein the prices are set higher for battery packs having a better condition. The battery pack parameter may comprise a rated voltage of the battery pack, wherein the prices are set higher for battery packs having a higher rated voltage.

Another aspect of the present invention includes a method comprising storing, in a kiosk, a plurality of battery pack carriers, each of the plurality of battery pack carriers including a receptacle for receiving a battery pack and a charging circuit that enables charging of the battery pack via a power source in the kiosk when the carrier is stored in the kiosk and via another power source when the carrier is removed from the kiosk; receiving a user input of a desired battery pack carrier to be rented; selecting a battery pack carrier from among the plurality of stored battery pack carriers, where the battery pack carrier corresponds to the user input of a desired battery pack carrier; enabling the kiosk to dispense the selected battery pack carrier to the user.

The foregoing embodiment of the present invention may also comprise receiving, in the kiosk, a previously used one of the battery pack carriers. The foregoing embodiment may also comprise enabling, via the kiosk, at least one of the stored battery pack carrier charging circuits to charge battery packs received in the at least one stored battery pack carrier. The foregoing embodiment may also comprise prioritizing the enabling of the at least one of the stored battery pack charging circuits based on a parameter of the kiosk and/or a parameter of the battery pack carriers, wherein the parameter comprises at least one of available charging power in the kiosk, cost of available charging power in the kiosk, state of charge of the battery packs received in the carriers, conditions of the battery packs received in the carriers, and reservation schedules for the carriers. The foregoing embodiment may also comprise managing inventory of the stored battery carriers. In the foregoing embodiment, the user input may be received via a user interface on the kiosk or via a remote computing device via an internet connection and the user input may include a desired geographic location of the battery pack carrier to be rented.

The foregoing embodiment may also comprise identifying to the user one or more kiosks from a plurality of kiosks that have stored battery pack carriers corresponding to the desired geographic location. In the foregoing embodiment, the user input may include a desired state of charge of a battery pack. The foregoing embodiment may also comprise identifying to the user a battery pack carrier from the stored battery pack carriers with a battery pack that most closely corresponds to the desired state of charge or setting rental prices for the battery pack carriers based upon states of charge of the battery packs in the battery pack carriers or, after dispensing a battery pack carrier, disabling a battery pack in the carrier after a predetermined rental time period has expired.

Another aspect of the present invention includes a method comprising storing, in a battery pack rental kiosk, a plurality of battery packs; charging the battery packs in the kiosk; setting prices of the battery packs based upon parameters of the battery packs; receiving a user input of a desired parameter of a battery pack to be rented; selecting a battery pack from among the plurality of stored battery packs that corresponds to the user input of a desired battery pack parameter; charging the user the set price for the selected battery pack; enabling the kiosk to dispense the selected battery pack to the user.

In the foregoing embodiment, the parameter may comprise at least one of a state of charge of the battery pack, a condition of the battery pack, and a rated voltage of the battery pack.

Another aspect of the present invention includes a power supply apparatus comprising a housing having a receptacle, the receptacle configured to receive a battery pack; a power input connector configured to receive an input of electrical power; a power output connector configured to deliver an output of electrical power; a charging circuit coupled to the power input connector and to the receptacle, the charging circuit configured to control providing charging power to the receptacle using the input of electrical power; and a discharging circuit coupled to the power output connector and to the receptacle, the charging circuit configured to control providing discharging power from the receptacle to the power output connector, wherein the charging circuit is configured to provide charging power to the receptacle when the housing is received in a vending machine and when the housing is outside of the vending machine and a source of electrical power is connected to the power input connector.

The foregoing embodiment may also comprise a communications connector configured to be coupled to a communications line in the vending machine to send and/or receive a signal that causes the charging circuit to provide charging power to the receptacle when the housing is inside of the vending machine. The power input connector may be configured to receive a source of AC input power or the power input connector may be configured to receive a source of DC input power. The power input connector may comprise a first connector configured to receive a source of AC power and a second connector configured to receive a source of DC power. The power output connector may comprise an AC connector and/or a DC connector.

The foregoing embodiment may also comprise at least one battery pack and an inverter circuit configured to convert a DC power output from the at least one battery pack to an AC power output that is delivered to the power output connector. The at least one battery pack may be configured to generate a DC voltage that is greater than or equal to a peak value of a desired AC voltage, and the inverter circuit may be configured to convert the DC voltage generated by the at least one battery pack to an AC output voltage with a peak value that is at least as great as the peak value of the desired AC voltage, the AC output voltage being delivered to the power output connector.

The foregoing embodiment may also comprise a switching device that enables switching between a charging mode in which the charging circuit is active to charge the battery packs and a discharging mode in which the discharging circuit is active to enable discharge of the battery packs to the power outlet. The switching device may include an external switch that is switchable by a user. The switching device may include an automated switching device that switches to the charging mode upon detecting that the power input connector is coupled to a source of electrical power.

The foregoing embodiment may also comprise a handle coupled to the housing to enable carrying of the housing and at least one battery pack wherein the battery pack may be removable from the housing. The at least one battery pack may have a first set of electrical terminals that is connectable to a second set of electrical terminals in the receptacle to enable charging and discharging the at least one battery pack in the housing. The first set of electrical terminals can be connected to a third set of terminals on an electrical device that is separate from the apparatus, to enable the at least one battery pack to be electrically connected to the electrical device when the battery pack is removed from the housing. The electrical device may comprise a power tool, another battery charging device or another electrical device.

Another aspect of the present invention includes a power supply system comprising a battery pack and a charging and discharging container having a housing with a receptacle, the receptacle configured to removably receive and electrically connect to the battery pack, a power input connector configured to receive input power from an external power supply, a power output connector configured to deliver output power from the battery pack, a charging circuit configured to control charging of the battery pack with the input power when the battery pack is received in the receptacle, and a discharging circuit configured to control discharging of output power from the battery pack to the power output connector, wherein the power output connector is electrically coupleable to a first electrical device to power the first electrical device when the battery pack is received in the receptacle, and wherein the battery pack is electrically coupleable to a second electrical device to power the second electrical device when the battery pack is removed from the receptacle.

Another aspect of the present invention includes a system comprising a battery pack; a first electrical device; a second electrical device; and a charging and discharging container having a housing with a receptacle, the receptacle configured to removably receive and electrically connect to the battery pack, a power input connector configured to receive input power from an external power supply, a power output connector configured to deliver an output power from the battery pack, a charging circuit configured to control charging of the battery pack with the input power when the battery pack is received in the receptacle, and a discharging circuit configured to control discharging of output power from the battery pack to the power output connector, wherein the power output connector is electrically coupleable to the first electrical device to power the first electrical device when the battery pack is received in the receptacle, and wherein the battery pack is electrically coupleable to the second electrical device to power the second electrical device when the battery pack is removed from the receptacle.

In the foregoing embodiments the power input connector may be configured to receive a source of AC input power or a source of DC input power. The power input connector may comprise a first connector configured to receive a source of AC power and a second connector configured to receive a source of DC power. The power output connector may comprise an AC connector or a DC connector. The foregoing embodiment may also comprise an inverter circuit configured to convert a DC power output from the battery packs to an AC power output that is delivered to the power output connector. In the foregoing embodiment, the at least one battery pack may be configured to generate a DC voltage that is greater than or equal to a peak value of a desired AC voltage, and the inverter circuit may be configured to convert the DC voltage generated by the battery pack to an AC output voltage with a peak value that is at least as great as the peak value of the desired AC voltage, the AC output voltage being delivered to the power output connector. The foregoing embodiment may also comprise a switching device that enables switching between a charging mode in which the charging circuit is active to charge the battery packs and a discharging mode in which the discharging circuit is active to enable discharge of the battery packs to the power output connector. The switching device may include an external switch that is switchable by a user. The switching device may include an automated switching device that switches to the charging mode upon detecting that the power input connector is coupled to a source of electrical power. The foregoing embodiment may also comprise a handle coupled to the housing to enable carrying of the housing. The first electrical device may comprise an AC power tool and the second electrical device comprises a DC power tool.

Another aspect of the present invention includes a battery pack container comprising a housing having a receptacle for receiving at least one battery pack; a first power input connector configured to receive power from an AC power supply; a second power input connector configured to receive power from a DC power supply; and a charging circuit coupled to the first and second power input connectors and to the receptacle, the charging circuit configured to control providing charging power to the receptacle using power from at least one of the AC power supply and the DC power supply.

The foregoing embodiment may also comprise a power output connector coupled to the housing and configured to supply output power; and a discharging circuit coupled to the power output connector and to the receptacle, the discharging circuit configured to control discharging of electrical power from the at least one battery pack to the power output connector. The power output connector may comprise an AC connector and/or a DC connector.

The foregoing embodiment may also comprise an inverter circuit configured to convert a DC power output from the at least one battery pack to an AC power output that is delivered to the power output connector. The at least one battery pack may be configured to generate a DC voltage that is greater than or equal to a peak value of a desired AC voltage, and the inverter circuit may be configured to convert the DC voltage generated by the at least one battery pack to an AC output voltage with a peak value that is at least as great as the peak value of the desired AC voltage, the AC output voltage being delivered to the power output connector.

The foregoing embodiment may also comprise a switching device that enables switching between a charging mode in which the charging circuit is active to charge the battery packs and a discharging mode in which the discharging circuit is active to enable discharge of the battery packs to the power outlet. The switching device may include an external switch that is switchable by a user or may include an automated switching device that switches to the charging mode upon detecting that the power input connector is coupled to a source of electrical power.

The foregoing embodiment may also comprise a handle coupled to the housing to enable carrying of the housing.

Another aspect of the present invention includes a portable power supply apparatus comprising a housing having a receptacle for receiving at least one battery pack; a handle coupled to the housing to enable carrying of the housing; a power input connector configured to receive input power from an external power supply; a power output connector configured to supply power from the housing; a charging circuit coupled to the power input connector and to the receptacle, the charging circuit configured to control providing charging power to the receptacle using the input power; and a discharging circuit coupled to the power outlet and to the receptacle, the charging circuit configured to control discharging of output power from the receptacle to the power output connector.

The foregoing embodiment may also comprise an inverter circuit configured to convert a DC power output from the receptacle to an AC power output that is delivered to the power output connector. The foregoing embodiment may also comprise at least one battery pack, wherein the at least one battery pack may be configured to generate a DC voltage that is greater than or equal to a peak value of a desired AC voltage, and the inverter circuit may be configured to convert the DC voltage generated by the battery pack to an AC output voltage with a peak value that is at least as great as the peak value of the desired AC voltage, the AC output voltage being delivered to the power output connector. The power input connector may be configured to receive a source of AC input power and/or a source of DC input power. The power input connector may comprise a first input connector configured to receive a source of AC power and a second input connector configured to receive a source of DC power. The power output connector may comprise an AC connector and/or a DC connector.

The foregoing embodiment may also comprise a switching device that enables switching between a charging mode in which the charging circuit is active to charge the battery packs and a discharging mode in which the discharging circuit is active to enable discharge of the battery packs to the power output connector. The switching device may include an external switch that is switchable by a user or an automated switching device that switches to the charging mode upon detecting that the power input connector is coupled to a source of electrical power.

Another aspect of the present invention includes a portable power supply comprising a housing including a battery connector for electrically coupling to a battery pack; a power input connector configured to receive power from an external power supply; a power output connector configured to supply power from the housing; a switch for selectively coupling the battery connector to the power input connector or the battery connector to the power output connector.

In the foregoing embodiment, the switch may include a first switch for coupling the battery connector to the power input connector and a second switch for coupling the battery connector to the power output connector.

The foregoing embodiment may also comprise a charging circuit coupled to the power input connector and to the battery connector, wherein the charging circuit supplies charging power received at the power input connector to the battery connector. The foregoing embodiment may also comprise an inverter circuit coupled to the battery connector and to the power output connector, wherein the inverter circuit is configured to receive DC voltage output from the battery connector, convert the received DC voltage to an AC voltage and supply the AC voltage to the power output connector.

Another aspect of the present invention includes a portable power supply comprising a carrier comprising a battery connector, the battery connector configured to receive a removable, rechargeable battery pack, a charging circuit coupled to the battery connector to supply charging power to the battery connector, a power supply input connector coupled to the charging circuit configured to receive input power and to provide the input power to the charging circuit, wherein the input power may be received from a variety of power sources.

In the foregoing embodiment the input power may comprise an AC power source and/or a DC power source. In the foregoing embodiment, the power supply input connector may comprise an AC power connector and/or a DC power connector. The foregoing embodiment may comprise a receptacle, wherein the receptacle comprises the battery connector. The foregoing embodiment may comprise a handle for transporting the carrier containing the battery pack. The foregoing embodiment may comprise a cover for the receptacle for securing the battery pack in the receptacle during transportation.

Advantages may include one or more of the following. The system may provide a convenient system and method for users to obtain, charge, and discharge battery packs for use with power tools and other electrical devices. These and other advantages and features will be apparent from the description and the drawings

BRIEF DESCRIPTION OF THE DRAWINGS

FIG. 2 is an exemplary embodiment of a kiosk of the rental system of FIG. 1.

FIG. 23 is an exemplary embodiment of the kiosk of FIG. 2.

DETAILED DESCRIPTION

Figure 1:
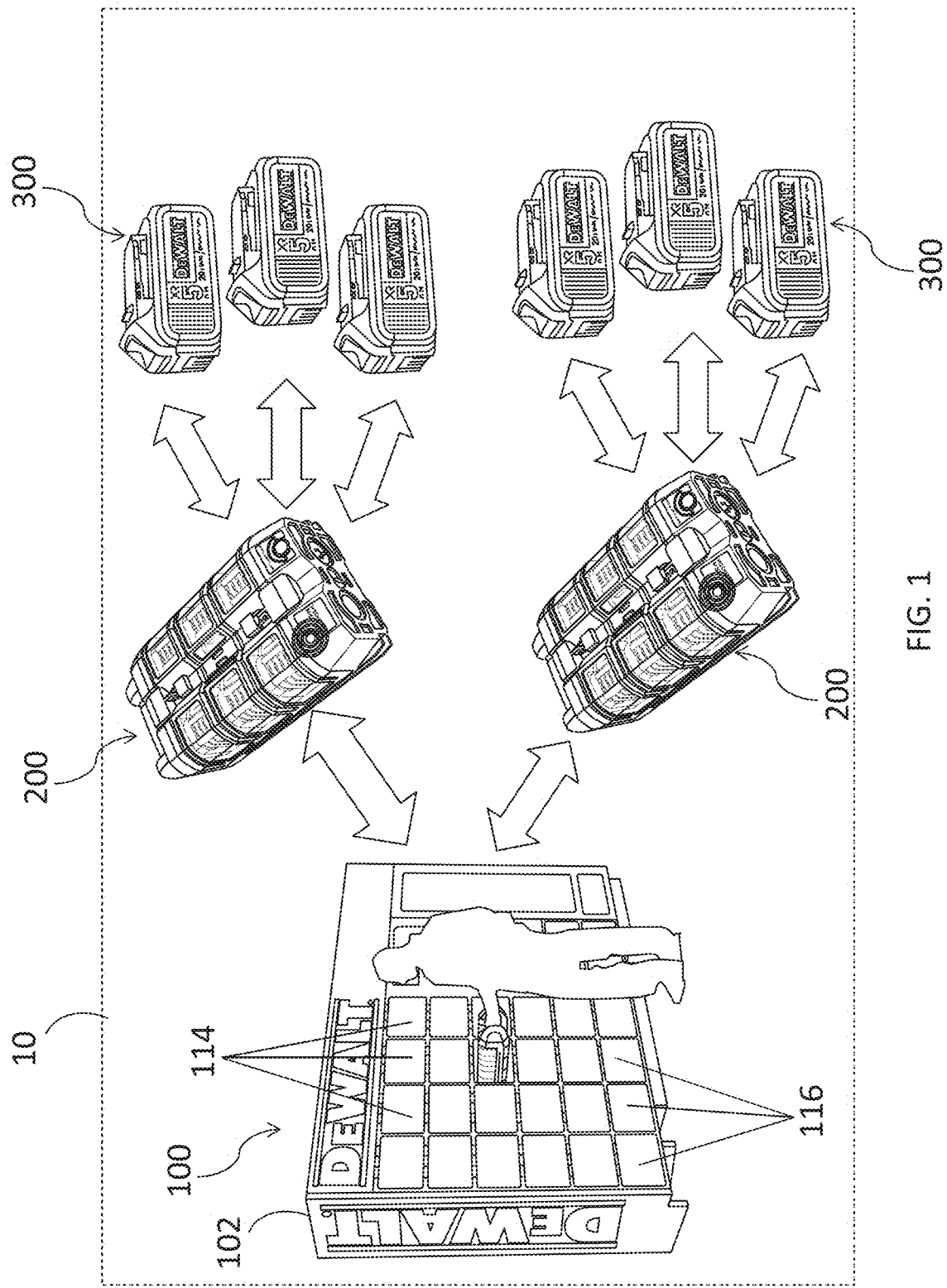
FIG. 1 is an exemplary embodiment of a rental system of the present invention.

Referring to FIG. 1, in an exemplary embodiment, a system 10 for renting, transporting, charging and discharging battery packs (e.g., for power tools and other electrical devices) includes a vending machine or kiosk 100, one or more battery pack carriers or trays 200 received in and dispensed by the kiosk 100, and one or more rechargeable, removable battery packs 300 received in each of the carriers 200 or received directly in the kiosk 100 independent of the carriers 200. The carriers 200 may be configured to charge the battery packs 300 inside and/or outside of the kiosk 100 via one or more power inlets, and to enable discharging the battery packs 300 through one or more power outlets. The kiosk 100 may enable receiving, dispensing, and renting the carriers 200 and battery packs 300, and causing the carriers 200 to charge the battery packs 300 when the carriers 200 are received in the kiosk 100.

Referring also to FIG. 2, the kiosk 100 includes a housing 102 with an advertising display area 104, a battery pack rental area 106, a retail vending area 108, and a user interface 110. The advertising display 104 may be a static display (e.g., a static sign) or a dynamic display (e.g., an LCD screen).

The battery pack rental area 106 includes a plurality of bins 114. Each bin 114 is configured to dispense, receive, store, and provide power for charging one of the carriers 200 and the associated battery packs 300. The bins 114 are each closed by a lockable door 116, and may each further include a handle 118. The doors 116 are configured to unlock when a user rents or returns one of the carriers 200.

Figure 3A:
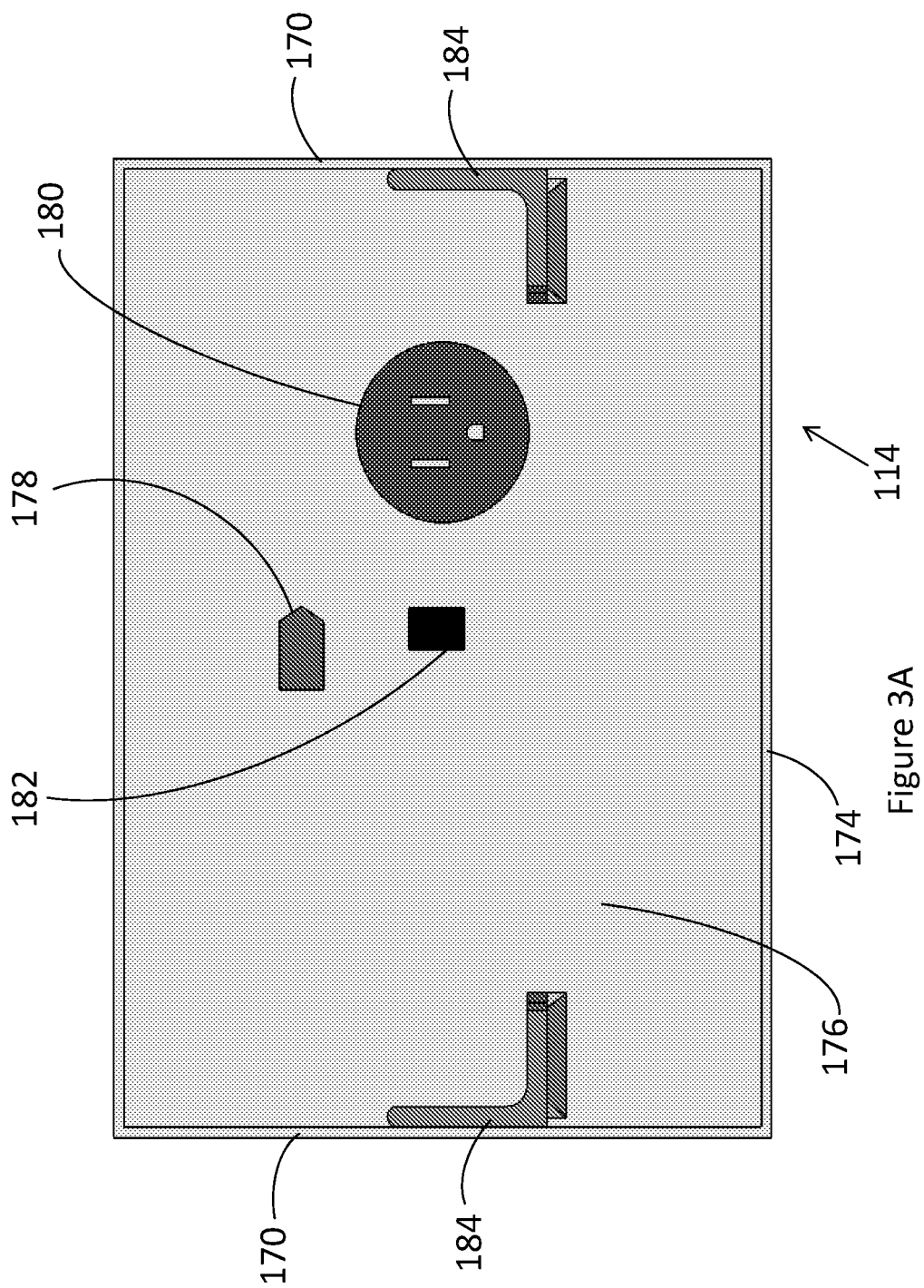
FIG. 3A and FIG. 3B are a front view and a side view of an exemplary embodiment of a bin of the kiosk of FIG. 2.
Figure 3B:
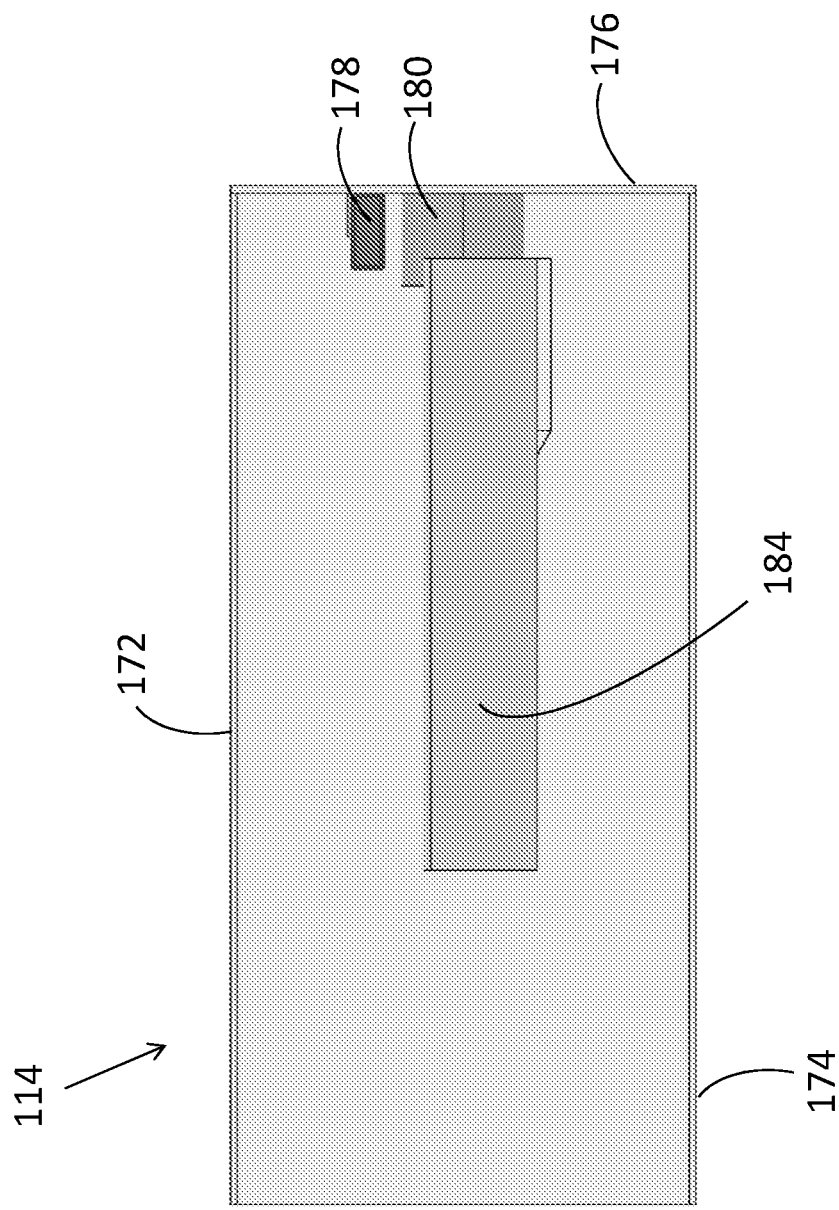

Referring to FIGS. 3A and 3B, an example of an empty bin 114 is illustrated. The bin 114 includes five walls—two opposing sidewalls 170, a top wall 172, a bottom wall 174, and a rear wall 176—and the bin door 116 forming a generally rectangular cavity for receiving, housing and dispensing the carrier 200. Each sidewall includes a longitudinal extending rail 184—providing a pair of rails 184 in each bin 114. The rails 184 will be discussed in more detail below. The rear wall 176 of each bin 114 includes a plurality of connectors. Specifically, the rear wall 176 includes a communication connector 178 for providing communication between the kiosk 100 and the carrier 200 and a power connector 180 for providing power to the carrier 200. The rear wall 176 also includes an extension 182 for toggling a carrier charge/discharge switch into charging mode. These elements correspond to a plurality of corresponding elements in the carrier 200, all of which will be discussed in greater detail below.

Adjacent to each bin door 116 may be a state of charge display 120 to indicate the state of the carrier, including a state of charge of the battery packs 300 received in the associated bin 114. For example, the display 120 may include multi-colored LED lights to indicate the state of charge of the battery packs (e.g., red, yellow, and green for low, medium, and high). The bins may have varied sizes and configurations to accommodate different sizes and configurations of carriers 200. For example, as shown in FIG. 2, a first group 114a of bins 114 is configured to receive one of the carriers 200 that contains six battery packs 300, while a second group 114b of bins 114 may be configured to receive individual battery packs not received in a carrier 200 or a carrier 200 having more than six battery packs 300.

Referring to FIG. 2, the retail vending area 108 includes a retail vending display area 122 containing a plurality of products for sale and a vending opening 124 for dispensing the products for sale. The products contained in the retail vending area 108 may be products for sale that will be used by persons who rent the battery packs. For example, the retail vending area 108 may contain power tools (e.g., electric screwdrivers, drills, saws, outdoor equipment, etc.), power tool accessories (e.g., saw blades, drill bits, screw-driving bits, spools of cutting string, battery pack chargers and charging cords etc.), hand tools (e.g., screwdrivers, hammers, wrenches, etc.), and other related products (e.g., work gloves, safety glasses, tool belts, etc.).

Figure 4:
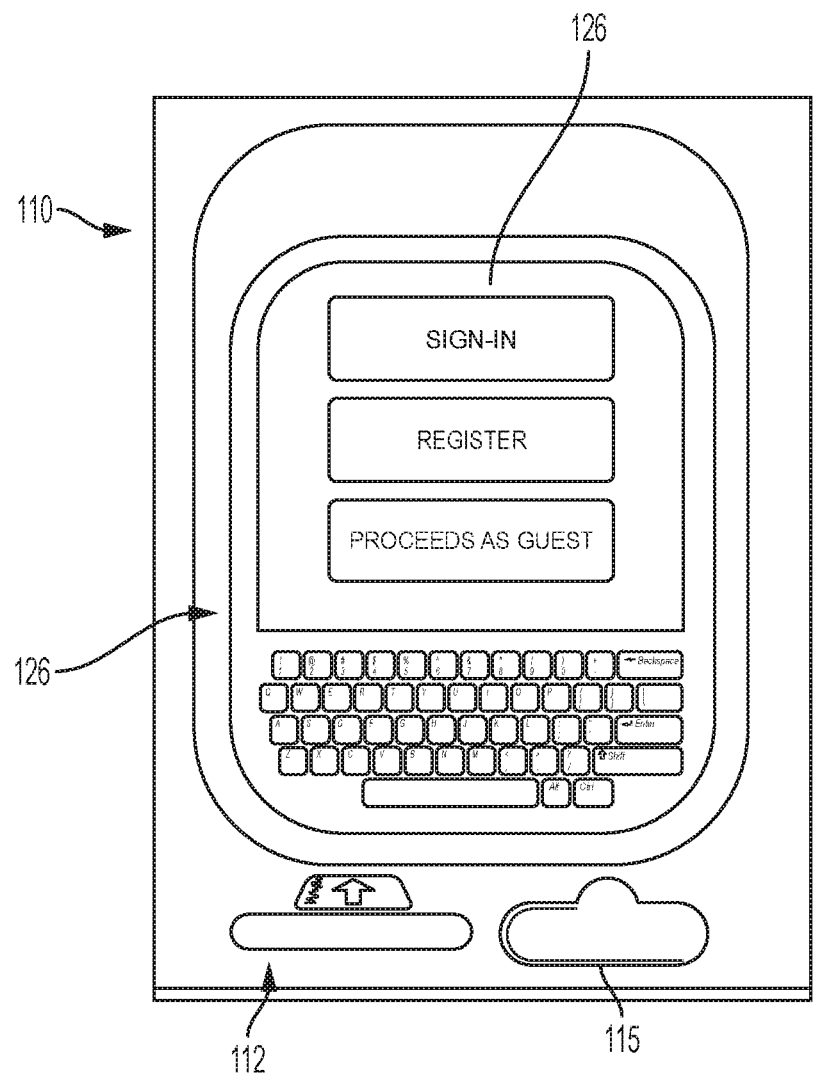
FIG. 4 is an exemplary embodiment of a user interface of the kiosk of FIG. 2.

Referring also to FIG. 4, the exemplary user interface 110 may include a display screen 126, a user input device 128, and a payment processing area 112. The display screen 126 displays options and information to the user. For example, the display screen 126 may be an LCD monitor. The user input device 128 allows the user to input information to the kiosk 100. For example, the user input device 128 may include a keyboard or a keypad. In other embodiments, the user input device may be fully or partially integrated into the display screen 126, e.g., by implementing the display screen 126 as a touch screen interface. The payment processing area 112 may include one or more of a credit card reader 113, a bar code or a QR code scanner, a RFID sensor configured to communicate with an RFID payment tag, bill and coin receptacles, a receipt printer 115, and a change receptacle. The payment processing area is configured to process payments from users for battery pack rentals, retail sales, and coupon and voucher redemptions.

Figure 5:
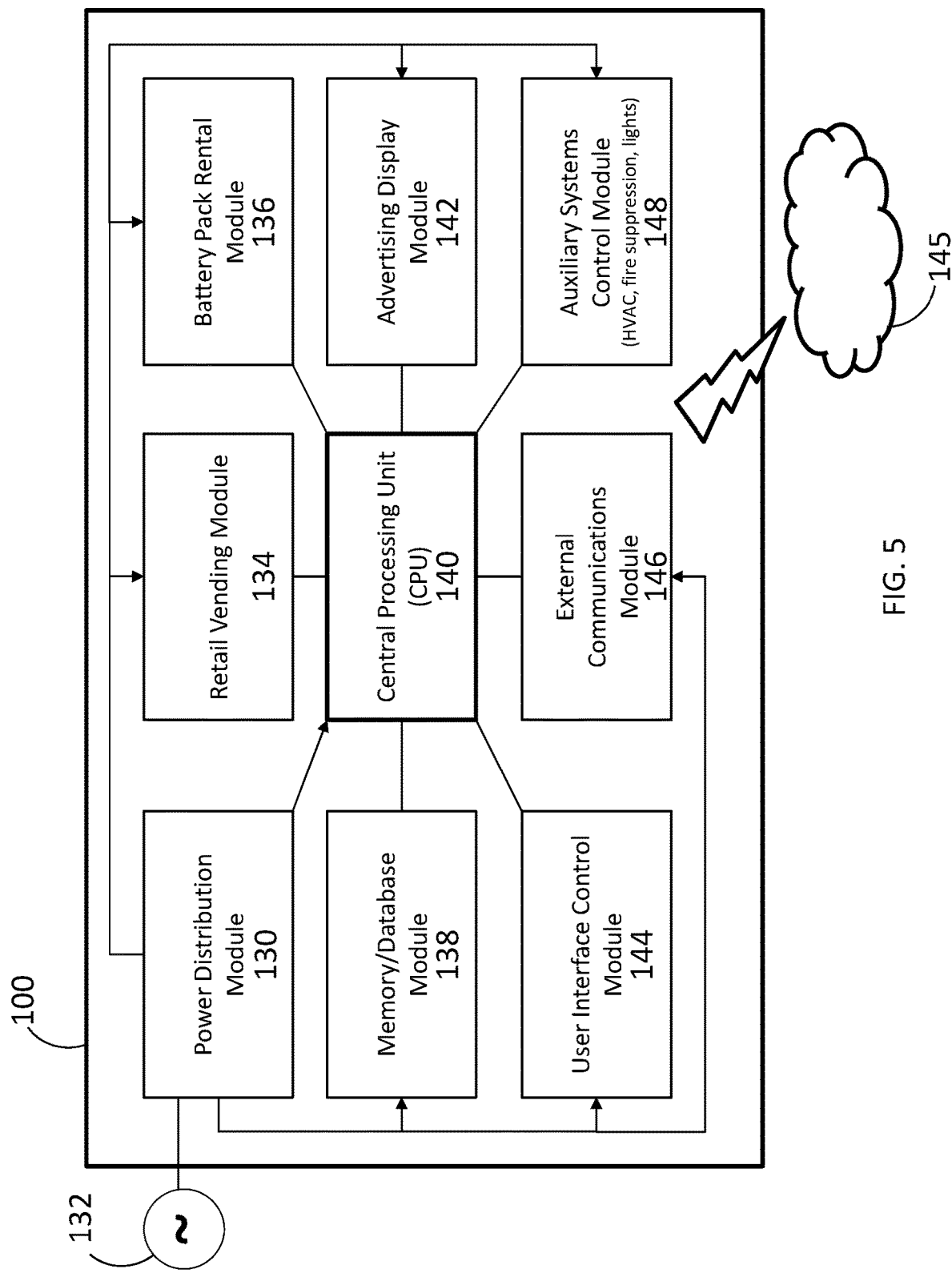
FIG. 5 is a block diagram of various exemplary components of the kiosk of FIG. 2.

FIG. 5 is a block diagram that schematically illustrates an exemplary system architecture for the electronic controls for the kiosk 100. The electronic controls include a power distribution module 130 that controls and distributes power to all of the other modules, as will be described in greater detail below. A central processing unit (CPU) 140 and a memory/database module 138 provide centralized control for the other modules: a retail vending module 134 that controls the retail vending area 108, a battery pack rental module 136 that controls the battery pack rental area 106, an advertising display module 142 that controls the advertising display area 104, and a user interface module 144 that controls the user interface 110. Also coupled to the CPU 140 are an auxiliary systems control module 148 (e.g., to control HVAC, fire suppression, lights, etc.) and an external communications module 146. As described in greater detail below, the external communications module 146 enables communication between and among the kiosk 100 and other kiosks, servers, databases, and computing devices via one or more telecommunications networks 145.

The advertising display module 142 controls the display of advertising information on the advertising display 104. For example, in a static display, the advertising display module 142 may control illumination of the advertising display 104. In a dynamic display, the advertising display module 142 may alter and control the advertising display 104 to display various advertisements for goods or services, in accordance with instructions from the central processing unit 140. For example, the advertising display module 142 may control operation of an LCD screen that scrolls through various advertisements. The auxiliary systems control module 148 controls several systems that are helpful to operation of the kiosk 100. The auxiliary systems control module 148 may communicate with and receive instructions from the central processing unit 140. For example, the auxiliary systems control module 148 may control HVAC, lighting, and fire suppression systems for the kiosk 100.

The retail vending module 134 controls the vending of retail products from the retail vending area 108. For example, the retail vending module 134 may control dispensing of retail goods from the retail vending area 108 upon receipt of instructions from the central processing unit 140. The retail vending module 134 may also sense the inventory of goods in the retail vending area 108 and provide indications of low inventory levels to the central processing unit 140. These and other implementations will be apparent to those of ordinary skill in the art.

Figure 6:
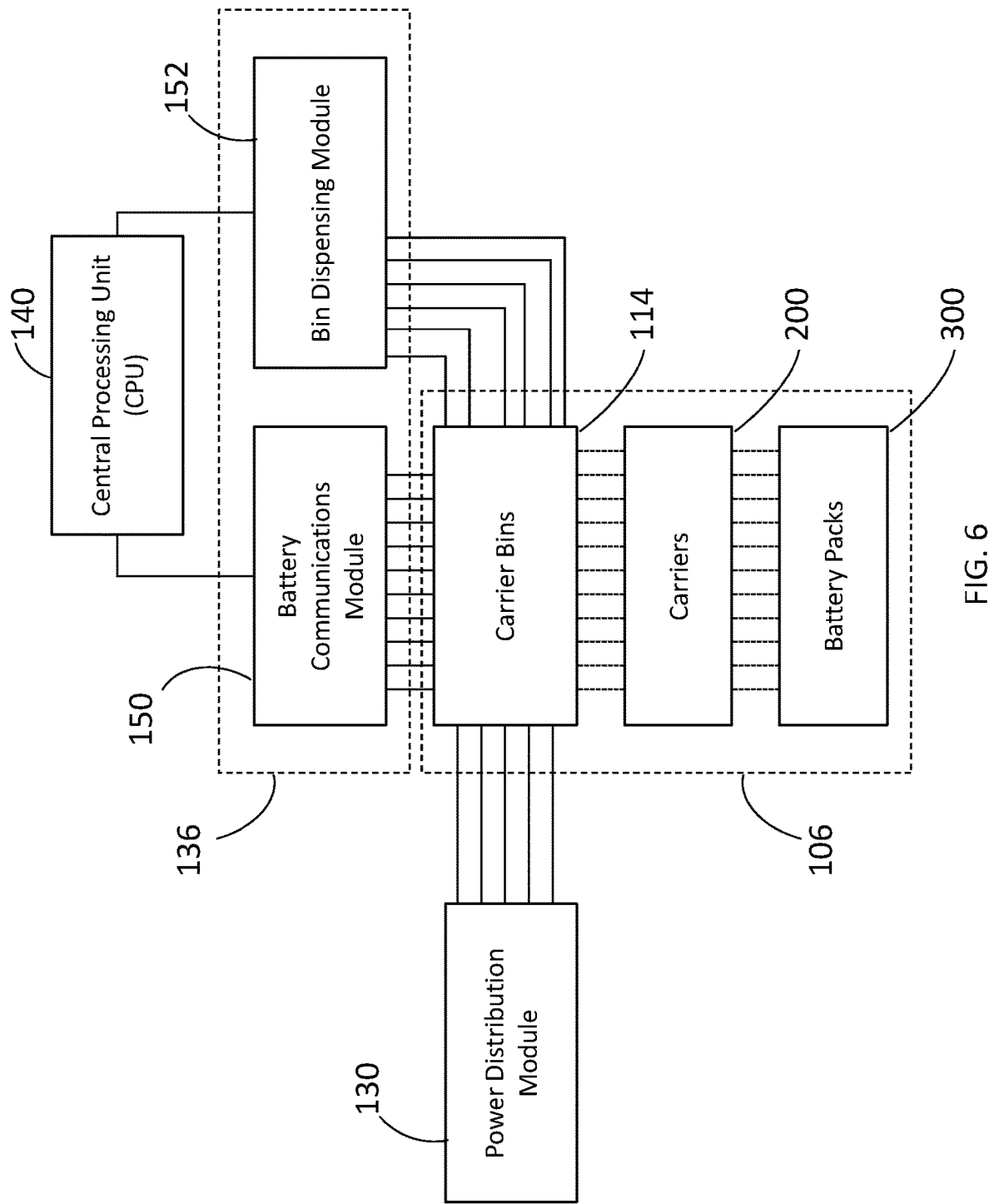
FIG. 6 is another block diagram of various exemplary components of the kiosk of FIG. 2.

Referring also to FIG. 6, the battery pack rental module 136 controls the battery pack rental area 106 according to instructions from the central processing unit 140. As discussed above, the battery pack rental area 106 includes the carrier bins 114, the carriers 200 received in the carrier bins 114, and the battery packs 300 received in the carriers 200. The power distribution module 130 delivers power to each of the carrier bins 114 (as described in more detail below). The battery pack rental module 136 includes a battery communications module 150 and a bin dispensing module 152, each in communication with the central processing unit 140, and in communication with the carrier bins 114. The battery communications module 150 and the bin dispensing module 152 may be wired with individual communications lines for each carrier bin 114 or may be wired with fewer communications lines (e.g., one line) for all carrier bins 114 with different channels, frequencies or codes communicating between the modules and the receptacles.

The battery communications module 150 may perform several functions. First, the battery communications module 150 may sense the state of charge of the batteries in the carriers in the bins 114. The battery communications module 150 delivers this information to the central processing unit for storage in the memory/database module 138. The battery communications module 150 may also cause the state of charge display 120 to indicate the state of charge of the battery packs in that bin 114. Second, the battery communications module 150 may sense the condition of the batteries in the bin 114. If, for example, the condition indicates that the batteries have reached or exceeded their useful life, the battery communications module 150 may communicate this information to the central processing unit 140 and disable further renting of those battery packs. Third, the battery communications module 150, alone or based on instructions from the central processing unit 140, may prioritize and control the timing of when the carriers 200 in each bin 114 are allowed to charge the battery packs in their bin 114. The prioritization may be based on a variety of parameters (which may be sensed by the battery communications module 150, decided in an algorithm executed in the central processing unit 140 and/or stored in the memory/database module 138), such as the amount of available charging power, the cost of available charging power, the relative states of charge of the battery packs in the bins, the number of battery packs in each bin, the conditions of the battery packs in each bin, and reservation schedules for renting the battery packs in each bin. Further details about the charging of the batteries in the bins are discussed below.

The bin dispensing module 152 controls when to open the various bins to enable a user to insert or remove a carrier 200 and battery packs 300 into or from the bins. For example, based on a rental order received and/or processed in the central processing unit 140 and/or stored in the memory/database module 138, the bin dispensing module 152 may unlock a door 116 of a particular bin 114 and enable removal of the carrier 200 and battery packs 300 in that bin 114. Similarly, based on a return order received and/or processed in the central processing unit and/or stored in the memory/database module 138, the bin dispensing module 152 may identify an empty bin 114 and unlock the door 116 to that bin 114 to enable insertion of a carrier 200 and battery packs 300 in the bin 114. Finally, the bin dispensing module 152 may monitor or control which of several available carriers 200 should be rented in response to a rental request, based on factors such as the state of charge, age, or condition of the battery packs and the duration that the battery packs have been received in the bins.

Figure 7:
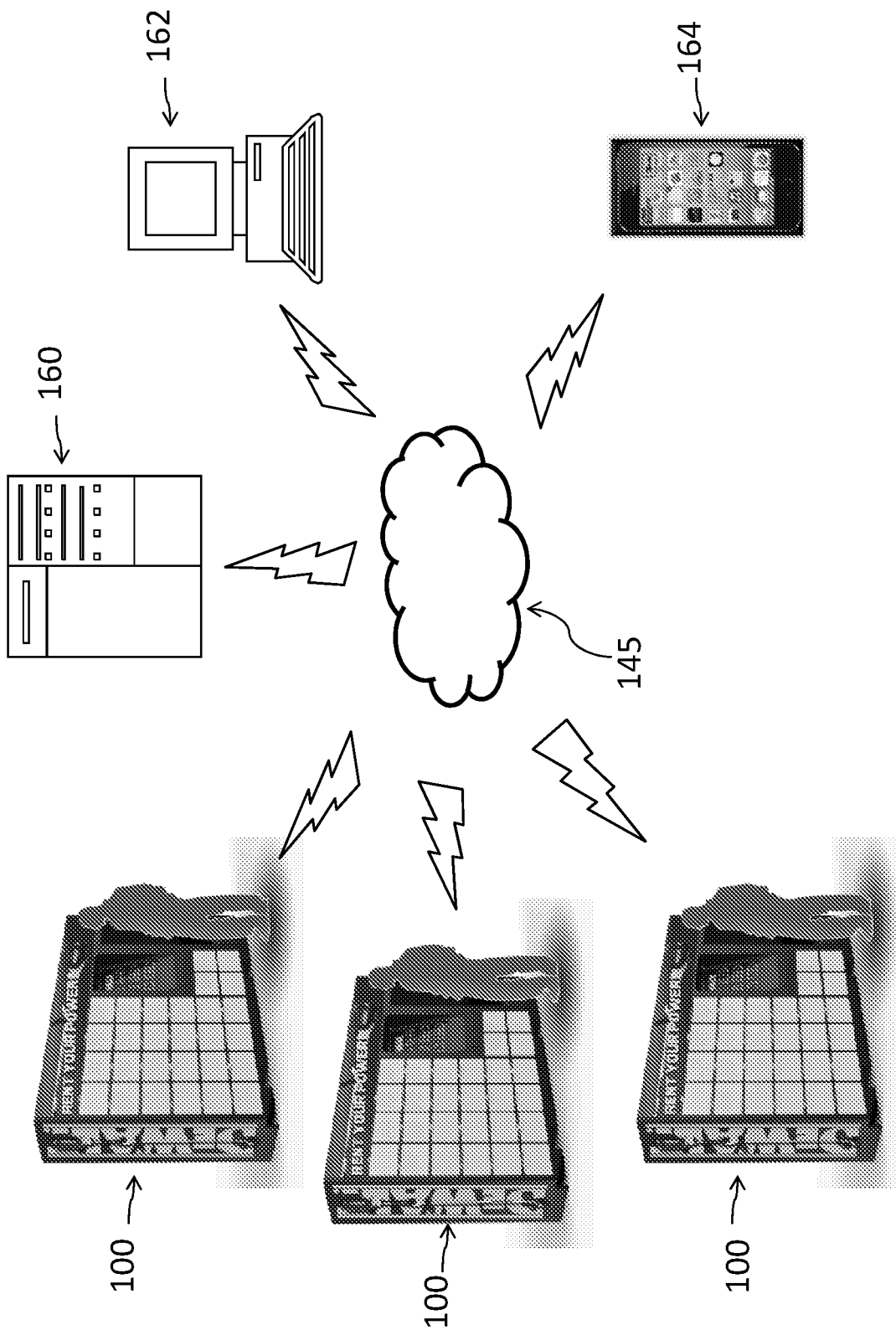
FIG. 7 is another exemplary embodiment of a rental system of the present invention.

Referring also to FIG. 7, the external communications module 146 enables the central processing unit 140 of one or more kiosks 100 to communicate with each other and with one or more external computing or communication devices, such as one or more central servers 160, one or more personal computers or workstations 162, one or more smartphones or tablet computers 164, etc. Communication between and among the kiosks 100 and these devices 160, 162, 164 may be via one or more telecommunications networks 145 such as internets, intranets, virtual private networks, public switched telephone networks (PSTNs), cellular communications networks, Wi-Fi networks, Bluetooth® communication networks, LANs, WANs, fiber optic communications networks, cable communications networks, satellite communication networks, etc. In other embodiments, computing devices such as smartphones and tablets may communicate directly with kiosks, bypassing the central servers and the telecommunications networks. The computing devices and communications networks shown in FIGS. 4 and 7 facilitate remote communication and management among owners and customers and kiosks, such as: reserving and ordering rental battery packs; purchasing and reserving retail goods; communicating with users when a rental battery pack is due for return; inventory management of kiosks; locating kiosks with available battery packs for rental at the closest geographic locations, and sending advertisements regarding the kiosk products to customers and potential customers of the kiosks.

Figure 8:
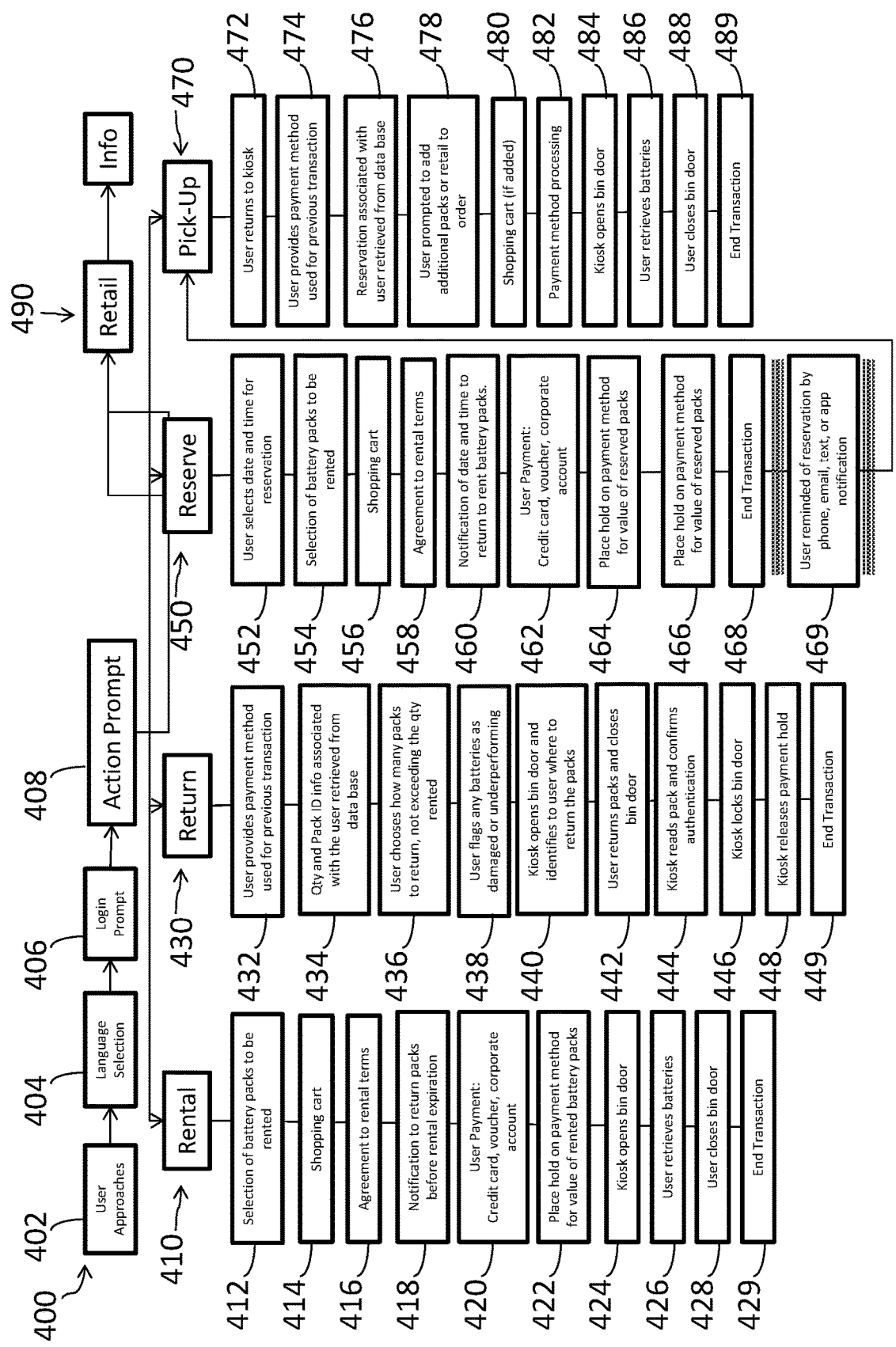
FIG. 8 is an exemplary flow chart for operation of the rental system of FIG. 1.
Figure 9:
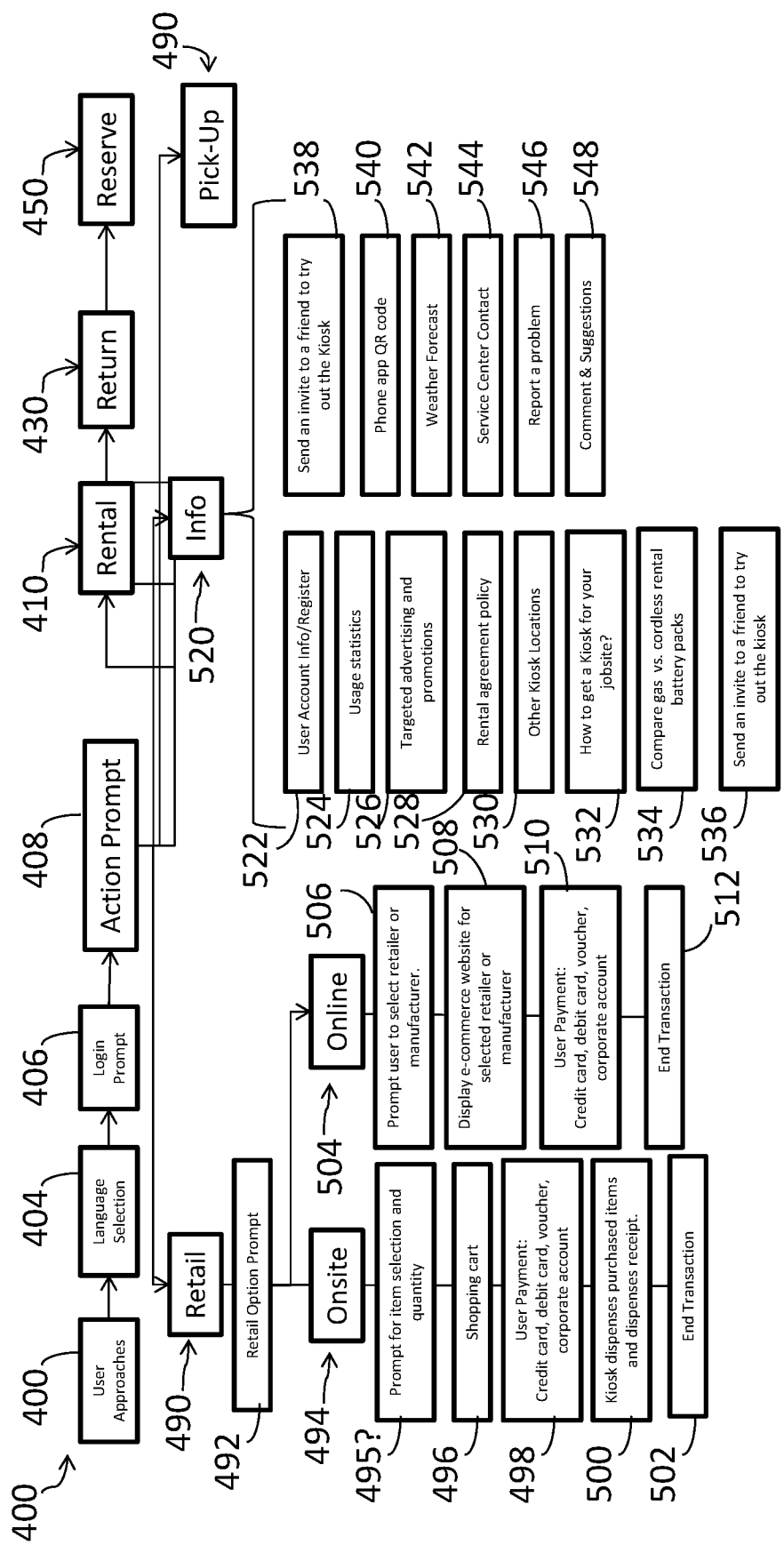
FIG. 9 is another exemplary flow chart for operation of the rental system of FIG. 1.
Figure 10A:
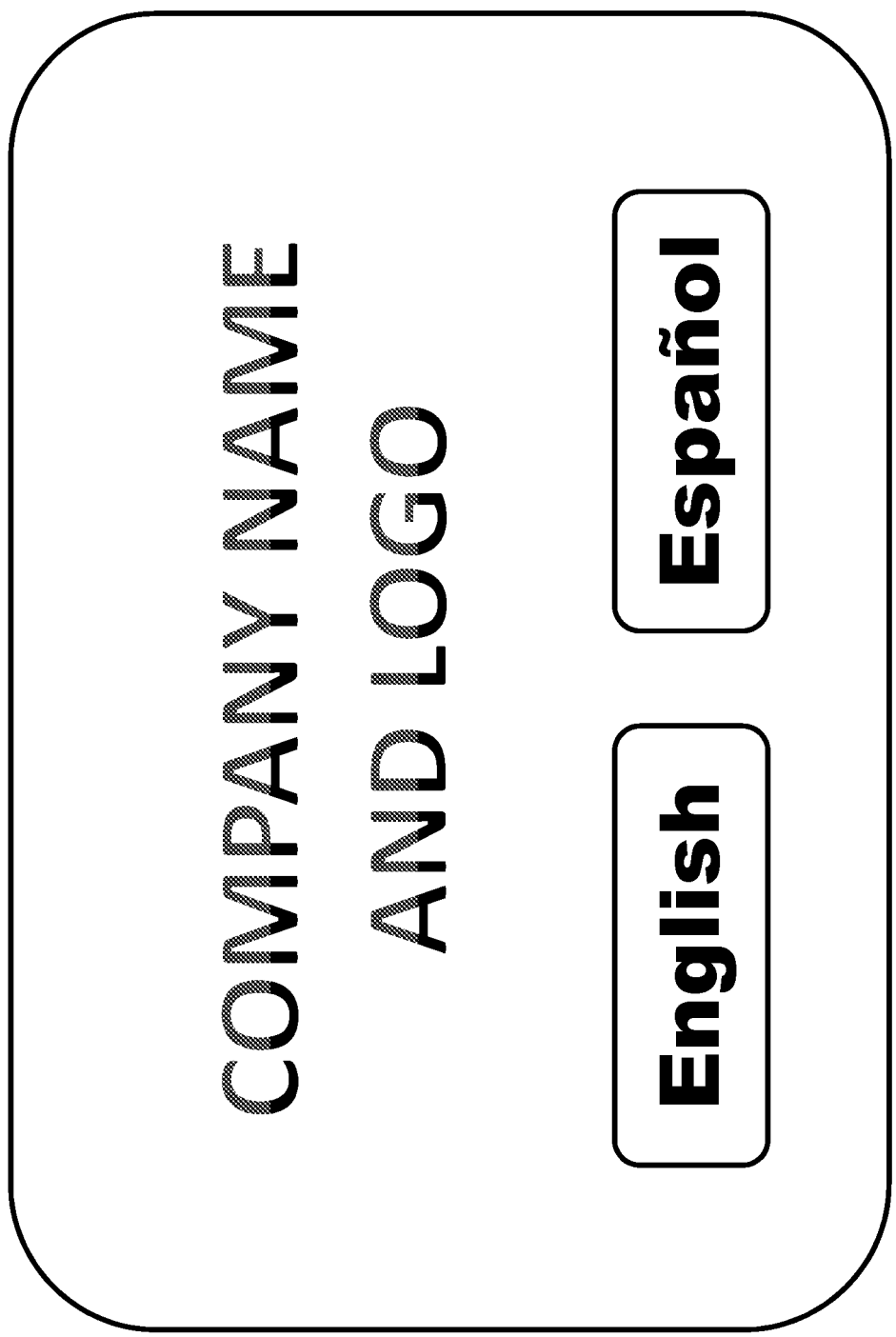
FIGS. 10A-16 are exemplary screen shots of a user interface for use with the rental system of FIG. 1, related to the flow charts of FIGS. 8 and 9.
Figure 10B:
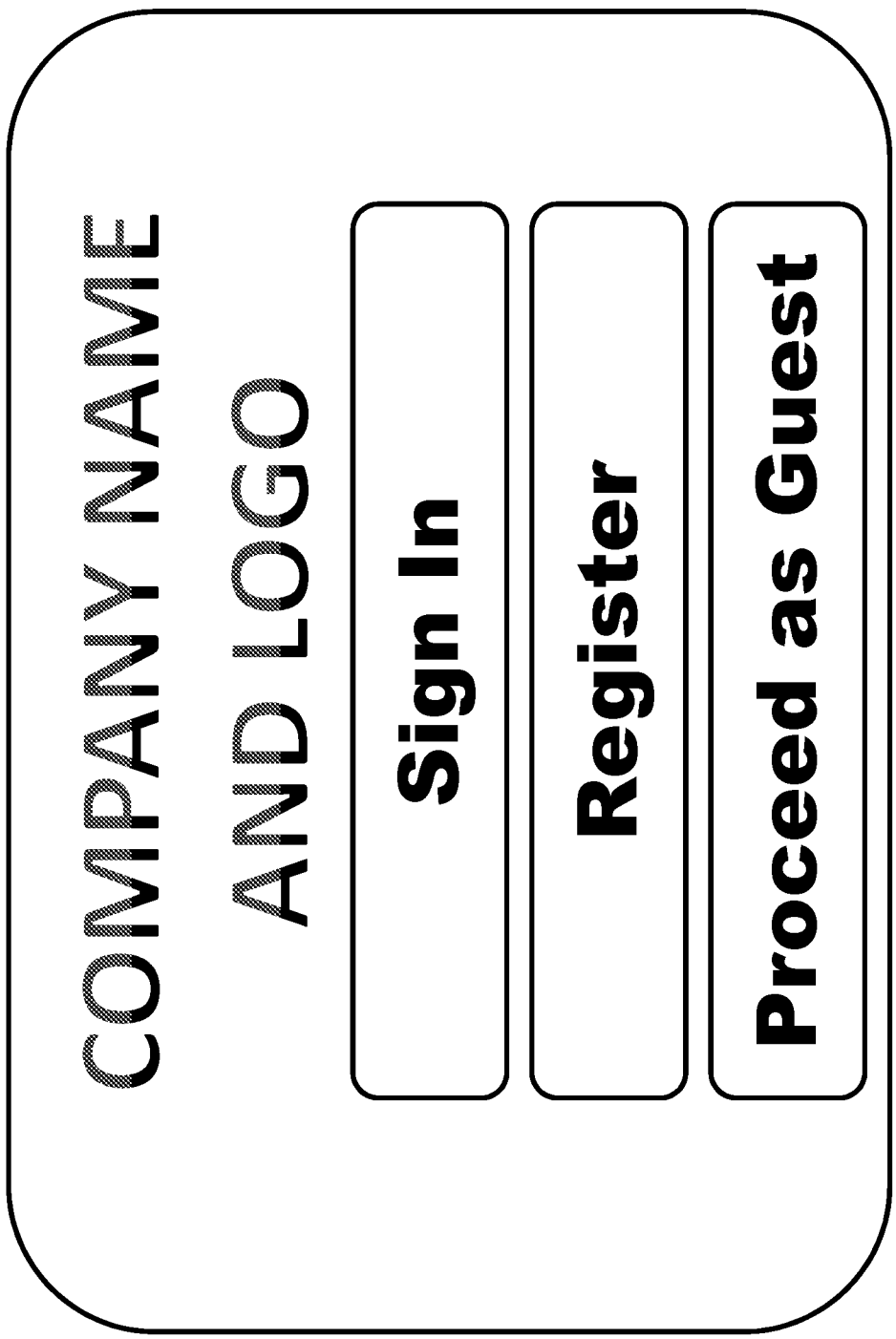
Figure 10C:
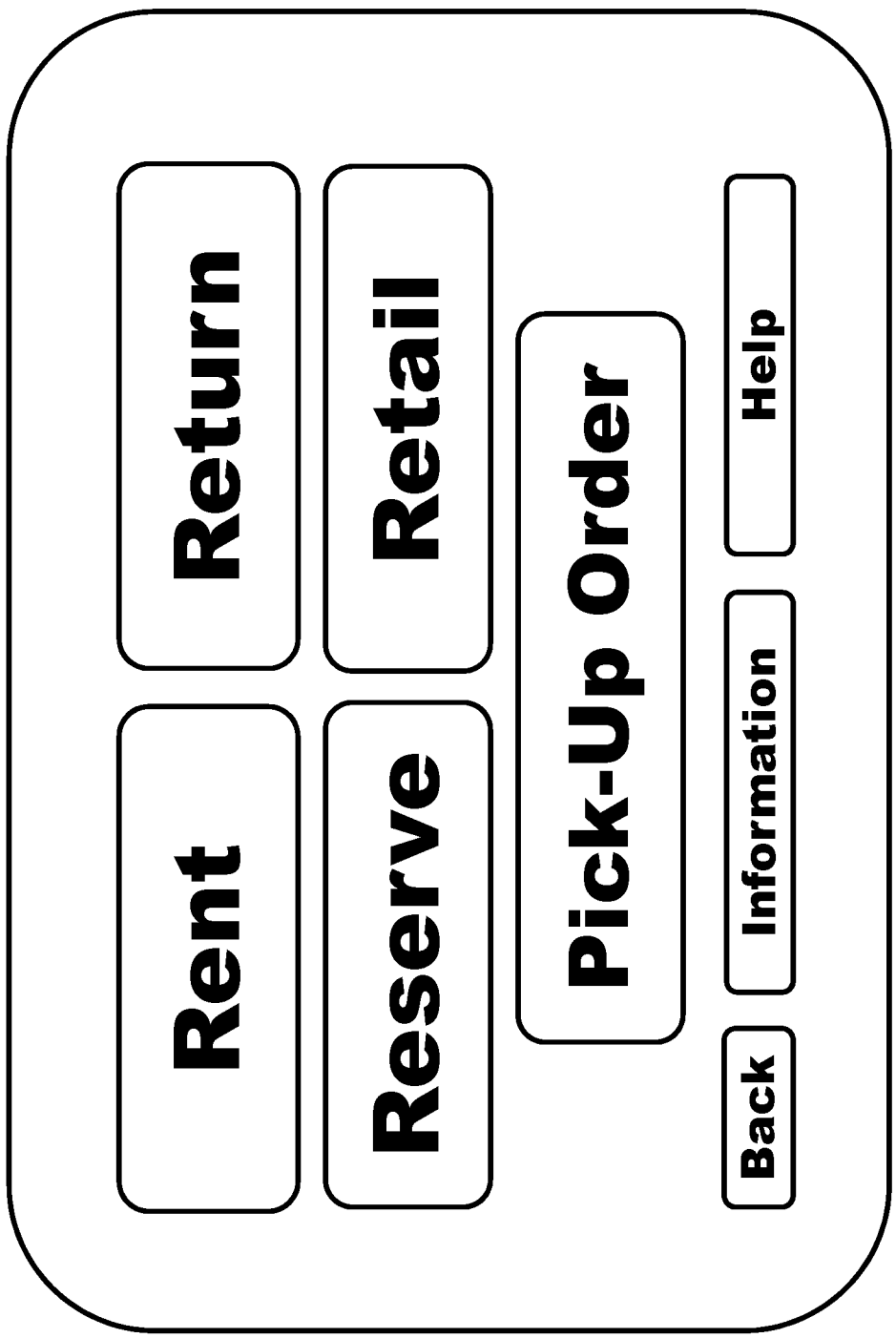

In one implementation, operation of the kiosk 100 may be controlled locally by user interaction with the user interface 110 on the kiosk 100. FIGS. 8 and 9 illustrate an exemplary flow chart 400 for user interaction with the user interface 110 on the kiosk. FIGS. 10A-16 illustrate exemplary screen shots of the user interface 110 when implementing the flow chart 400 in FIGS. 8 and 9. In implementing these flow charts, the central processing unit 140 directs the user interface control module 144 to control the user interface 110 and the payment processing area 112. The user interface control module 144 controls the information that is displayed on the screen 126, based on instructions from the central processing unit 140. The user interface control module 144 also receives and processes input into the user input device 128 of desired actions such as renting carriers 200 and battery packs 300, returning carriers 200 and battery packs 300, or purchasing retail items, and transmits signals corresponding to this information to the central processing unit 140 for further processing. In addition, the user interface control module 126 receives and processes payments received in the payment processing area 112, and transmits signals corresponding to this information to the central processing unit 140 for further processing.

Referring to FIG. 8, at step 402, the user approaches the kiosk 100 and activates the user interface 110, e.g., by touching it. At step 404 and FIG. 10A, the user interface 110 prompts the user to select a language (e.g., English, Spanish, etc.). At step 406 and FIG. 10B, an action prompt requests that the user sign in with an existing user ID and password, register with a new user ID or password, or proceed as a guest without a user ID and password. At step 408 and FIG. 10C, the user interface 110 main menu prompts the user to select among several actions: Rental, Return, Reserve, Retail, Pick-Up Order and Info.

Rental

Figure 11B:
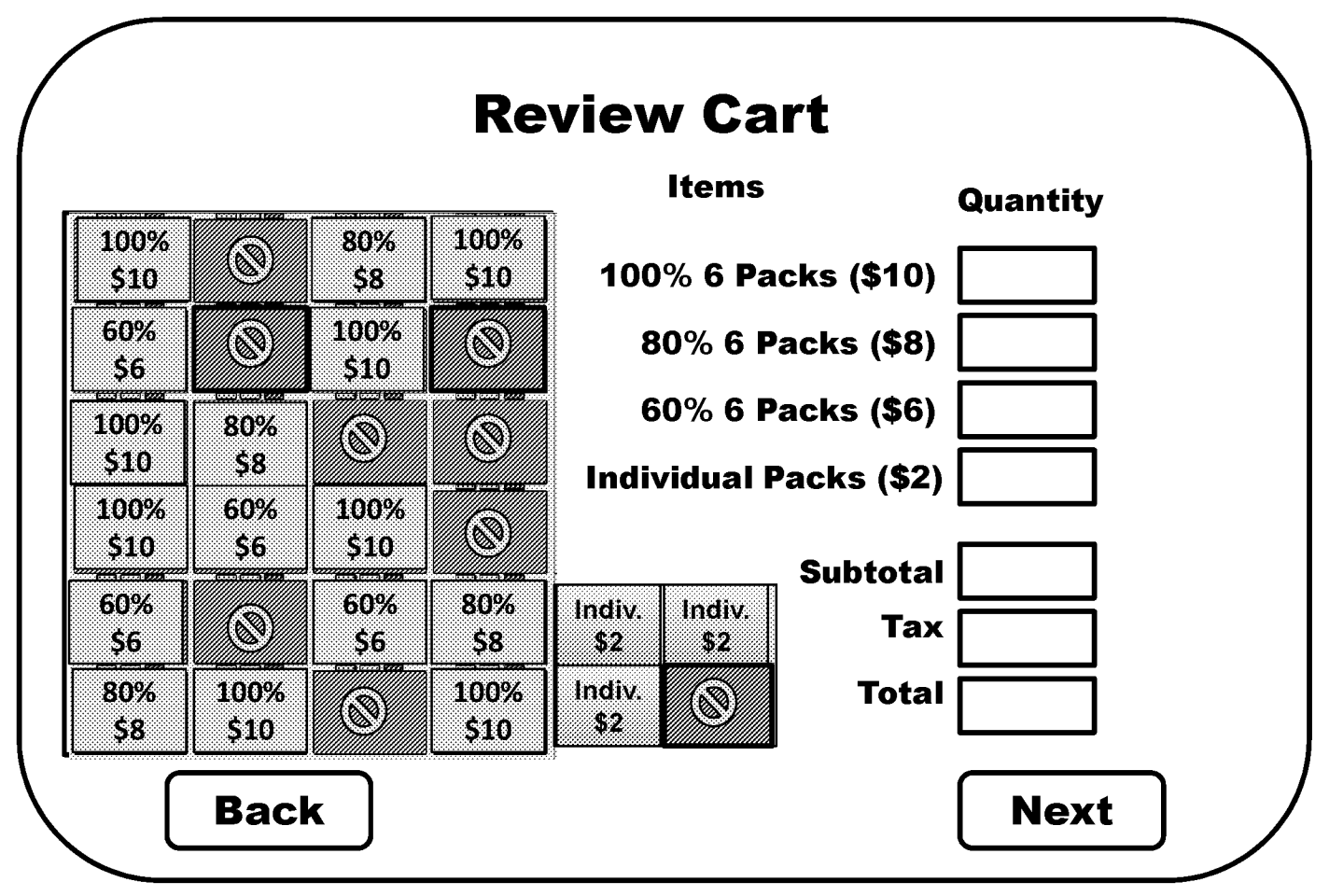
Figure 11C:
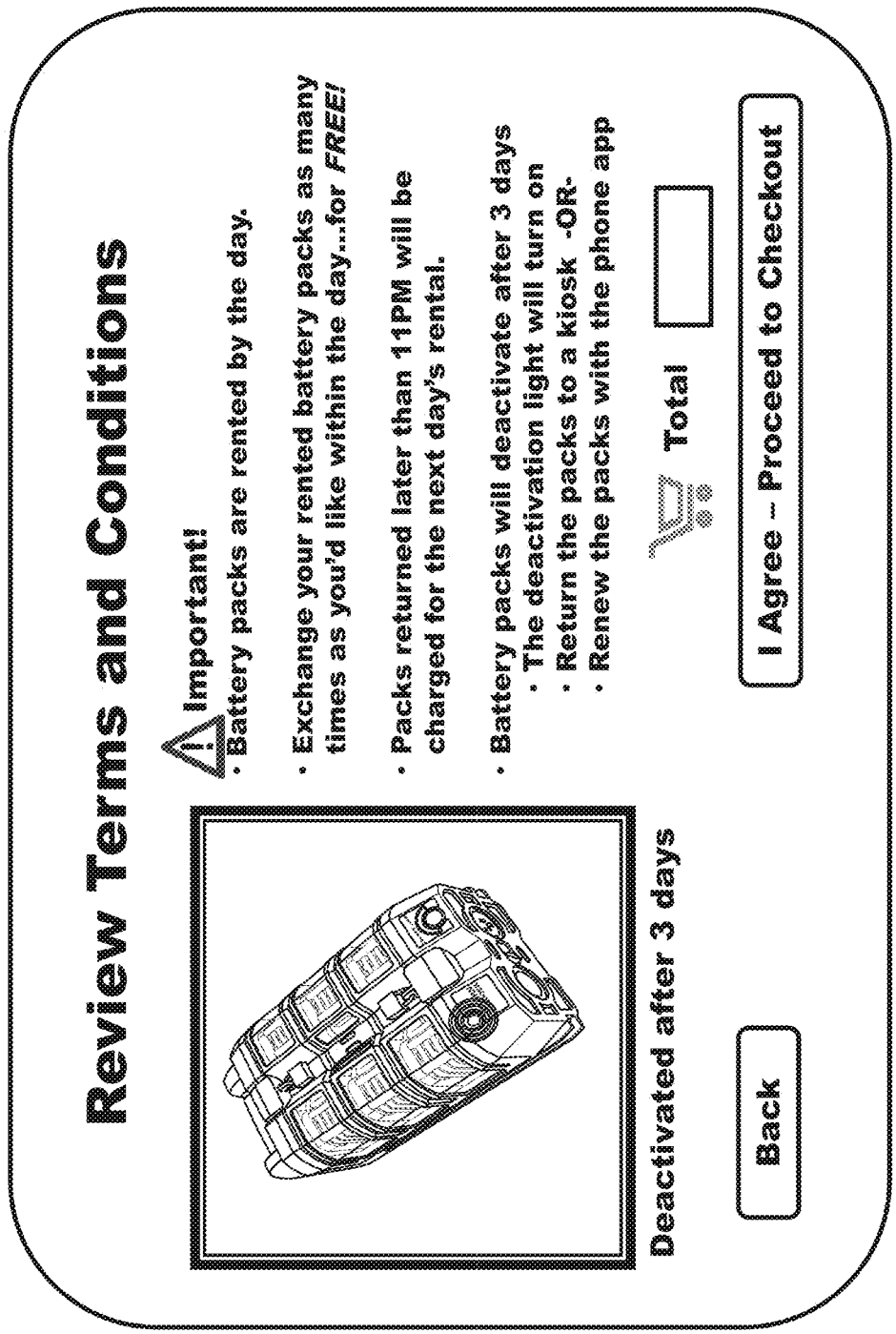
Figure 11D:
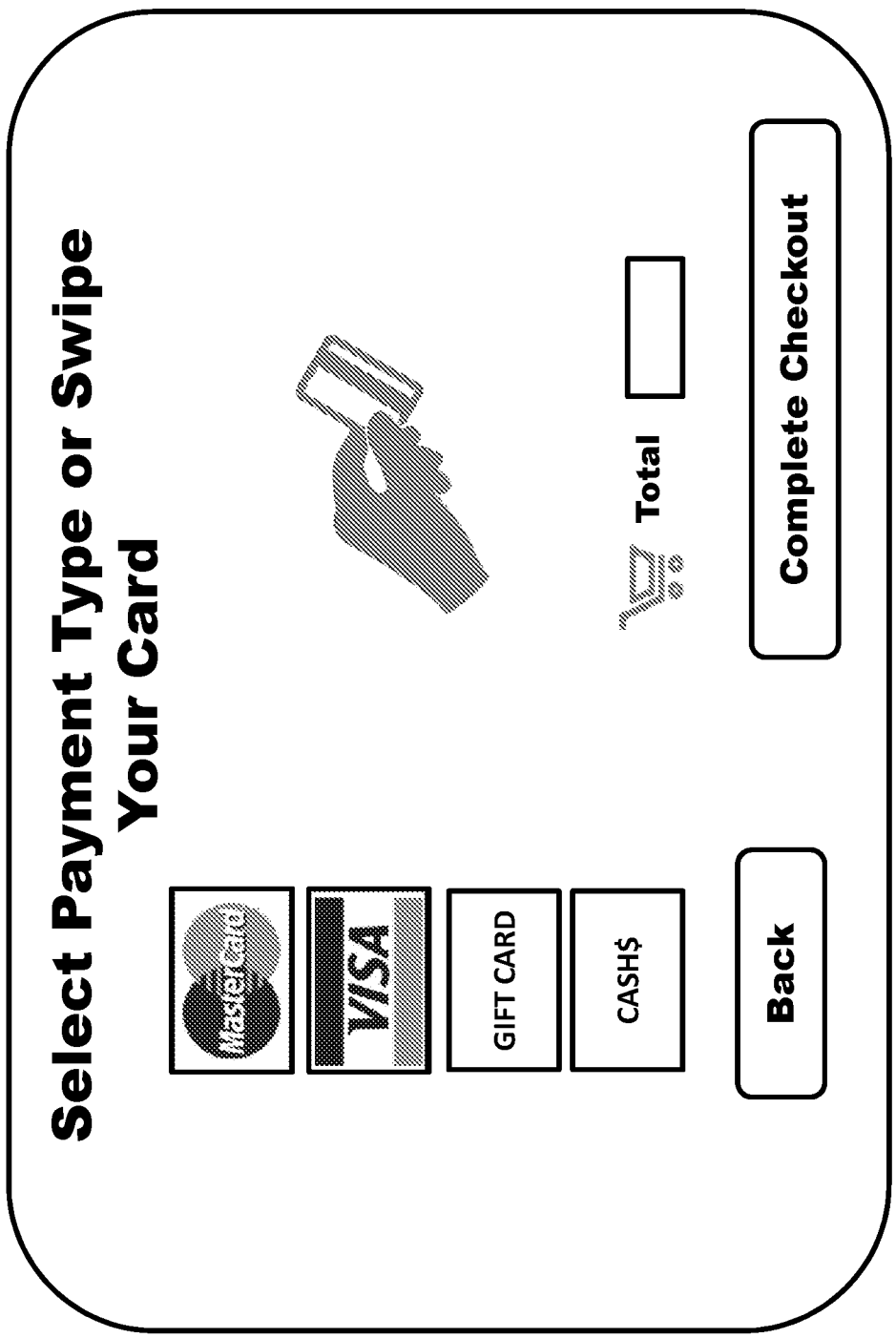

Referring to FIGS. 8 and 11A-11E, if, at step 408, the user selects Rental, the rental subroutine 410 is activated to enable the user to select and rent one or more carriers 200 and battery packs 300 for rental. At step 412 and FIG. 11A, the user interface prompts the user to select the number of carriers and battery packs for rental. As shown in FIG. 11A, the carriers and battery packs may be priced according to the number of packs in the carrier and the state of charge of the packs (e.g., 100%, 80%, 60%, etc.). The user may also be prompted to select the type of battery packs (e.g., voltage, wattage, capacity, etc.) and/or the rental duration (e.g., number of hours or days).

Figure 11E:
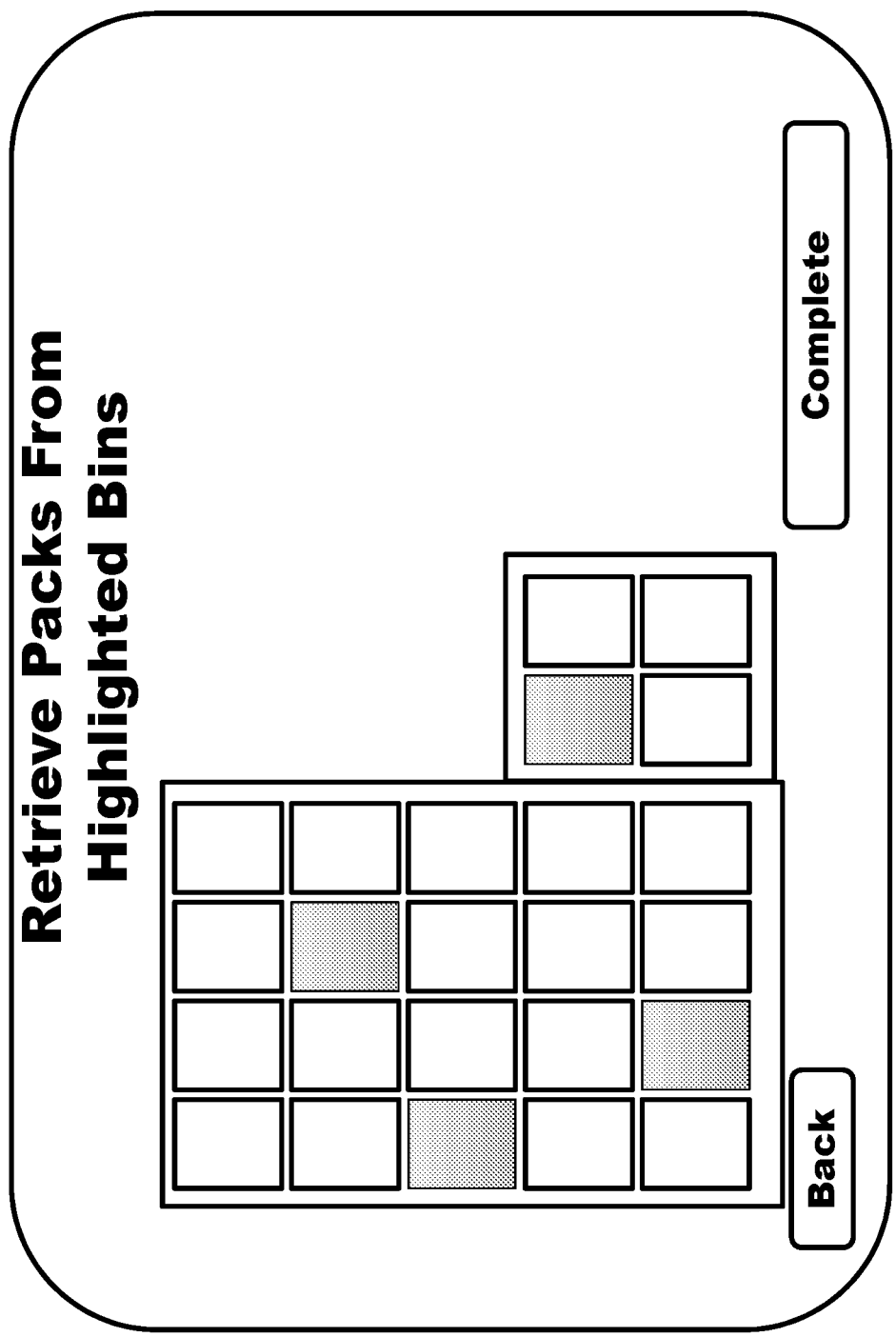

At step 414 and FIG. 11B, the user interface 110 prompts the user to review the selected rental battery packs that have been placed into an electronic shopping cart. At step 416 and FIG. 11C, the user interface 110 prompts the user to confirm agreement with the terms of a rental agreement. At step 418, the kiosk 110 may also provide the user with a notification of the rental due date (e.g., via a text message, an e-mail, or a printed receipt). At step 420 and FIG. 11D, the user interface 110 prompts the user to use the payment processing area to pay for the rental (e.g., via credit card, voucher, gift card, cash, corporate account, etc.). At step 422, the kiosk 110 places a hold on the user's account and/or credit card in an amount to ensure timely return of the rental battery packs (e.g., for the retail value of the carrier and battery packs). At step 424, the bin dispensing module 152 unlocks and/or opens one or more the bin doors 116 to enable the user, at step 426, to retrieve the rented carrier(s) and associated battery pack(s). As shown in FIG. 11E, the user interface 110 may indicate to the user which bin(s) have been unlocked. At step 428, the user closes the bin door(s), thus ending the transaction at step 429. A record of the rental transaction (including, e.g., an identifier of carrier and battery packs rented, payment information, credit card hold information, and user ID) is stored in the memory/database module 138, and may also be communicated by the external communications module 146 to a central server and/or to the user's computing device or mobile phone.

Return

Referring to FIGS. 8 and 12A-12D, if, at step 408, the user selects Return, the return subroutine 430 is executed to enable a user to return a previously rented carrier and associated battery packs. At step 432 and FIG. 12A, the user interface 110 prompts the user to identify the carriers and packs to be returned by swiping the credit card used in the previous transaction or by inputting a login ID and password. At step 434, the user interface 110 communicates the previous payment information to the central processing unit 140, which retrieves from the memory/database module 138 the record containing the identification information and quantify of the carriers 200 and battery packs 300 rented. At step 436 and FIG. 12B, the user interface 110 prompts the user to choose which ones and how many of the rented carriers and battery packs to return to the kiosk 100. At step 438 and FIG. 12C, the user interface 110 prompts the user to identify any of the rented battery packs 300 that may be damaged or underperforming.

Figure 12A:
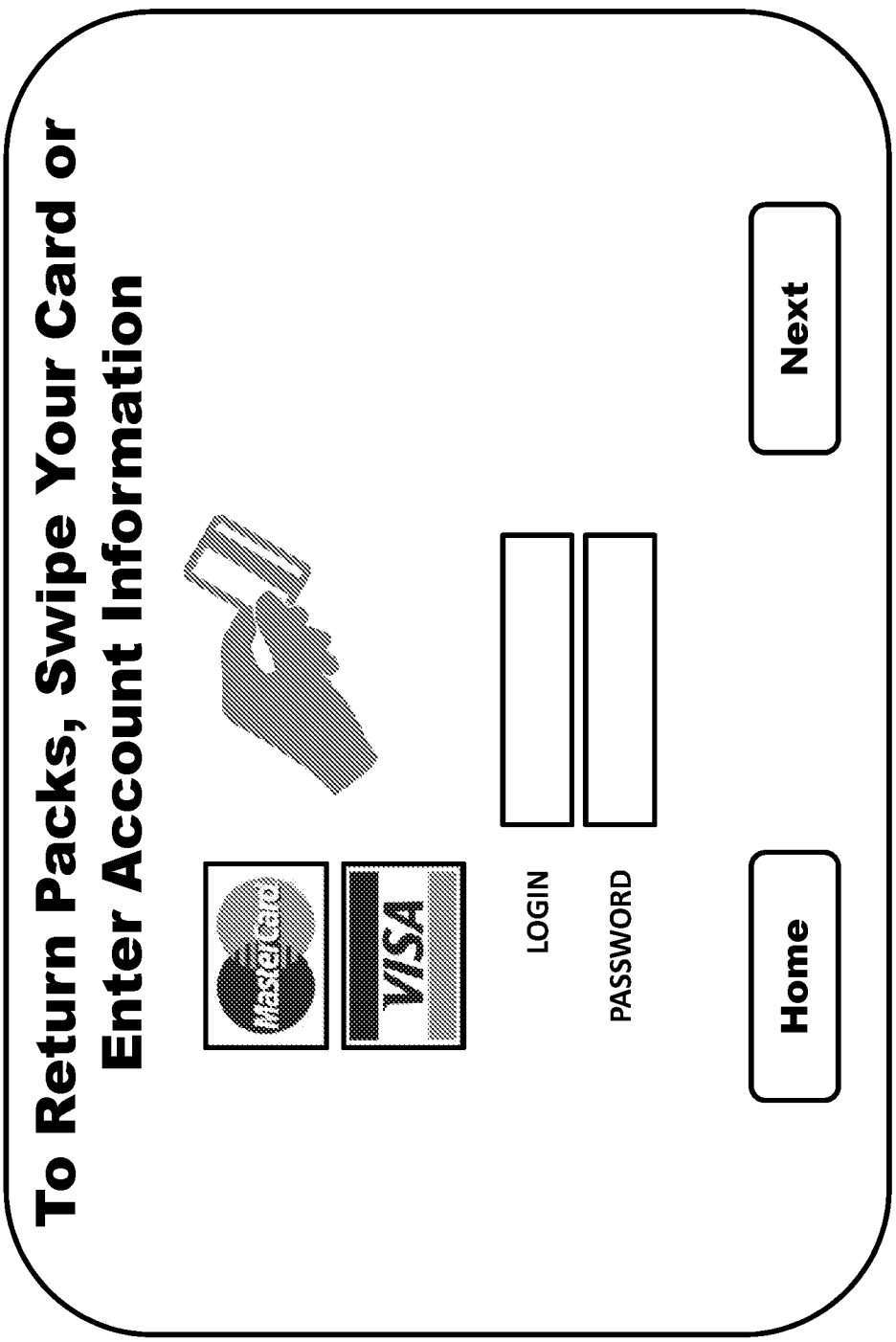
Figure 12D:
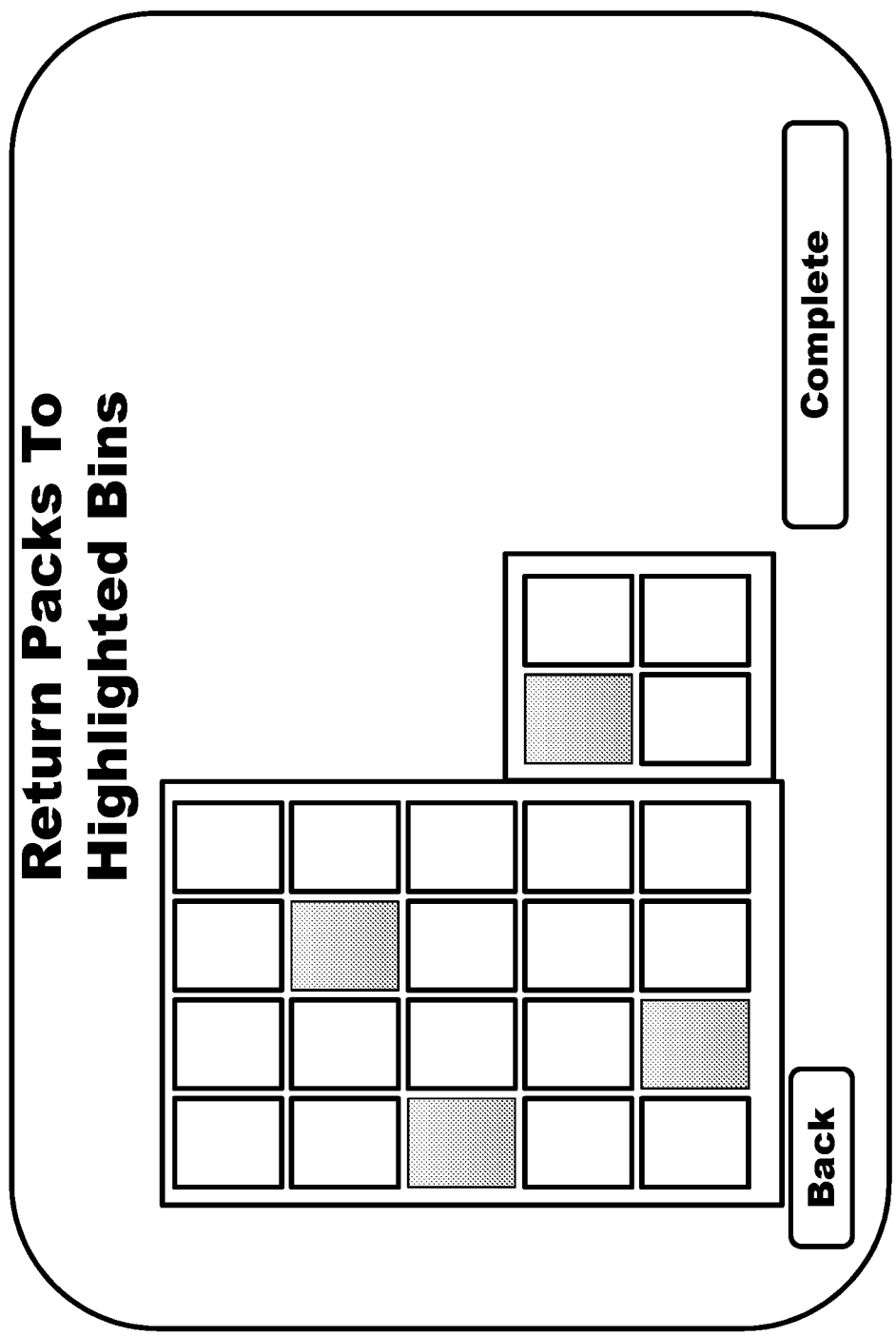

At step 440, the bin dispensing module 152 unlocks and/or opens one or more bin doors 116 to enable the user to return the carriers and battery packs. As shown in FIG. 12D, the user interface 110 identifies which bins 114 have been unlocked for return of the carriers 200 and battery packs 300. At step 442, the user returns the carriers 200 and battery packs 300 to the open bins 114. At step 444, the kiosk 100 verifies that the carriers 200 and battery packs 300 are the ones that should be returned. This can be performed, for example, by scanning a bar code or QR code on the carrier and/or battery packs, by sensing an RFID tag on the carrier and/or battery packs, or by identification of a electronic signal generated by the carriers and/or battery packs. At step 446, the central processing unit 140 causes the bin dispensing module 152 to lock the bin door(s) 116 to the bins 114 into which the carriers 200 and battery packs 300 have been returned. At step 448, the central processing unit 140 interfaces with the memory/database module 138 and the external communications module 146 to release the hold on the user's credit card or corporate account, thus terminating the return transaction at step 449.

Reserve

Referring to FIGS. 8 and 13A-13F, if, at step 408, the user selects Reserve, then the reserve subroutine 450 is executed to enable a user to reserve a rental carrier 200 and battery packs 300 for a later time. At step 452 and FIG. 13A, the user interface 110 prompts the user to select a future date and time for a reservation for a carrier 200 and battery packs 300. At step 454 and FIG. 13B, the user interface 110 prompts the user to select the number of carriers and battery packs for rental. The price may be based on the number of packs rented and their state of charge. In other implementations, the user may select the type of battery packs (e.g., voltage, wattage, capacity, etc.) and/or the rental duration (e.g., number of hours or days). At step 456 and FIG. 13C, the user interface 110 prompts the user to review an electronic shopping cart into which the rental selections have been placed. At step 458 and FIG. 13D, the user interface 110 prompts the user to confirm agreement with the terms of the rental agreement. At step 460, the kiosk 110 provides the user with a notification of the rental date and time (e.g., via a text message, an e-mail, or a printed receipt). At step 462 and FIG. 13E, the user interface 110 prompts the user to use the payment processing area to process a payment for the rental (e.g., via credit card, voucher, corporate account, etc.). At step 464, the kiosk 110 places a hold on the user's account and/or credit card in to hold the reservation. At step 466, the central processing unit 140 stores a record corresponding to the reservation in the memory/database module 138 and/or causes the external communications module 146 to place a record of the reservation in the central server 160, thus ending the Reserve transaction at step 468.

Figure 13A:
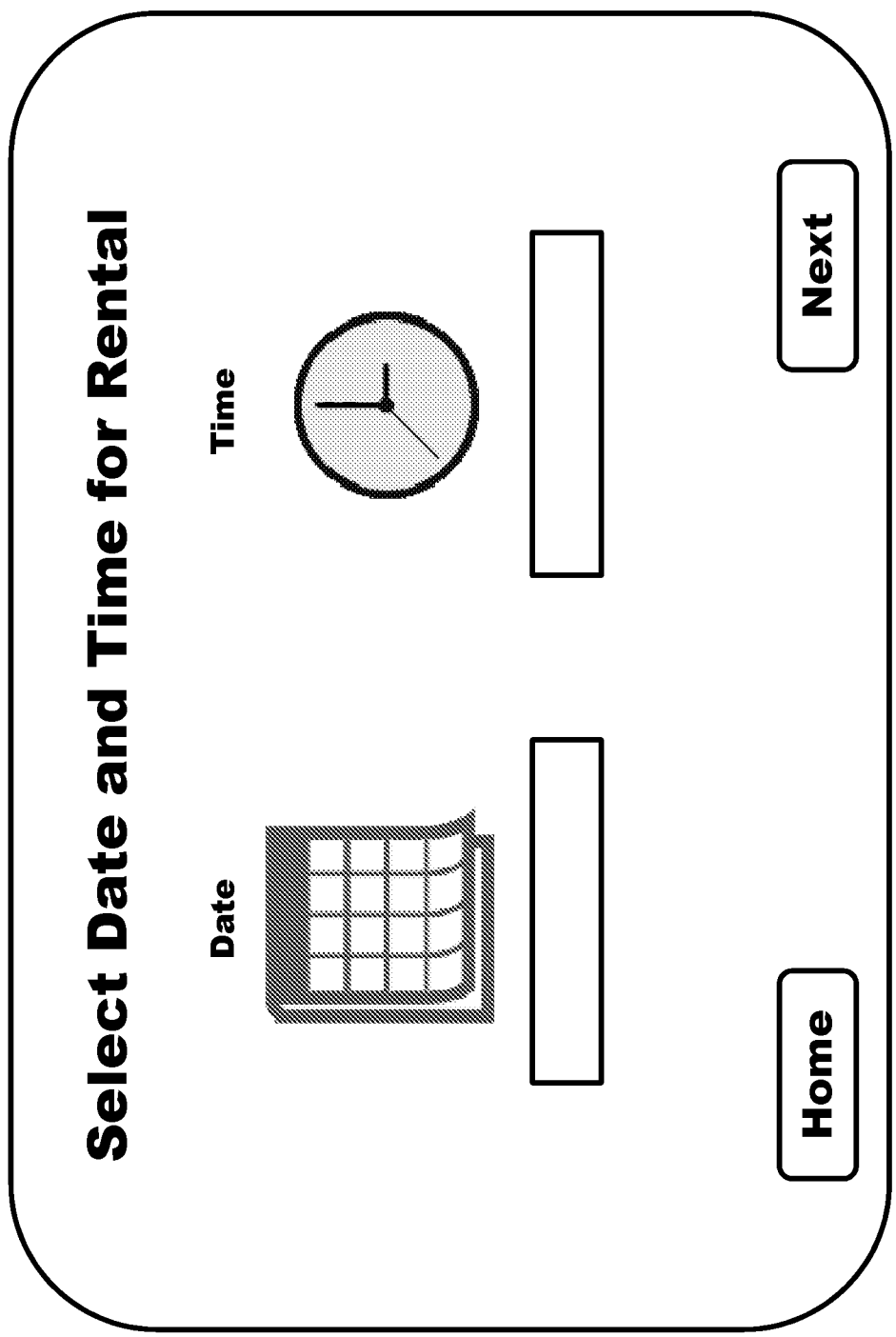
Figure 13B:
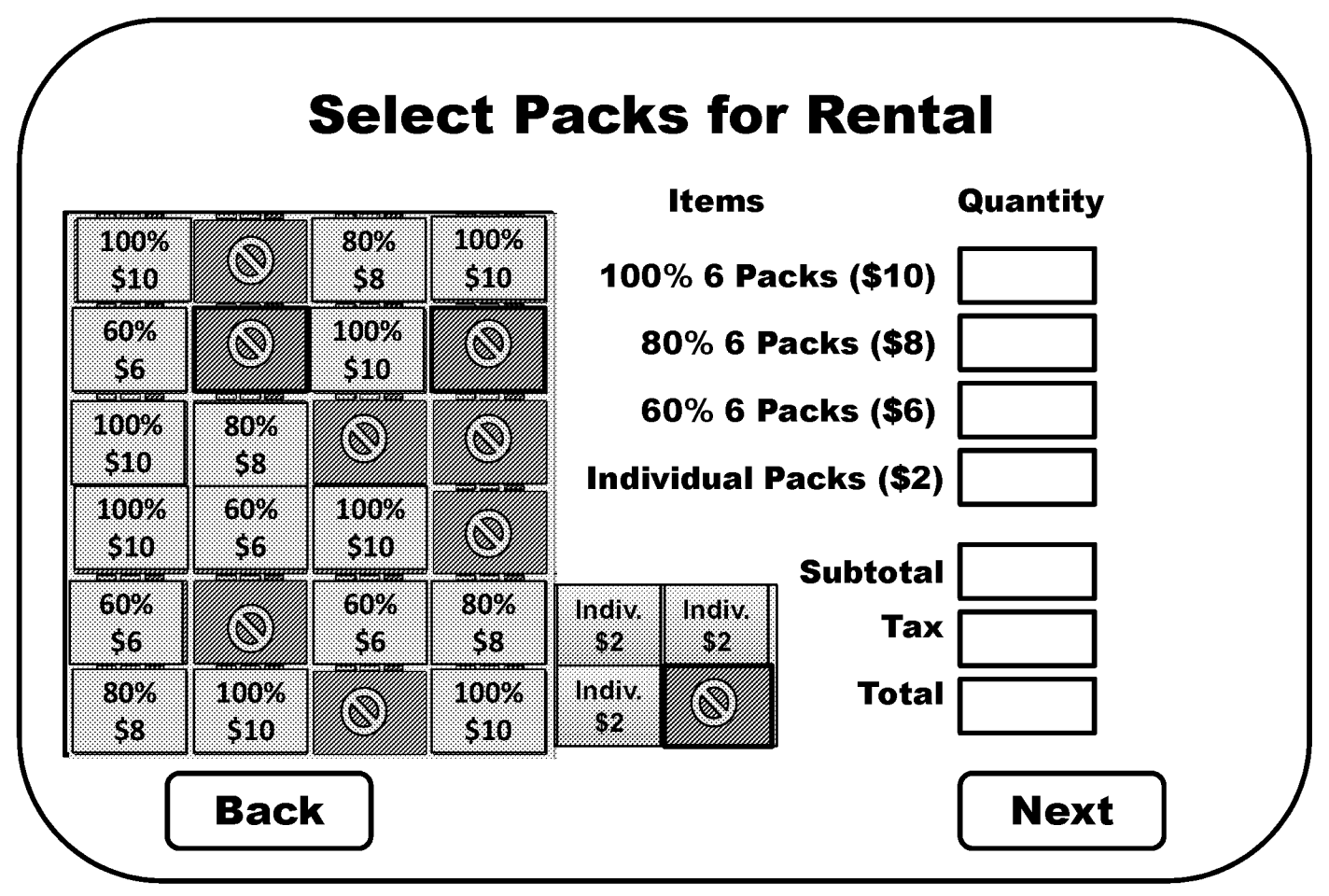
Figure 13C:
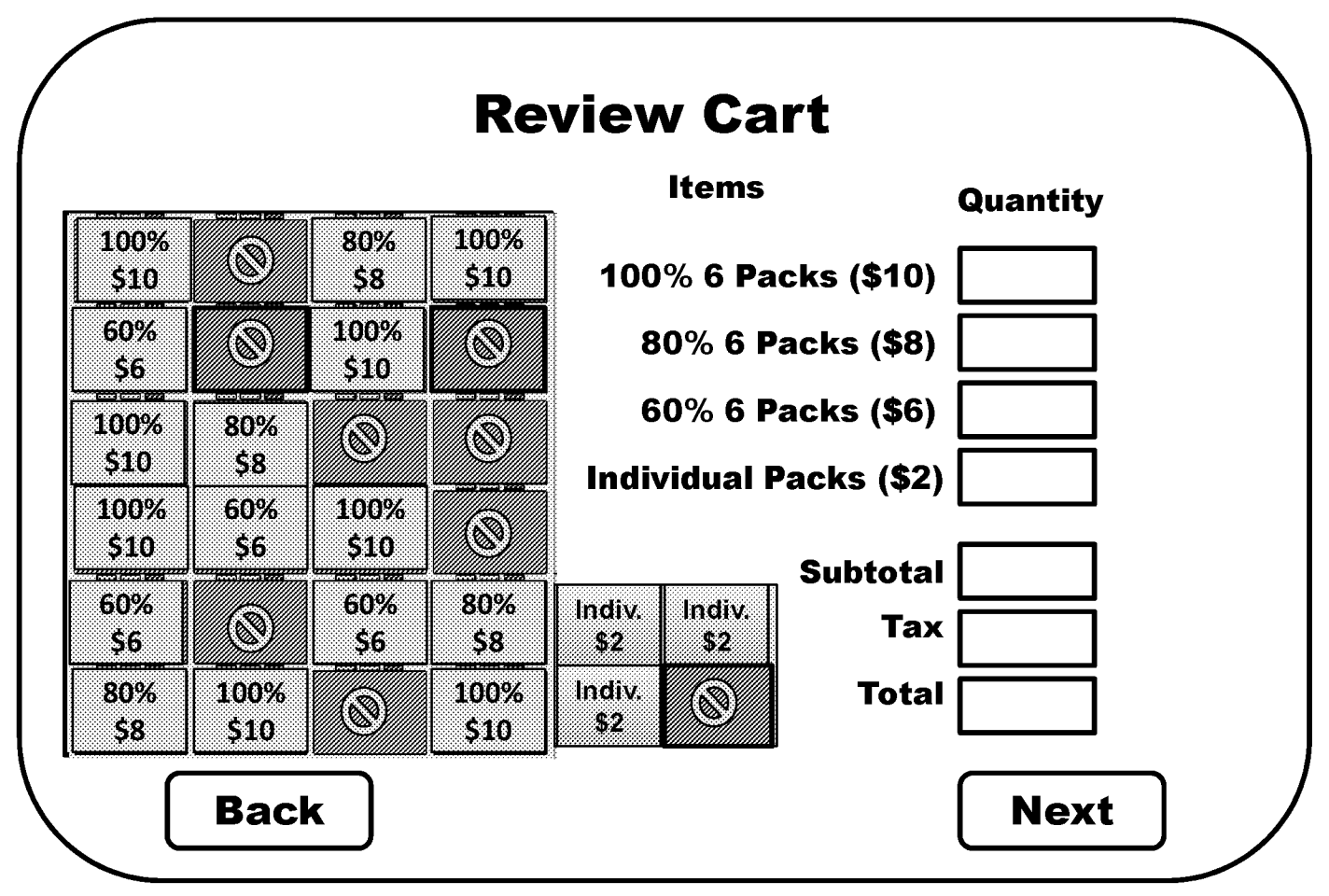
Figure 13E:
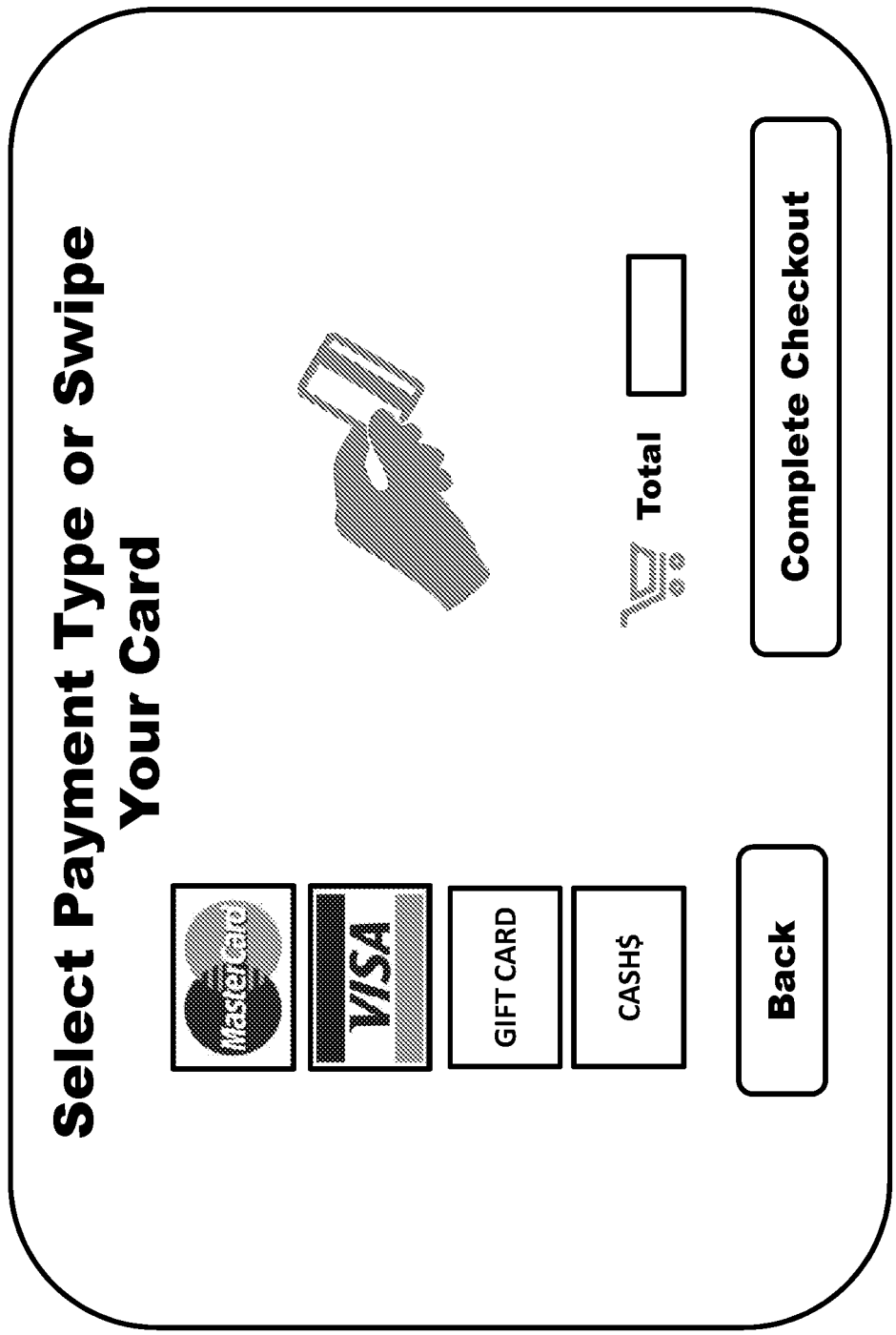
Figure 13F:
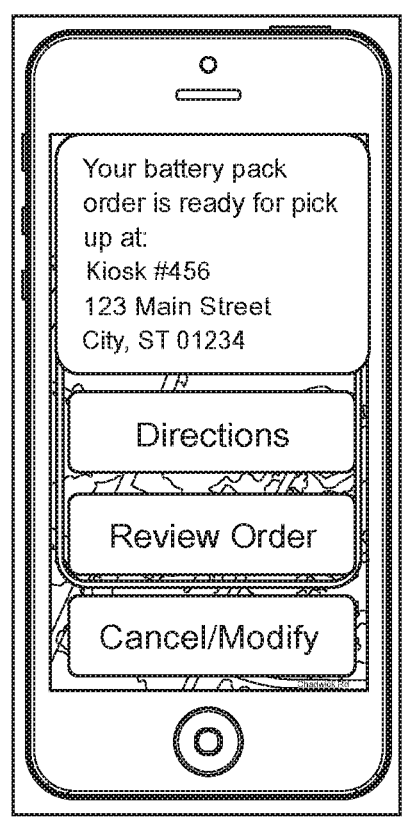

At step 470 and as shown in FIG. 13F, at a later time closer to the reservation date and time, the central processing unit 140 or the central server 160 causes an electronic reminder to be sent to the user, e.g., via text message, automated phone call, e-mail, or app notification. The user is given the option to obtain directions to the kiosk 100, review the order, or cancel or modify the order. The user then proceeds to the kiosk 100 to pick up the rented carriers and battery packs, as described below.

Pick-Up

Referring to FIGS. 8 and 14A-14D, in the Pick-Up subroutine, at step 472, the user arrives at the kiosk 100. At step 474 and FIG. 14A, the user interface 110 prompts the user to provide the payment method used for the previous transaction (e.g., by swiping the credit card used in the payment processing area 112) or to input an account login ID and password. At step 476, the user interface 110 communicates the previous payment information or account ID and password to the central processing unit 140, which retrieves from the memory/database module 138 or a central server 160 a record containing identification information and quantity of the carriers 200 and battery packs 300 that have been reserved. At step 478 and FIG. 14B, the user interface 110 prompts the user to rent additional carriers and battery packs (as described above with respect to the Rental subroutine) or purchase additional goods (as described below with respect to the Retail subroutine). At step 480 and FIG. 14C, the user interface 110 prompts the user to review the shopping cart, which now includes any additional rental battery packs or retail goods that have been ordered.

Figure 14A:
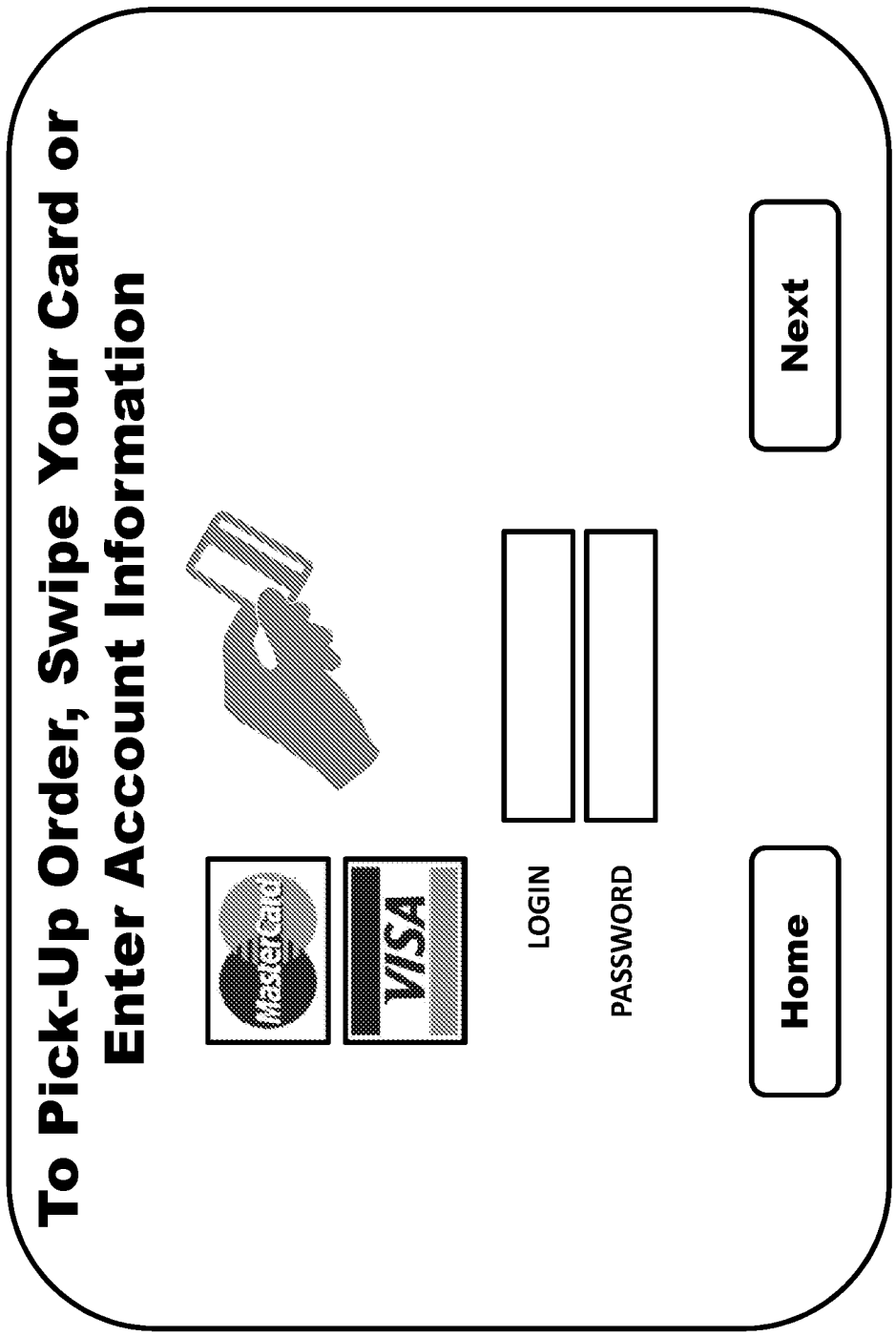
Figure 14B:
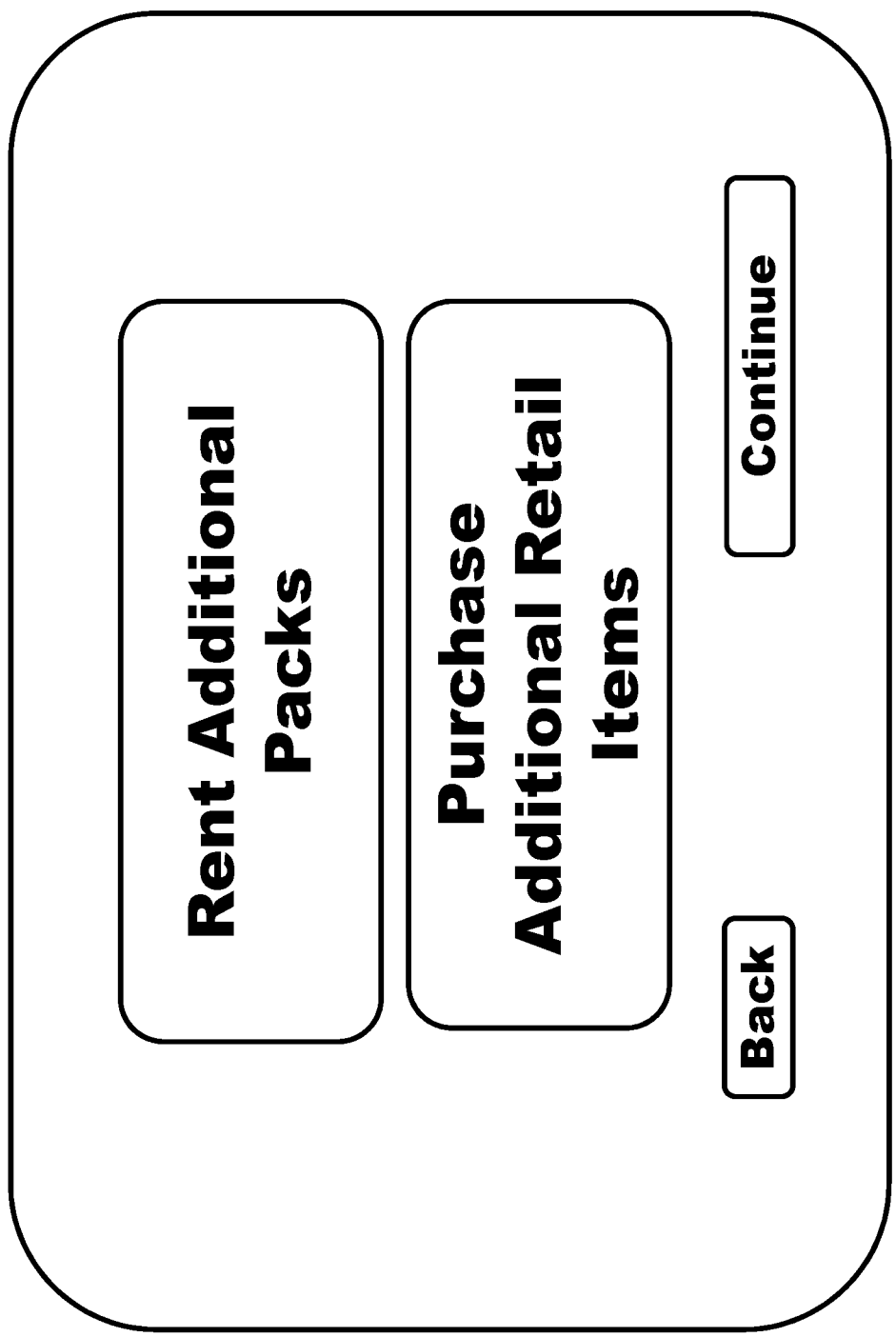
Figure 14C:
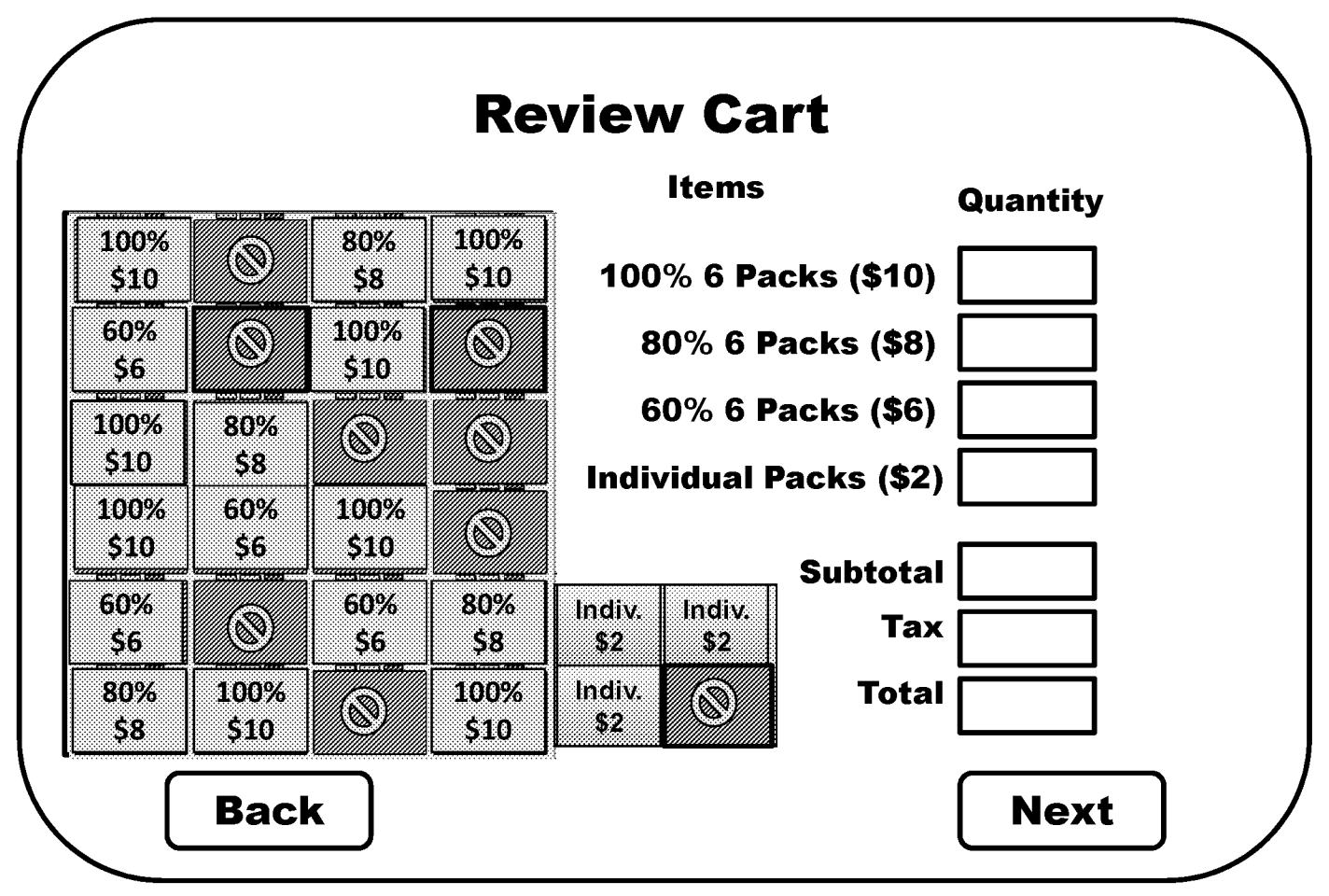
Figure 14D:
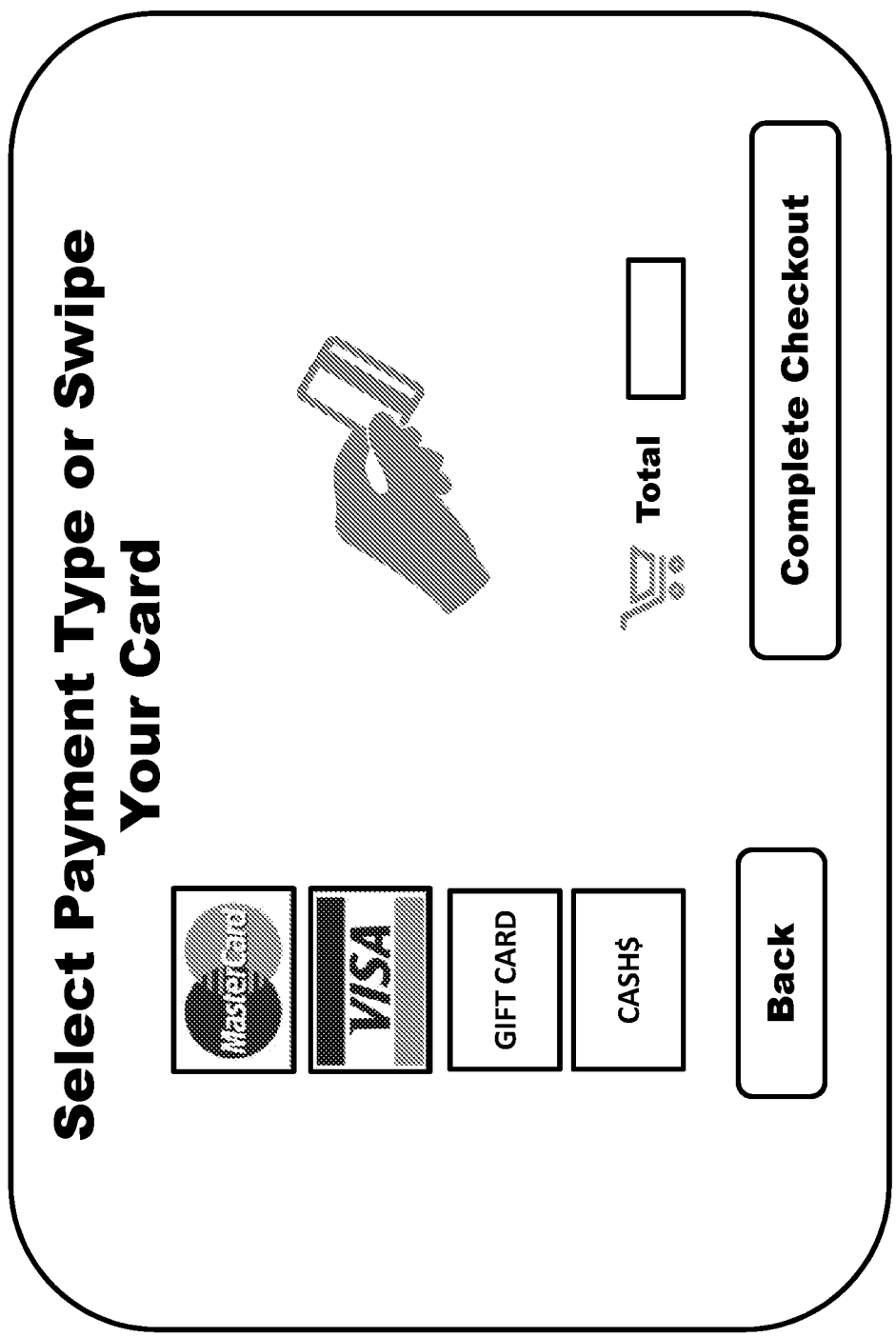
Figure 14E:
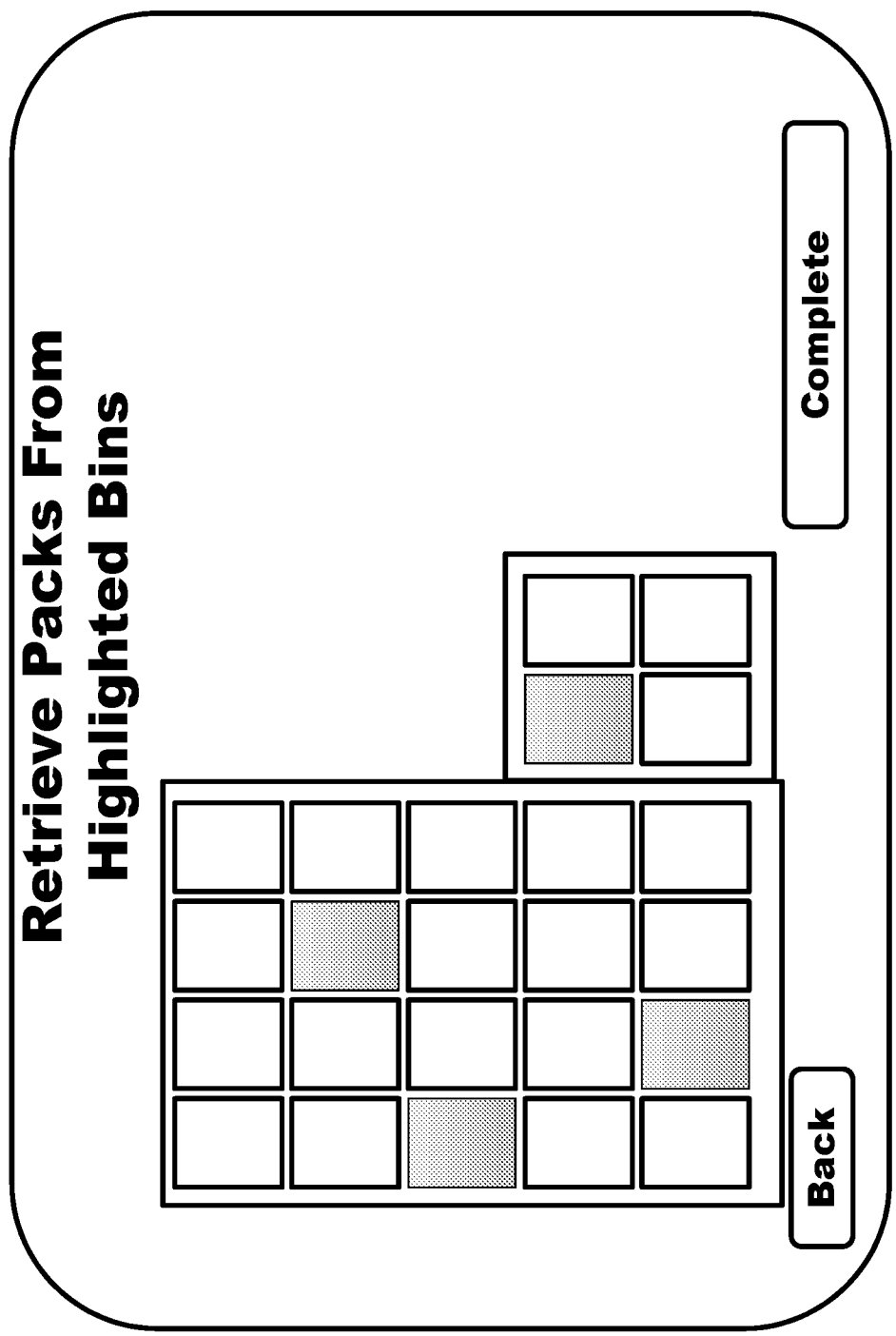
Figure 15A:
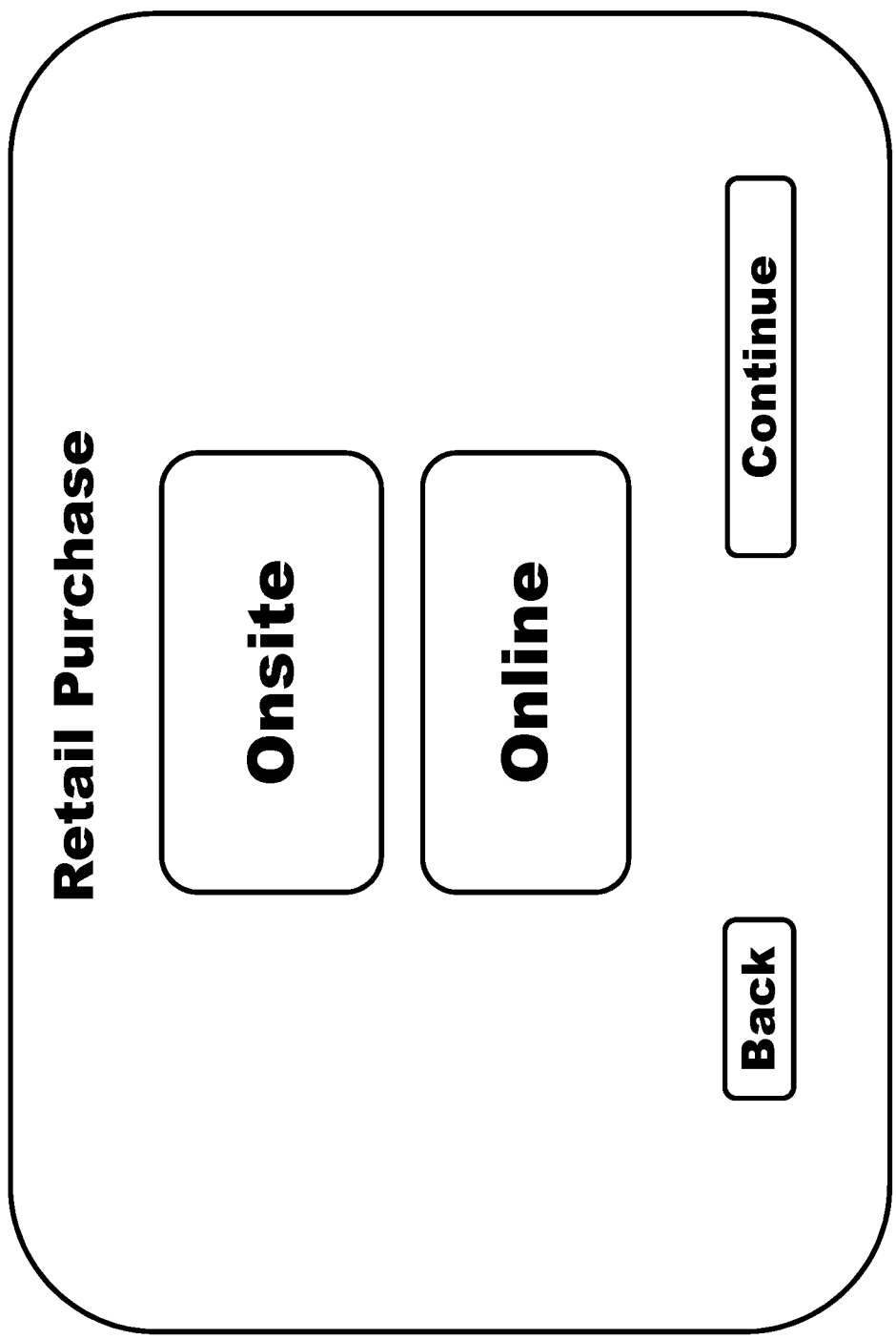
Figure 15D:
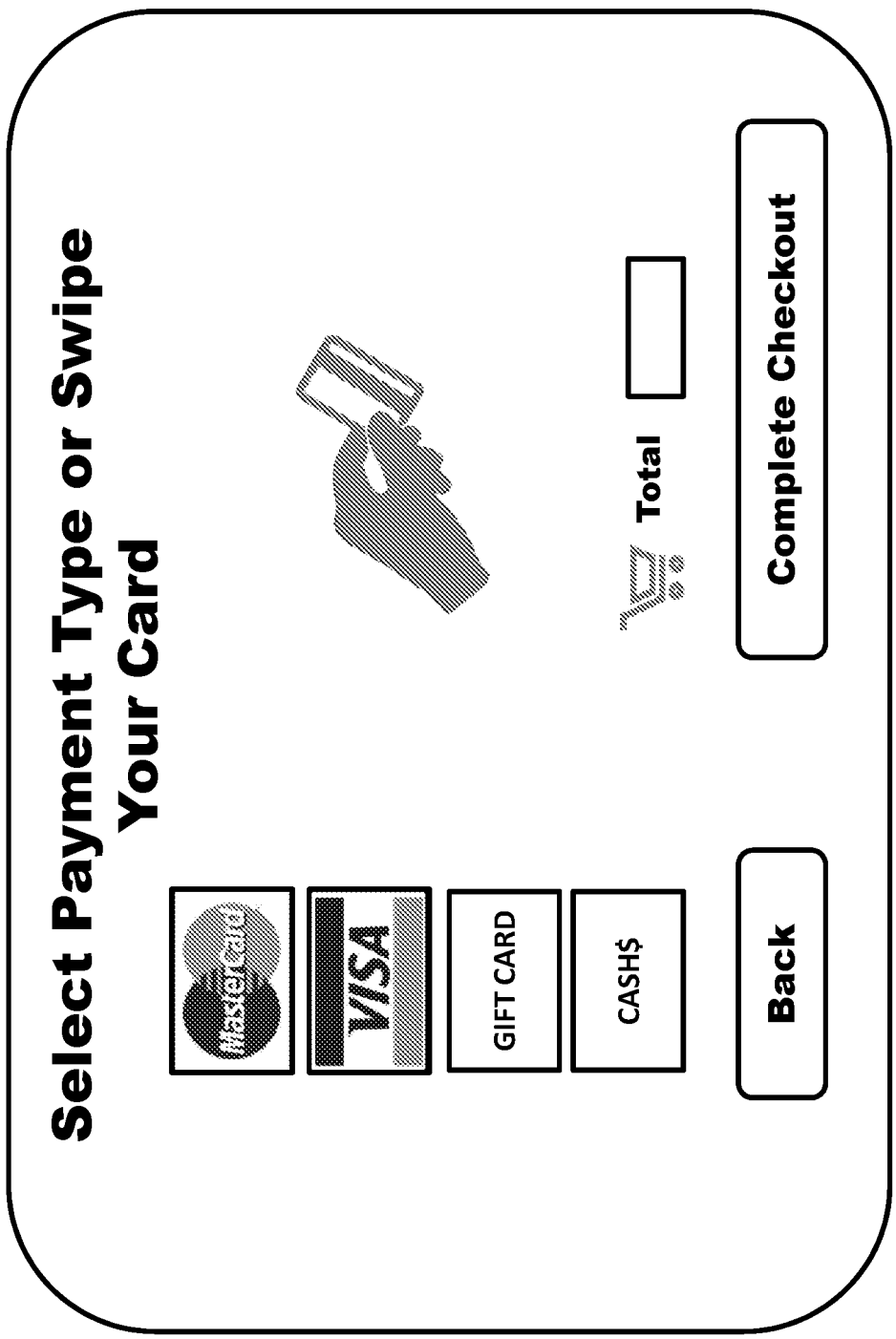
Figure 15E:
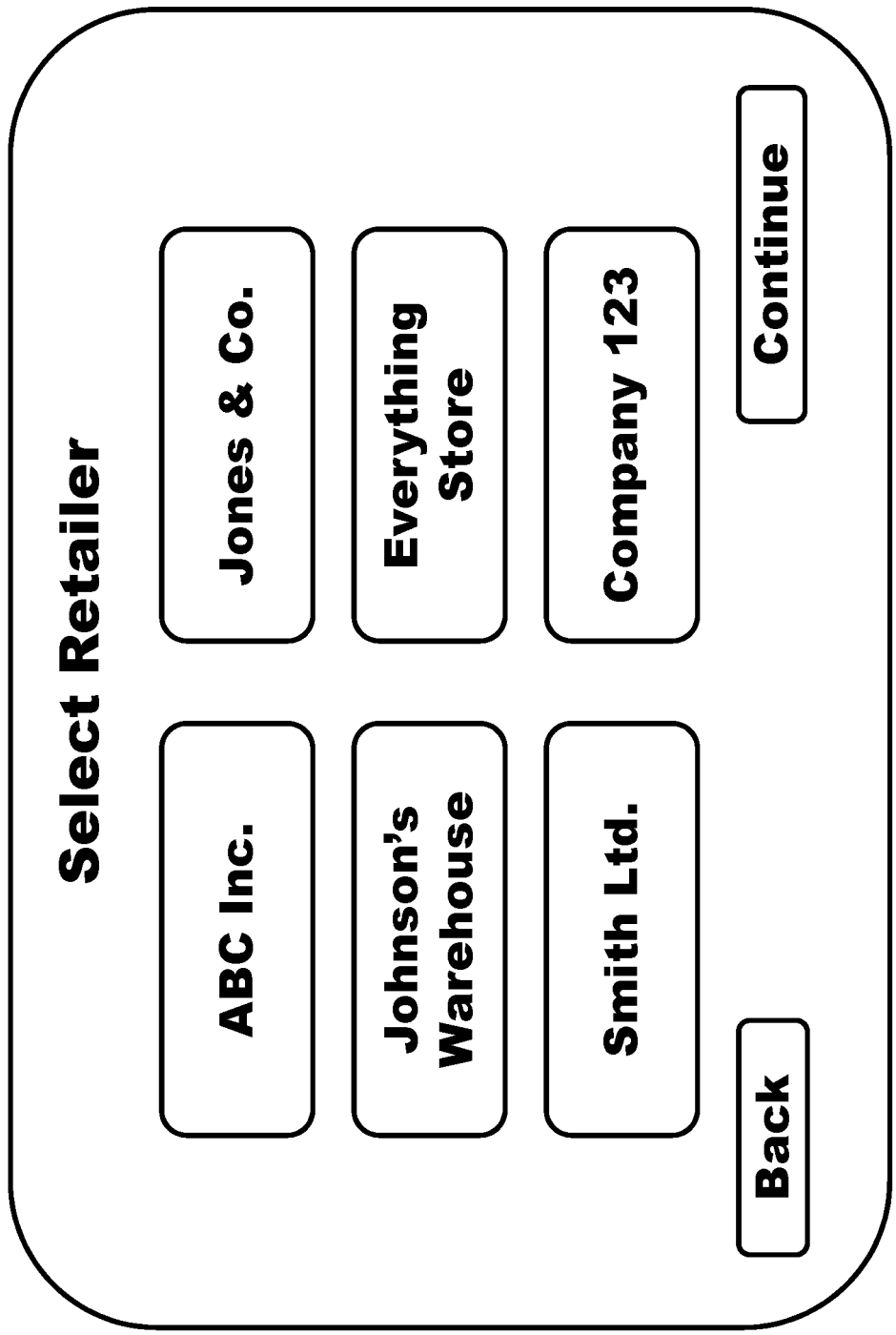
Figure 15F:
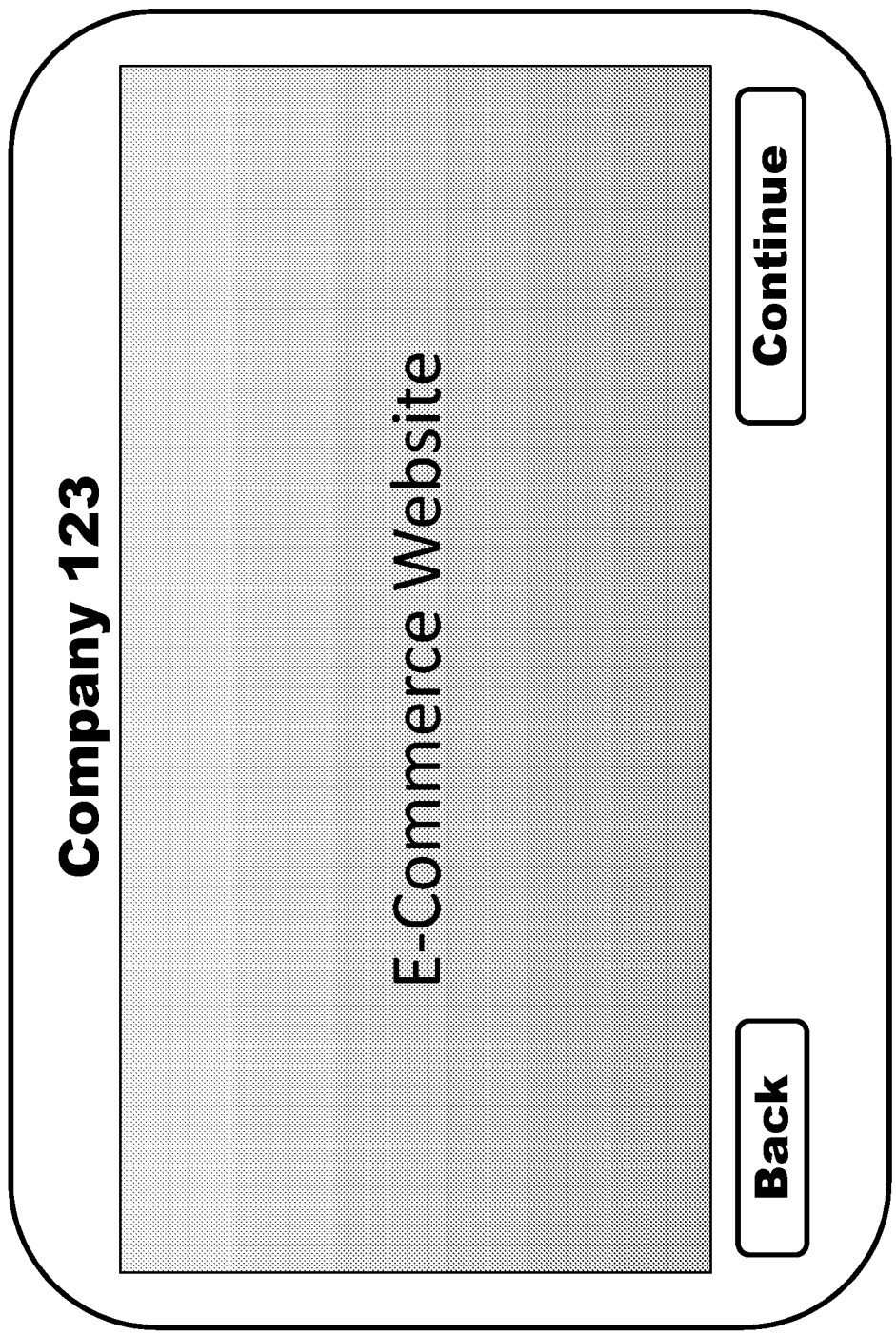
Figure 15G:
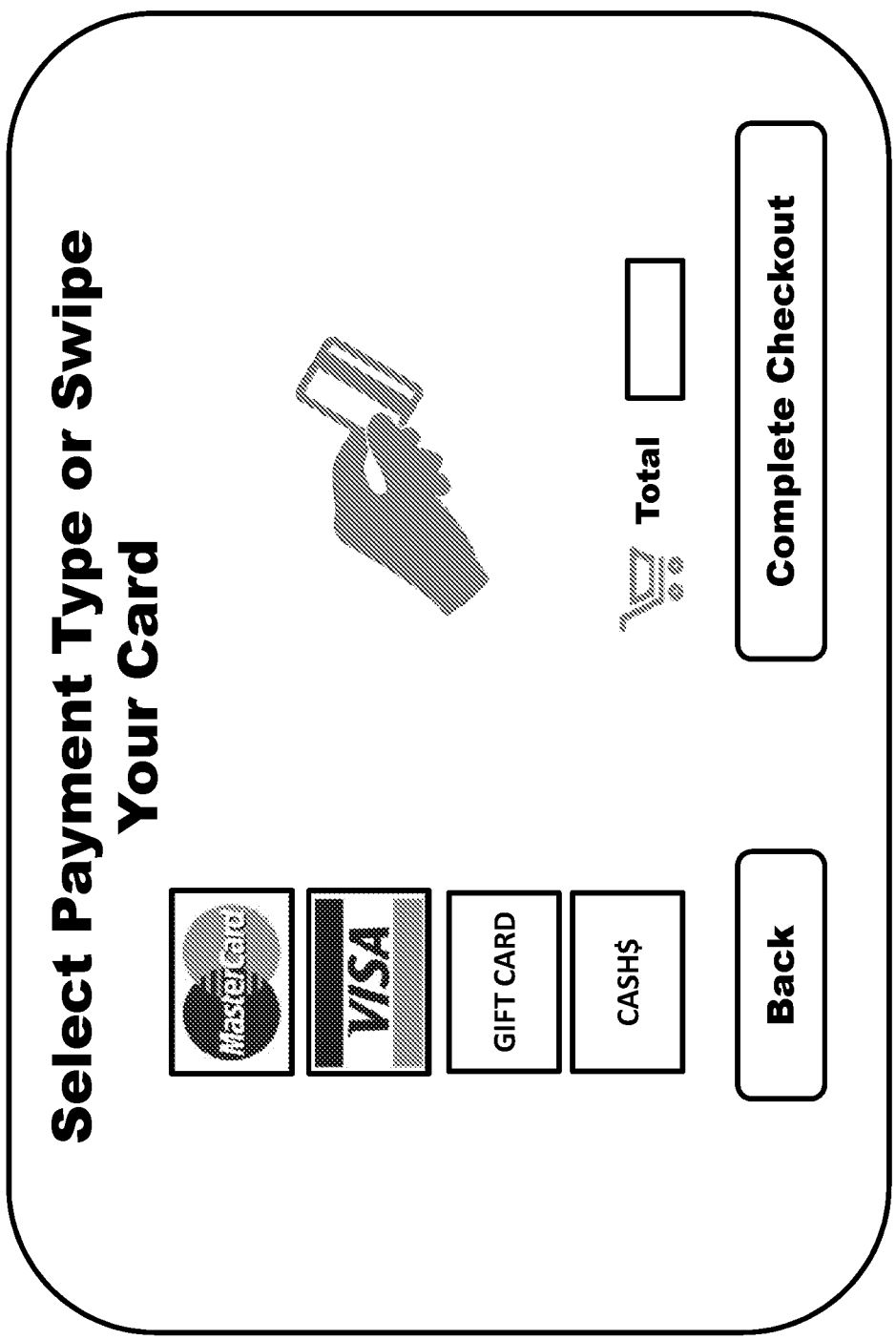

At step 482 and FIG. 14D, the user interface 110 prompts the user to use the payment processing area to process a payment for the additional rental or retail goods (e.g., via credit card, voucher, corporate account, cash, etc.). At step 484, the bin dispensing module 152 unlocks and/or opens one or more the bin doors 116 to enable the user, at step 486, to retrieve the rented carrier(s) 200 and associated battery pack(s) 300. As shown in FIG. 14E, the user interface 110 indicates to the user which bin(s) have been unlocked. At step 488, the user closes the bin door(s), thus ending the transaction at step 489. A record of the transaction (including, e.g., identifier of carrier and battery packs rented, payment information, credit card hold information, and user ID) is stored in the memory/database module 138, and may also be communicated by the external communications module 146 to the central server and/or to the user's computing device or mobile phone.

Retail

Referring to FIGS. 9 and 15A-15G, if, at step 408, the user selects Retail, then the retail subroutine 490 is executed to enable a user to purchase retail products through the kiosk 100. At step 492 and FIG. 15A, the user interface 110 prompts the user to select between Onsite purchases and Online purchases. If, at step 492, the user selects Onsite, then the Onsite subroutine 494 is executed. At step 495 and FIG. 15B, the user interface 110 prompts the user to select the item and quantity from among the items available for immediate sale in the retail vending area 108. At step 496 and FIG. 15C, the user interface 110 prompts the user to review the selected items that have been placed into an electronic shopping cart. At step 498 and FIG. 15D, the user interface 110 prompts the user to use the payment processing area 112 to process a payment for the purchase (e.g., via credit card, voucher, corporate account, cash etc.). At step 500, the kiosk 100 dispenses the item and provides a receipt for the purchase (e.g., via electronic mail, text message, or printed receipt), thus ending the transaction at step 502. A record of the transaction (including, e.g., identifier of items purchased, payment information, user ID, etc.) may be stored in the memory/database module 138, and may also be communicated by the external communications module 146 to the central server and/or to the user's computing device or mobile phone.

If, at step 492, the user selects Online, then the online subroutine 504 is executed to enable a user to purchase retail products not available onsite in the kiosk 100. At step 506 and FIG. 15E, the user interface 110 may prompt the user to select from among a plurality of manufacturers or retailers of products similar to those sold in the kiosk. At step 508 and FIG. 15F, the user interface 110 may display an online e-commerce website of a selected manufacturer or retailer of products to enable online ordering just as one would do on the traditional e-commerce website. For example, the external communications module 146 may communicate, via the internet, and download to the user interface 110 the e-commerce website of the selected manufacturer or retailer or a specially designed e-commerce app or interface for display on the user interface 110. The user then shops on the e-commerce website for the desired goods to be purchased. At step 510 and FIG. 15G, the user interface 110 prompts the user to use the payment processing area 112 to process a payment for the purchase (e.g., via credit card, voucher, corporate account, cash, etc.). The machine then dispenses a receipt for the purchase (e.g., via electronic mail, text message, or printed receipt), thus ending the transaction at step 512. A record of the transaction (including, e.g., identifier of items purchased, payment information, user ID, etc.) may be stored in the memory/database module 138, and may also be communicated by the external communications module 146 to the central server and/or to the user's computing device or mobile phone.

Information

Figure 16:
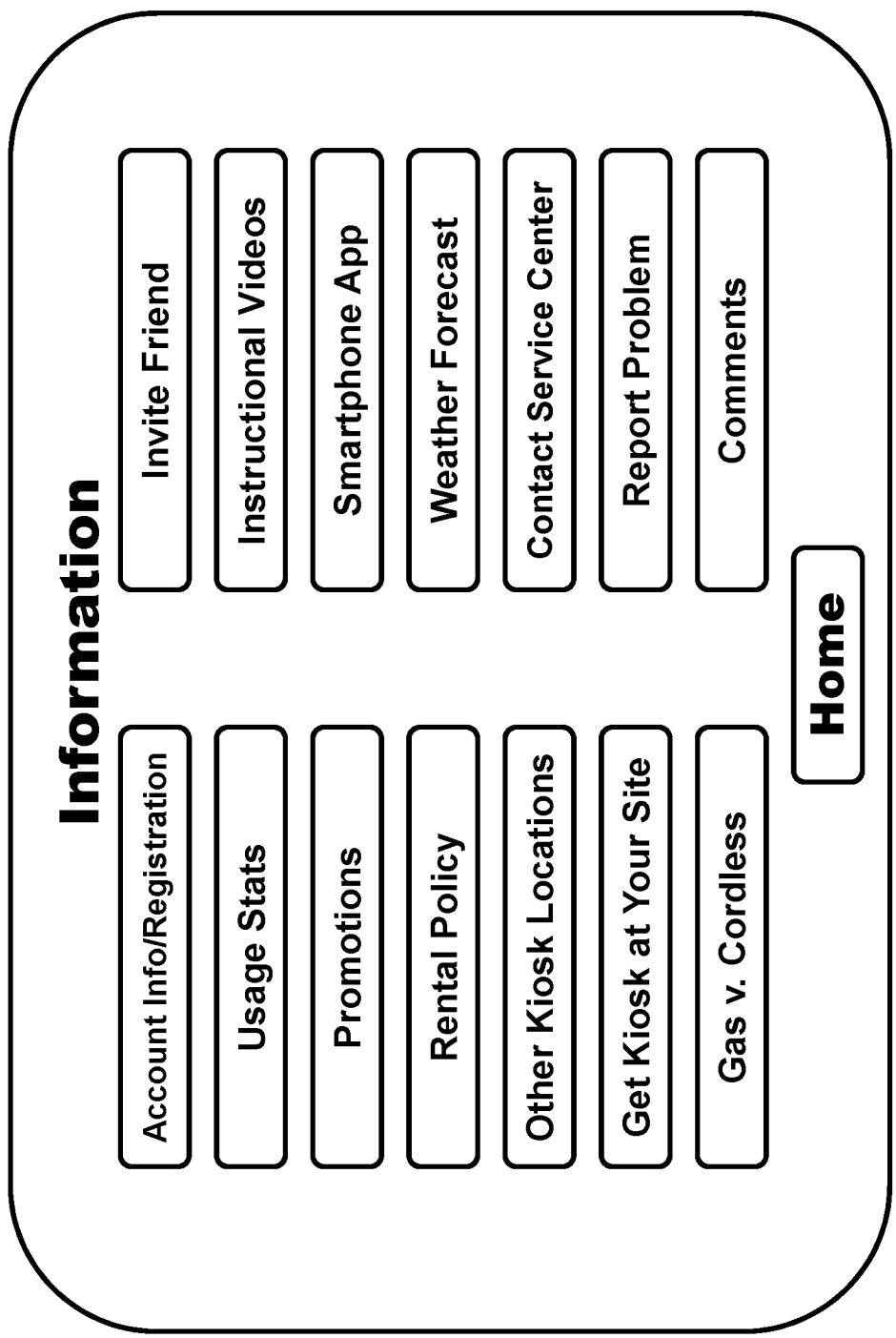

Referring to FIGS. 9 and 16, if, at step 408, the user selects Info, then the information subroutine 520 is executed to enable a user to obtain certain information and assistance via the user interface 110. In the information subroutine 520, and as shown in FIG. 16, the user interface 110 prompts the user to select among a menu of information options, including at least one or more of the following options. For each option, the information displayed on the user interface 110 may be stored locally in the memory/database module 138 or remotely at a central server 160 or elsewhere on the internet, and may be retrieved by instructions from the central processing unit 140 and/or external communications module 146, and displayed on the user interface 110 by the user interface control module 144.

At option 522, the user interface 110 enables the user to register for an account or review and modify account information such as user ID, password, credit card, corporate account number, etc. At option 524, the user interface 110 enables the user to review his or her history for battery pack rental usage. At option 526, the user interface 110 enables the user to view targeted advertising and promotions, such as video promotions directed to products similar to those previously purchased by that user. At option 528, the user interface 110 allows the user to review the battery pack rental agreement policy. At option 530, the user interface 110 allows the user to view other kiosk locations, and to review the inventory for battery pack rentals and retail vending at these other locations. At option 532, the user interface 110 enables the user to obtain information about obtaining a kiosk at a new location, such as a worksite or jobsite. At option 534, the user interface 110 enables the user to compare the cost of operating gas powered power tools vs. the cost of battery pack rentals for cordless power tools.

At option 536, the user interface 110 allows the user to send an invitation (such as an e-mail or text message) to friends or colleagues, inviting them to try the kiosk. At option 538, the user interface 110 displays instructional videos, such as how to use the carrier, how the battery pack rentals work, etc. At option 540, the user interface 110 links to an app store or displays a QR code that can be scanned by the user's smartphone, to enable the user to download an app to allow for interaction with the kiosk 110, as described below. At option 542, the user interface 110 allows the user to view a local weather forecast. At option 544, the user interface 110 allows the user to contact a service center (e.g., via electronic mail or live online chat). At option 546, the user interface 110 allows the user to report a problem with the kiosk or the rental carriers or battery packs. At option 548, the user can complete a form to leave a comment or suggestion for the owner of the kiosk.

Figure 17:
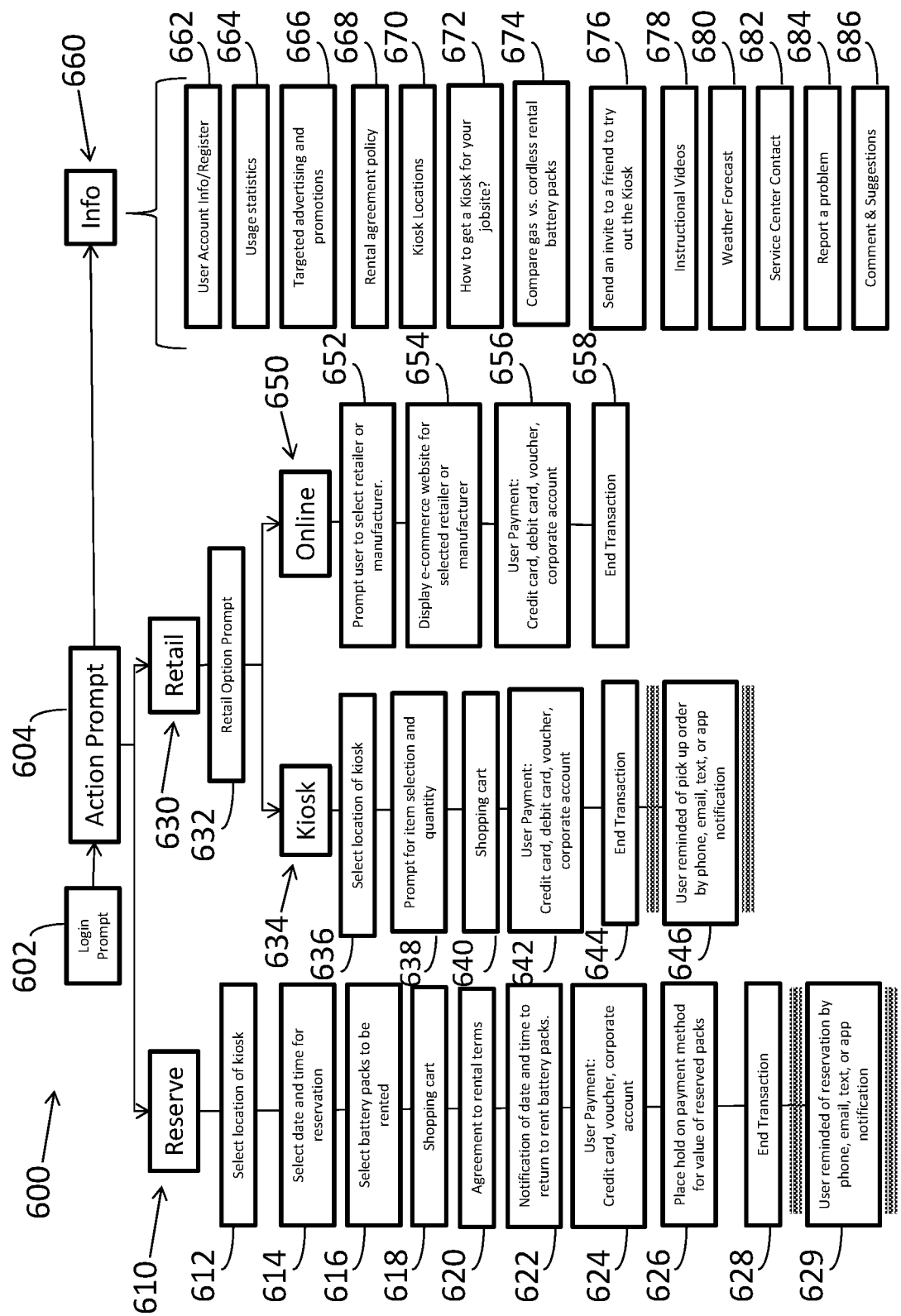
FIG. 17 is another exemplary flow chart for operation of the rental system of FIG. 1.

Referring to FIGS. 17-22, modified versions of the Reserve, Retail, and Info transactions may be implemented remotely on a mobile smartphone or tablet computer app or on a website accessed via a user's personal computer. The smartphone, tablet, or personal computer communicates, via a telecommunications network, with one or more kiosks 100 and/or with one or central servers, as illustrated in FIG. 6. The smartphone app will be described in detail below. However, it should be understood that a tablet app or a website can be implemented with similar functionality. FIG. 17 is a flow chart 600 that illustrates some of the functionality of an app. FIGS. 18-22 are smartphone screenshots that illustrate some of the functionality of an app. These and other implementations are within the scope of this disclosure.

Figure 18B:
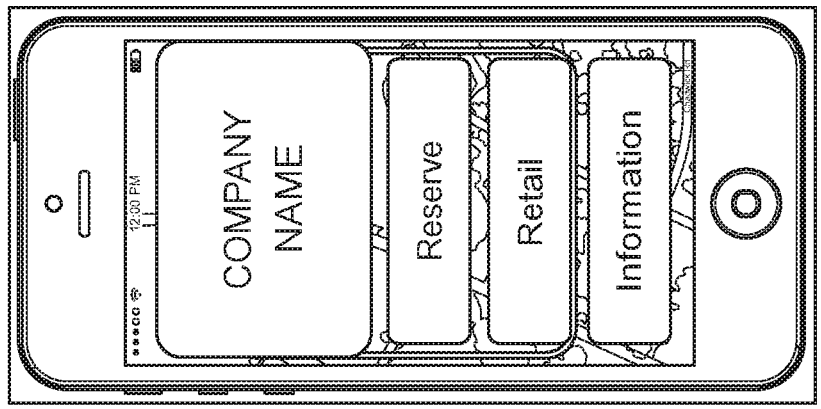
FIGS. 18A-22 are exemplary screen shots of another user interface for use with the rental system of FIG. 1, related to the flow charts of FIG. 17.
Figure 18A:
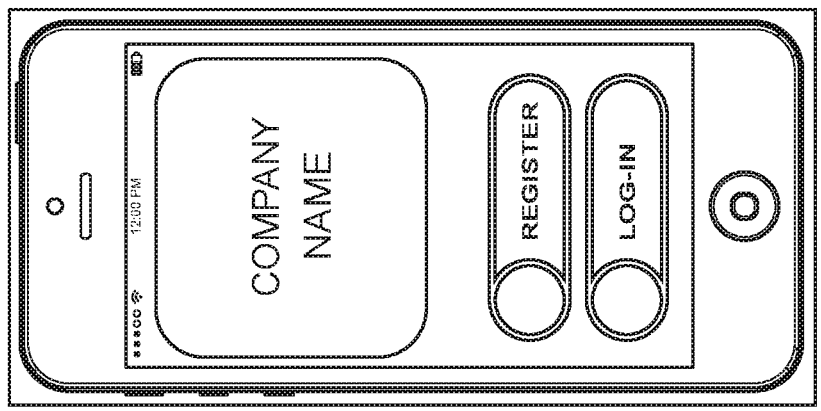

Referring to FIGS. 17 and 18A-18B, the user first selects a type of transaction to be performed. At step 602, and FIG. 18A, an action prompt requests that the user sign in with an existing user ID and password or register with a new user ID or password. At step 604 and FIG. 18B, the main menu prompts the user to select among several actions: Reserve, Retail, and Information.

Reserve

Referring to FIGS. 17 and 19A-19G, if, at step 604, the user selects Reserve, then the reserve subroutine 610 is executed to enable a user to reserve a rental carrier 200 and battery packs 300 for pick up from a kiosk 100 at a later time. At step 612 and FIG. 19A, the app prompts the user to select a geographic location for a kiosk 100. The app may access the smartphone's location services to find the kiosks located closest to the user at that time. Alternatively, the user may be prompted to enter an address or zip code to find the kiosks 100 closest to the particular address or zip code. The kiosks may be viewed in a map view or by address. At step 614 and FIG. 19B, the app prompts the user to select a future date and time for a reservation for renting carriers 200 and battery packs 300. At step 454 and FIG. 19C, the app prompts the user to select the number of carriers and battery packs for rental. The price may be based on the number of packs rented and their state of charge. In other implementations, the user may select the type of battery packs (e.g., voltage, wattage, capacity, etc.) and/or the rental duration (e.g., number of hours or days). At step 618 and FIG. 19D, the app prompts the user to review an electronic shopping cart into which the rental selections have been placed. At step 620 and FIG. 19E, the app prompts the user to confirm agreement with the terms of the rental agreement.

Figure 19C:
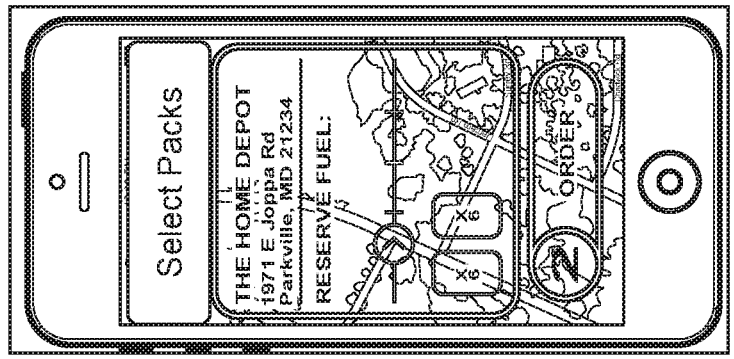
Figure 19B:
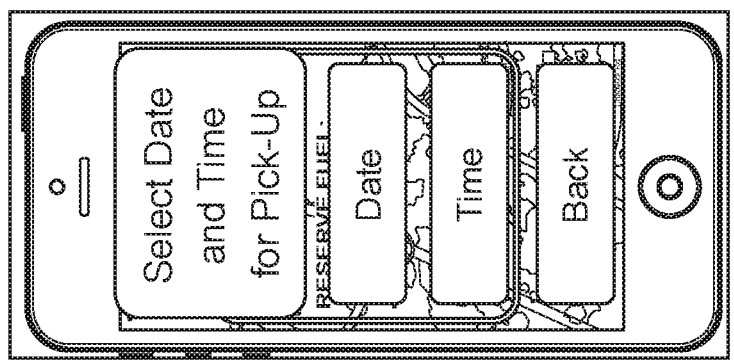
Figure 19A:
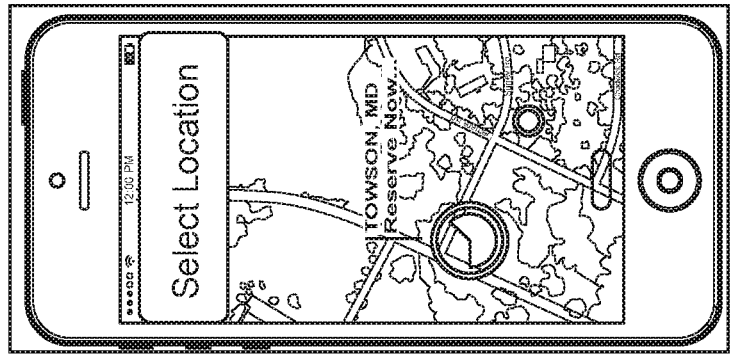
Figure 19E:
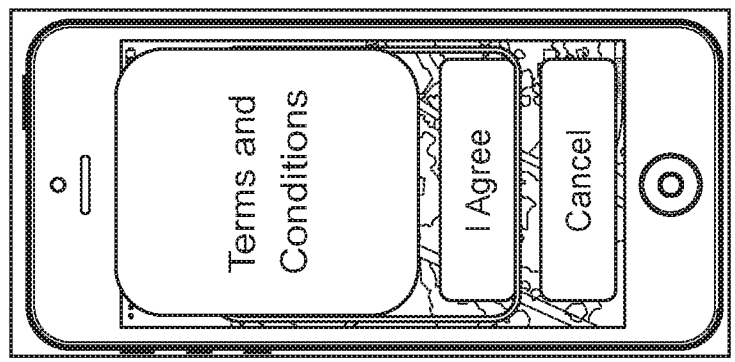
Figure 19D:
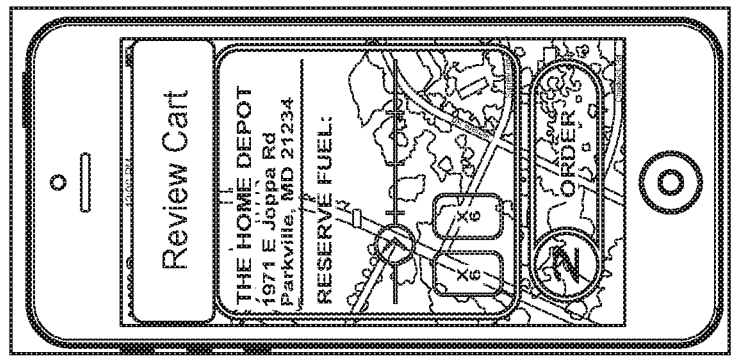
Figure 19G:
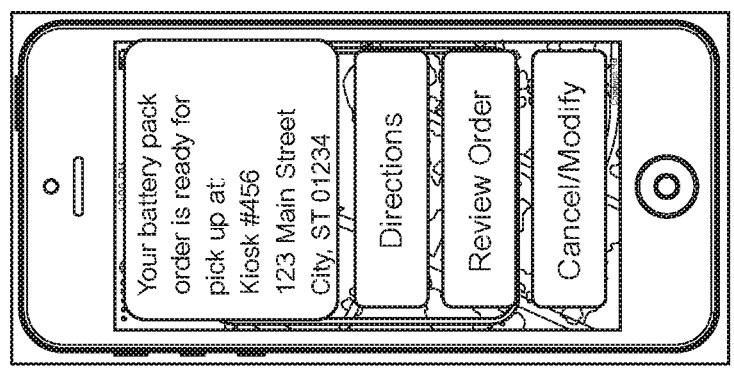
Figure 19F:
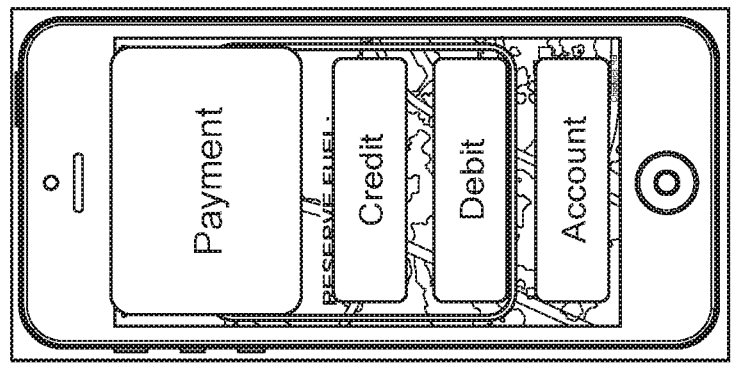

At step 622, the app provides the user with a notification of the rental date and time (e.g., via a text message, an e-mail, or a printed receipt). At step 624 and FIG. 19F, the app prompts the user for payment information for the rental (e.g., via credit card, debit card, or corporate account). At step 626, the app places a hold on the user's corporate account and/or credit card in to hold the reservation. At step 628 the transaction ends with the app communicating with the kiosk 100 and/or the central server to store a record corresponding to the reservation. At step 629 and as shown in FIG. 19G, at a later time closer to the reservation date and time, the central processing unit 140 or the central server 160 causes an electronic reminder to be sent to the user, e.g., via text message, automated phone call, e-mail, or app notification. The user is given the option to obtain directions to the kiosk 110, review the order, or cancel or modify the order. The user then proceeds to the kiosk 110 to pick up the rented carriers and battery packs, as described in the Pick-Up transaction above.

Retail

Figure 20B:
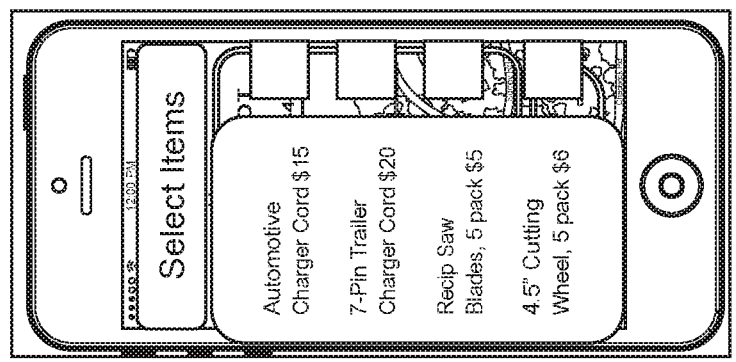
Figure 20A:
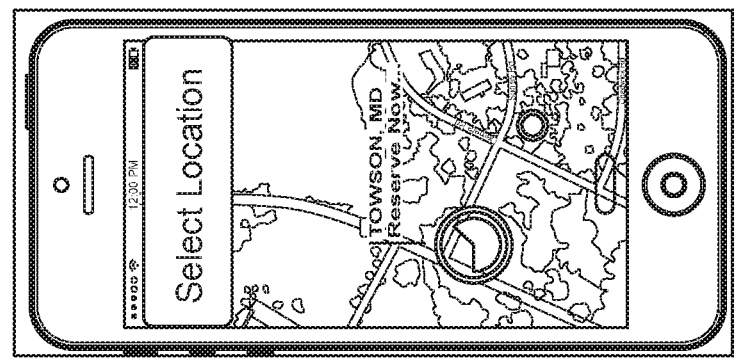
Figure 20E:
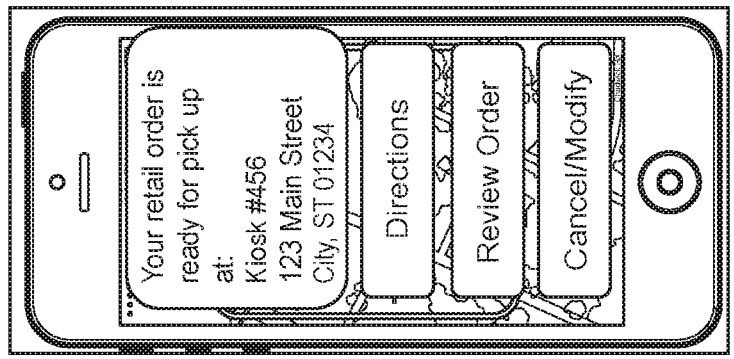
Figure 20D:
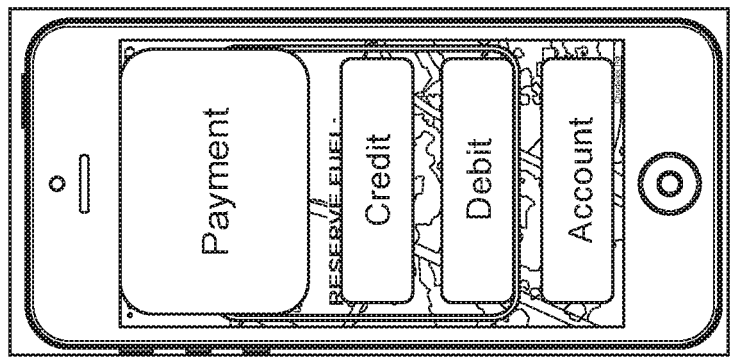
Figure 20C:
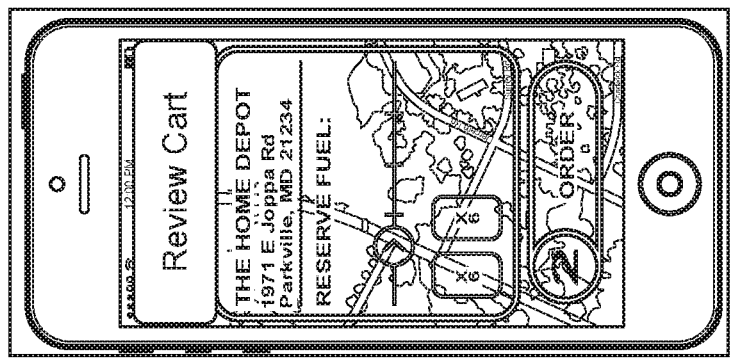

Referring to FIGS. 17 and 20A-20E, if, at step 604, the user selects Retail, then the retail subroutine 630 is executed to enable a user to purchase retail products via the kiosk rental app. At step 632 and FIG. 20A, the app prompts the user to select between Kiosk purchases (for pick-up at the kiosk) and Online purchases (for home delivery or pick-up at a retailer). If, at step 632, the user selects Kiosk, then the Kiosk subroutine 634 is executed. At step 636 and FIG. 20B, the app prompts the user to select a geographic location for a kiosk 100. The app may access the smartphone's location services to find the kiosk(s) located closest to the user at that time. Alternatively, the user may be prompted to enter an address or zip code to find the kiosks 100 closest to the particular address or zip code. The kiosks may be viewed in a map view or by address. At step 638 and FIG. 20B, the app prompts the user to select the item and quantity from among the items available for immediate sale in the retail vending area 108 of the kiosk 100. At step 640 and FIG. 20C, the app prompts the user to review the selected items that have been placed into an electronic shopping cart. At step 642 and FIG. 20D, the app prompts the user to make a payment for the purchase, e.g., via credit card, debit card, corporate account, etc. At step 644, the transaction ends with the app communicating with the kiosk 100 and/or the central server to store a record corresponding to the reservation. At step 646 and as shown in FIG. 20E, at a later time, the central processing unit 140 or the central server 160 causes an electronic reminder to be sent to the user, e.g., via text message, automated phone call, e-mail, or app notification. The user is given the option to obtain directions to the kiosk 110, review the order, or cancel or modify the order. The user then proceeds to the kiosk 110 to pick up the purchased items. The reserved retail products may be held for the user for a limited period of time, after which, if the user fails to pick up the products, they are returned to the inventory and the user's payment is refunded.

If, at step 632, the user selects Online, then the online subroutine 650 is executed to enable a user to purchase retail products from an online e-commerce website or store. At step 652, the app may prompt the user to select from among a plurality of manufacturers or retailers of products similar to those sold in the kiosk. At step 654, the app may display or link to an online e-commerce website, app, or specially designed user interface of a selected manufacturer or retailer of products to enable online ordering just as one would do on the traditional e-commerce website. The user then shops on the e-commerce website for the desired goods to be purchased. At step 656, the app or the e-commerce website prompts the user to make a payment for the purchase (e.g., via credit card, debit card, corporate account, etc.). The app then sends a receipt for the purchase to the user (e.g., via electronic mail, text message, etc.), thus ending the transaction at step 658. A record of the transaction (including, e.g., identifier of items purchased, payment information, user ID, etc.) may be stored in the memory/database module, and may also be communicated by the external communications module to the central server.

Information

Figure 21:
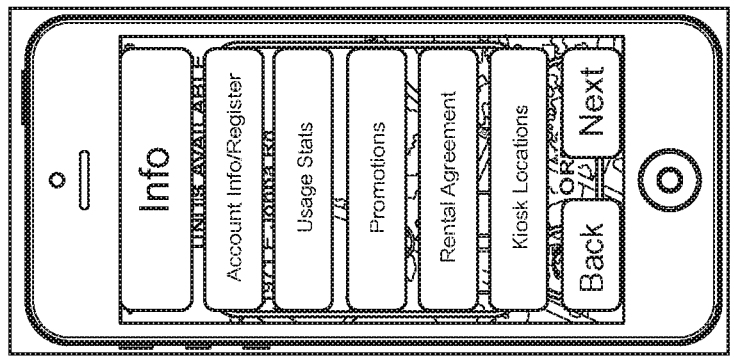

Referring to FIGS. 17 and 21, if, at step 602, the user selects Information, then the information subroutine 660 is executed to enable a user to obtain certain information and assistance via the app. In the information subroutine 660, and as shown in FIG. 21, the display screen prompts the user to select among a menu of information options, including at least one or more of the following options. For each option, the information displayed to the user may be stored locally in the app, or remotely at a central server 160 or elsewhere on the internet.

At option 662, the app enables the user to register for an account or review and modify account information such as user ID, password, credit card, corporate account number, etc. At option 664, the app enables the user to review his or her history for battery pack rental usage. At option 666, the app enables the user to view targeted advertising and promotions, such as video promotions directed to products similar to those previously purchased by that user. At option 668, the app allows the user to review the battery pack rental agreement policy. At option 670, the app allows the user to search for kiosk locations, and to review the inventory for battery pack rentals and retail vending at these locations. At option 672, the app enables the user to obtain information about obtaining a kiosk at a new location, such as a worksite or jobsite. At option 674, the user interface 110 enables the user to compare the cost of operating gas powered power tools vs. the cost of battery pack rentals for cordless power tools.

At option 676, the app allows the user to send an invitation (such as an e-mail or text message) to friends or colleagues, inviting them to try the kiosk or the kiosk app. At option 678, the app displays instructional videos, such as how to use the carrier, how the battery pack rentals work, etc. At option 680, the app allows the user to view a local weather forecast. At option 682, the app allows the user to contact a service center (e.g., via electronic mail or live online chat). At option 684, the app allows the user to report a problem with a kiosk or rental carriers or battery packs. At option 686, the user can complete a form to leave a comment or suggestion for the owner of the kiosk.

Figure 22:
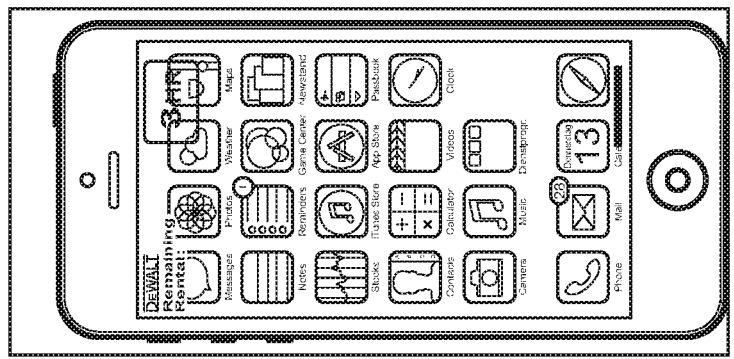

Referring to FIG. 22, the app can also provide in app notifications 690 or e-mail or text notifications to remind a user when rental carriers and battery packs are due to be returned to the kiosk. This notification may be stored locally in the app (running in the background) or may be pushed to the user's smartphone from the central server. For example, as shown in FIG. 22, the app notifies the user that the rental carriers and packs are due to be returned in three hours.

Referring to FIG. 23, the power distribution module 130 is coupled to a source of external electrical power 132, e.g., an AC mains line, batteries, solar panels, a generator, etc. via a plug or connector 133. The power distribution module 130 distributes the electrical power to the other areas and modules of the kiosk 100, including to the battery pack rental area 106 and module 136, the retail vending area 108 and module 134, the user interface 110 and module 144, and the advertising display area 104 and module 142. The power distribution module 130 may include circuits to modify, rectify, transform, divide, modulate, regulate and/or invert the incoming electrical signals for distribution to the various areas and modules of the kiosk 100 by means known to one of ordinary skill in the art. For example, the power distribution module 130 may transform an incoming AC signal to a DC signal to distribute to some of the components. In addition, the power distribution module 130 may include one or more fuses or circuit breakers 131 to prevent overload of the circuits in the various modules of the kiosk 100.

Alternatively, an exemplary power distribution module is coupled to a 240V, 50 A power source such as an AC mains line 132. The power distribution 130 splits the 240V AC power source into two 120V AC power sources. distributed over a power bus or power supply lines. The power distribution module 130 distributes the 120V AC power supply to each bin 114 over a power bus or power supply line 135. The power distribution module 130 may include a fuse 131, for example a 10 A fuse, on the AC power supply line prior to the bins 114. The power distribution module 130 also provides power to the CPU 140. Either the power distribution module 130 or the CPU 140 may include circuitry to convert the 120V AC power supply to the appropriate voltage for the CPU 140, as would be understood by one of ordinary skill in the art.

Also illustrated in FIG. 23 are communication lines 137 between the CPU 140 and each of the bins 114. As noted above, each bin 114 includes a communications connector 178 and as discussed in more detail below, each carrier 200 includes a communications connector that is configured to couple to the bin communications connector 178. These communications connectors allow the CPU 140 to monitor and communicate with the bins 114, the carriers 200 and the batteries 300 to manage receiving, dispensing, and renting the carriers 200 and battery packs 300, and monitoring and/or managing the charging of the battery packs 300 by the carriers 200.

Figure 24B:
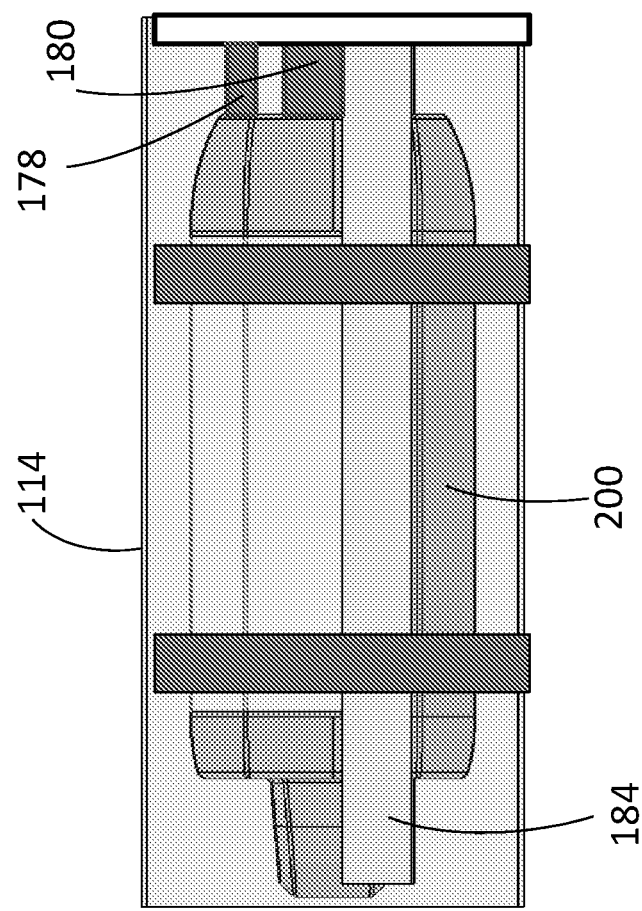
FIGS. 24A and 24B are front view and a side view of an exemplary embodiment of a bin and carrier of the rental system of FIG. 1.
Figure 24A:
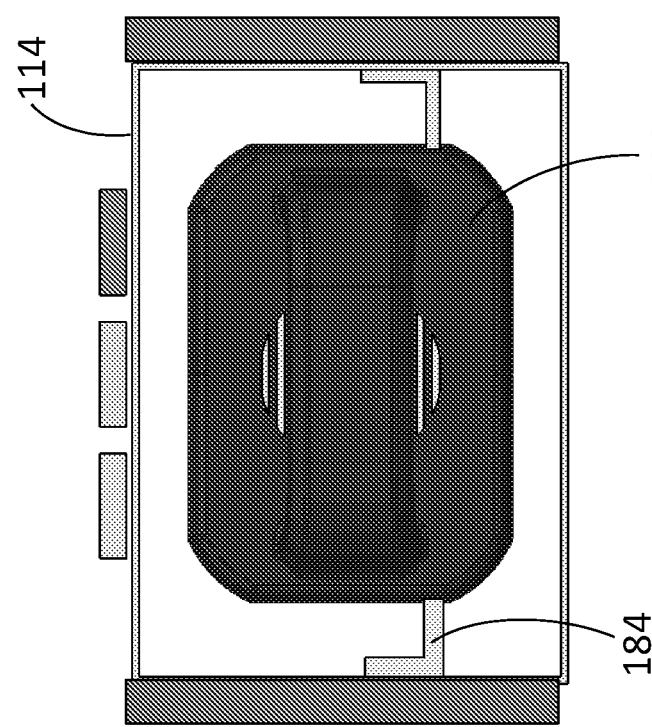
Figure 25:
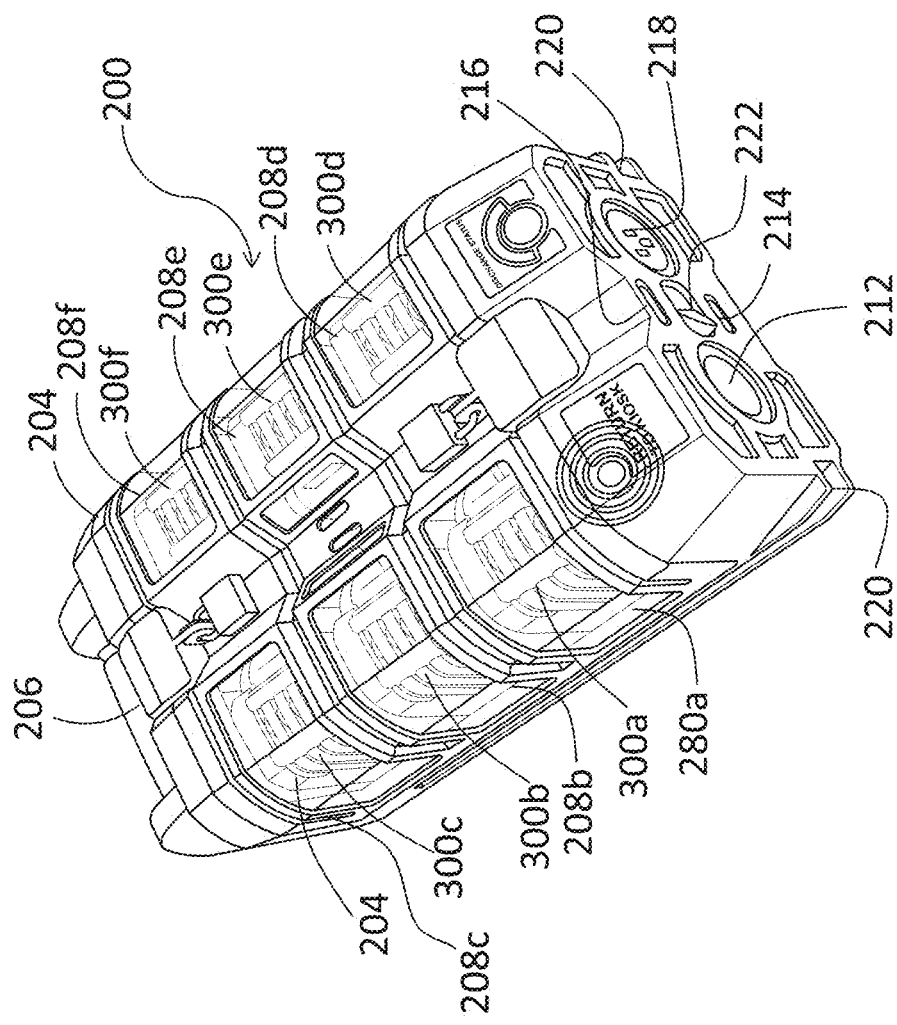
FIG. 25 is an isometric view of an exemplary embodiment of a carrier.
Figure 26:
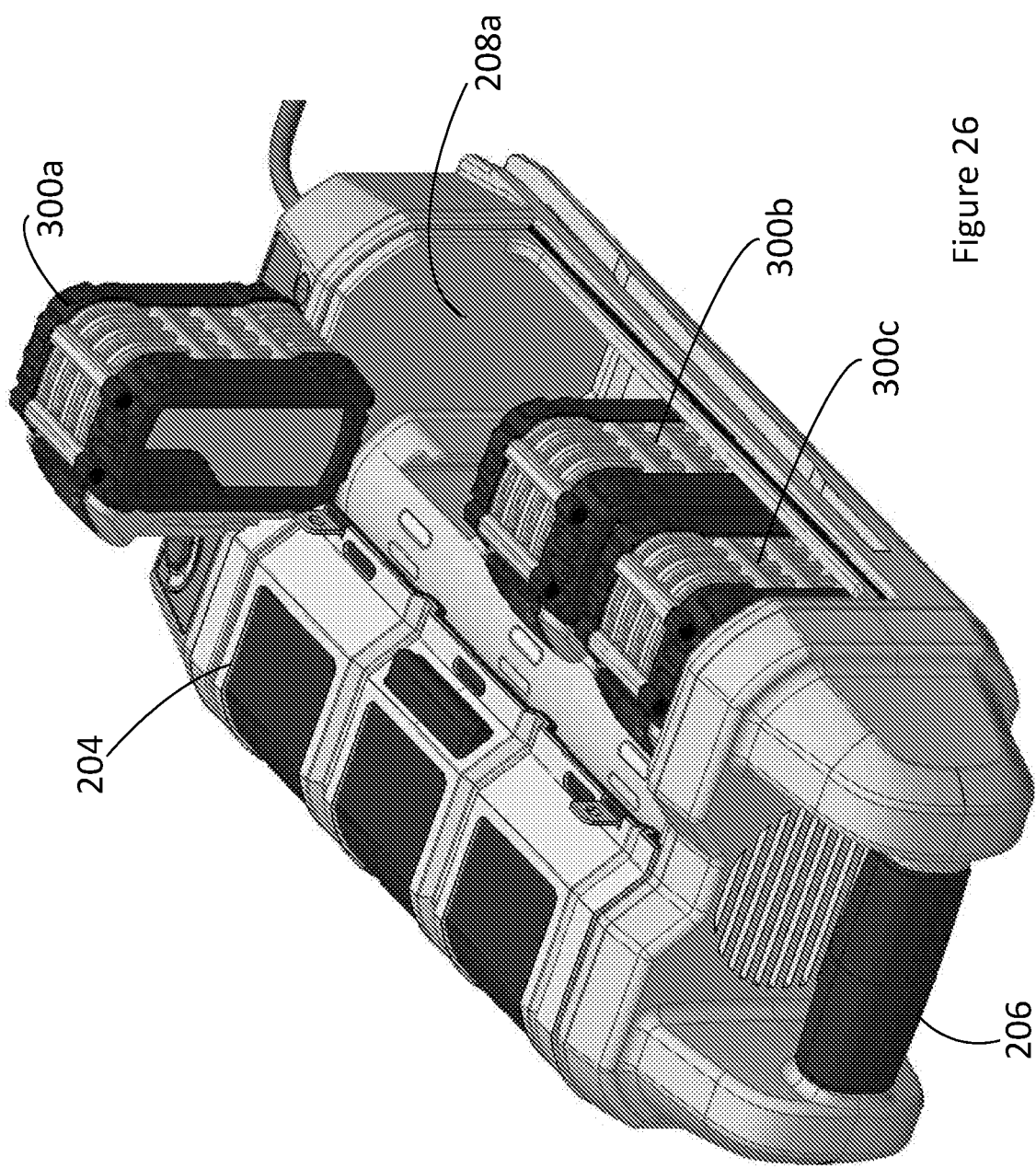
FIG. 26 is another isometric view of an exemplary embodiment of the carrier of FIG. 25.
Figure 27:
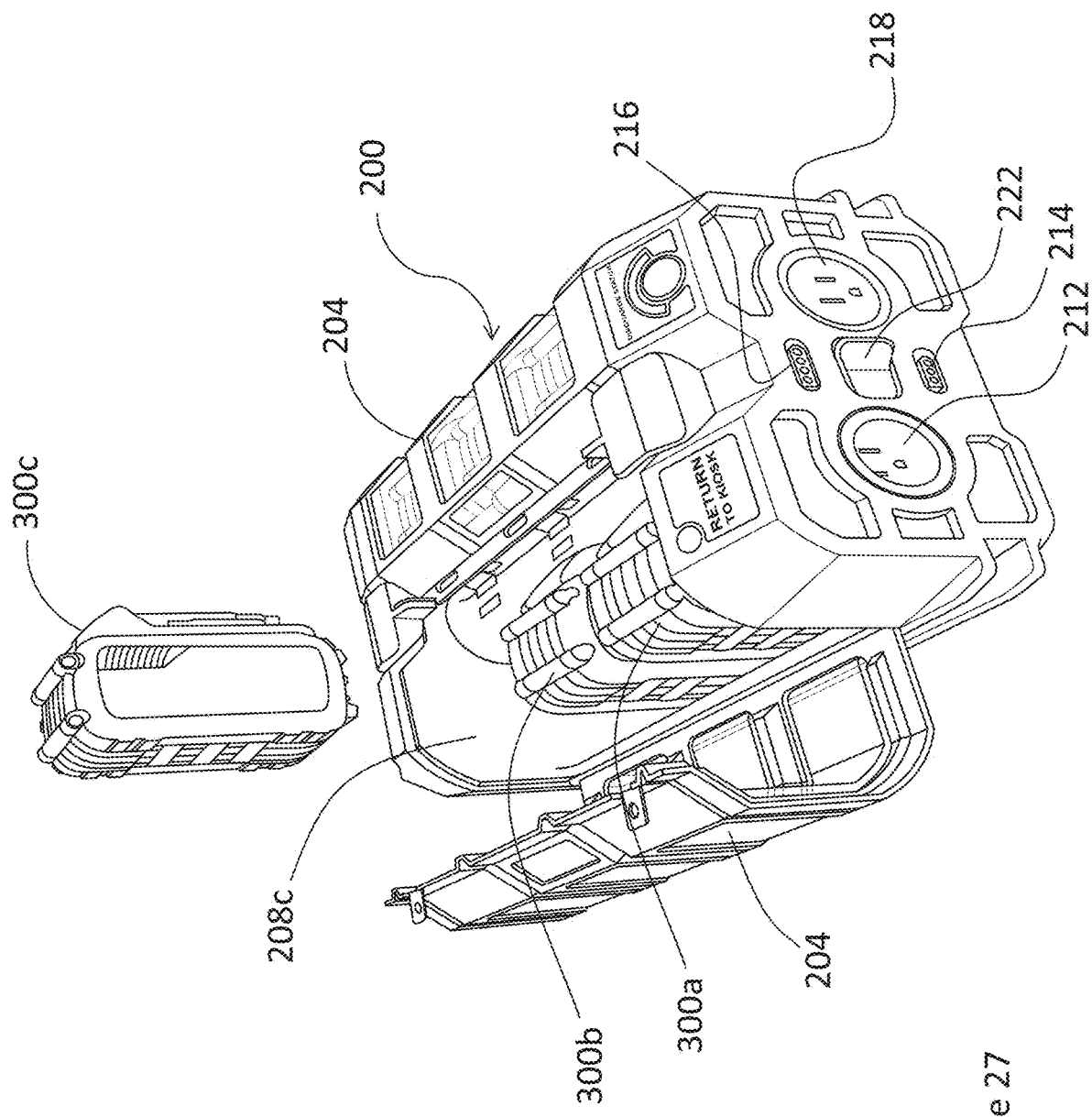
FIG. 27 is another isometric view of an exemplary embodiment of the carrier of FIG. 25.
Figure 28:
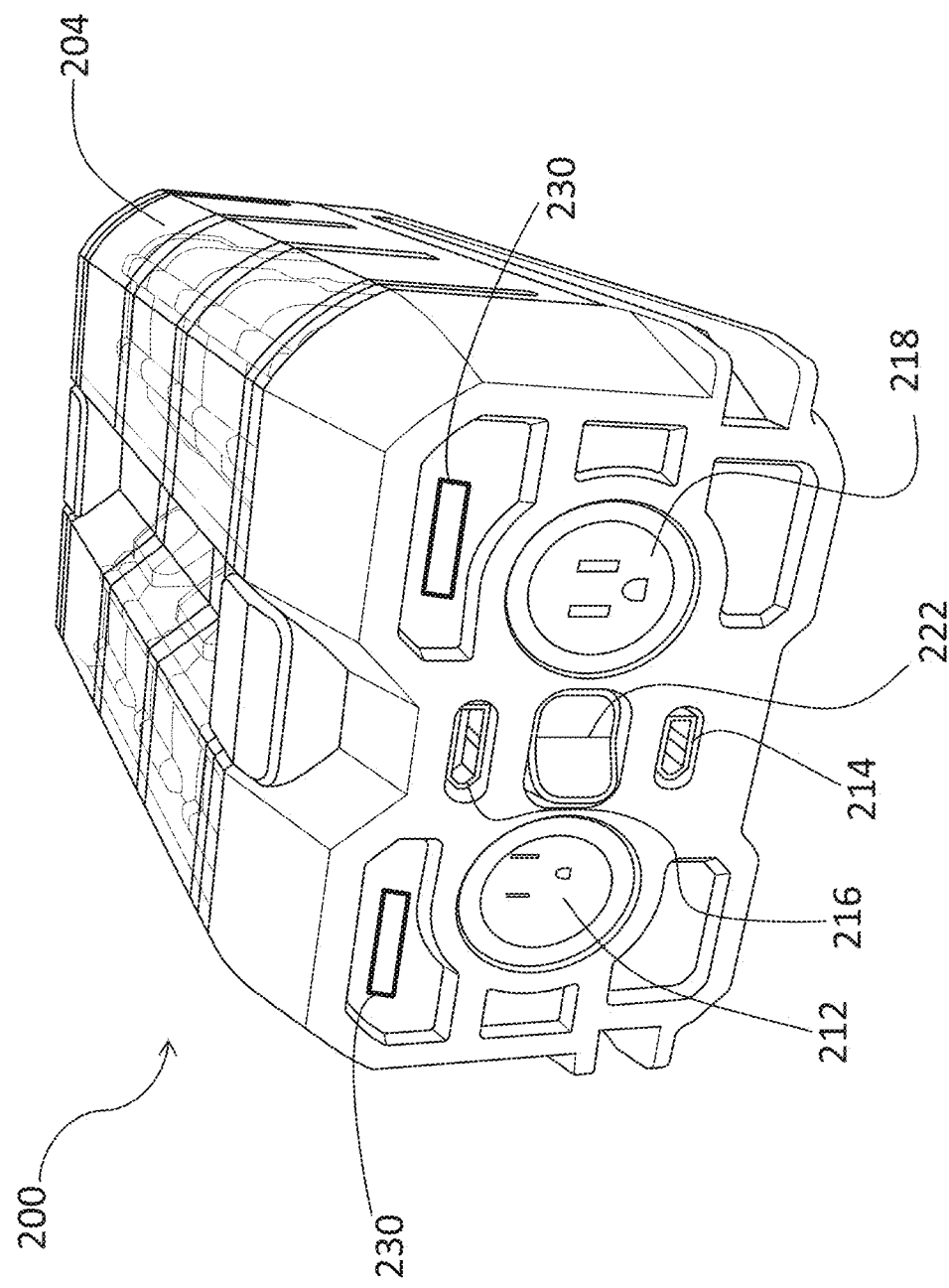
FIG. 28 is another isometric view of an exemplary embodiment of the carrier of FIG. 25.

Referring to FIG. 24, there is illustrated a view of the bin 114 from a front side of the kiosk 100 including an exemplary carrier 200. As noted above, the bin 114 includes two sidewalls 170, a top wall 172 and a bottom wall 174. As also noted above, each of the sidewalls includes the rails 184. Also illustrated in FIG. 24 is the bin communications connector 178 coupled to the carrier communications connector 216 and the bin power connector 180 coupled to the carrier AC power input connector 212.

Also referring to FIGS. 25-29, the illustrated carrier 200 includes a housing 202 and a carrying handle 206. The carrier housing 200 includes side walls. Each of the sidewalls includes a longitudinal groove 220. Each carrier housing groove 220 is configured to receive one of the bin sidewall rails 184 when the carrier 200 is received in the bin 114. These grooves 220 and rails 184 insure that the carrier AC power input connector 212, the carrier communications connector 216 and the charge/discharge switch 222 align with the bin power connector 180, the bin communications connector 178, and the bin extension 182, respectively, when the carrier 200 is received in the bin 114. The rails 184 may be adjustable to accommodate various size carriers 200. The rails 184 may serve to keep the carrier 200 raised from the bottom wall 174 to allow air cooling of the carrier 200 when the battery packs 300 are being charged inside the bin 114.

The carrier 200 may also include a door or cover 204. The cover 204 may be transparent. The carrier housing 202 includes a plurality of receptacles 208. Each receptacle 208 is configured to receive one the rechargeable, removable battery packs 300. The cover 204 may be configured to allow access to a plurality of the receptacles 208. In an alternate exemplary embodiment, there may be an individual cover 204 for each receptacle 208. The cover(s) may include latching system elements configured to operate with corresponding latching system elements on the carrier housing 202 to fix the cover 204 to the housing 202 and to allow a user to open and close the door(s). The carrier 200 may include one or more security features, e.g., loops or latches 209 to receive one or more user applied padlocks 210 or other security locking devices to lock the cover(s) 204 to the carrier housing 202.

In the disclosed exemplary embodiment, the housing 202 includes six receptacles 208a-f for receiving six battery packs 300a-f, respectively. However, it should be understood that the carrier 200 may have any number of receptacles 208 for receiving a corresponding number of battery packs 300.

Figure 29A:
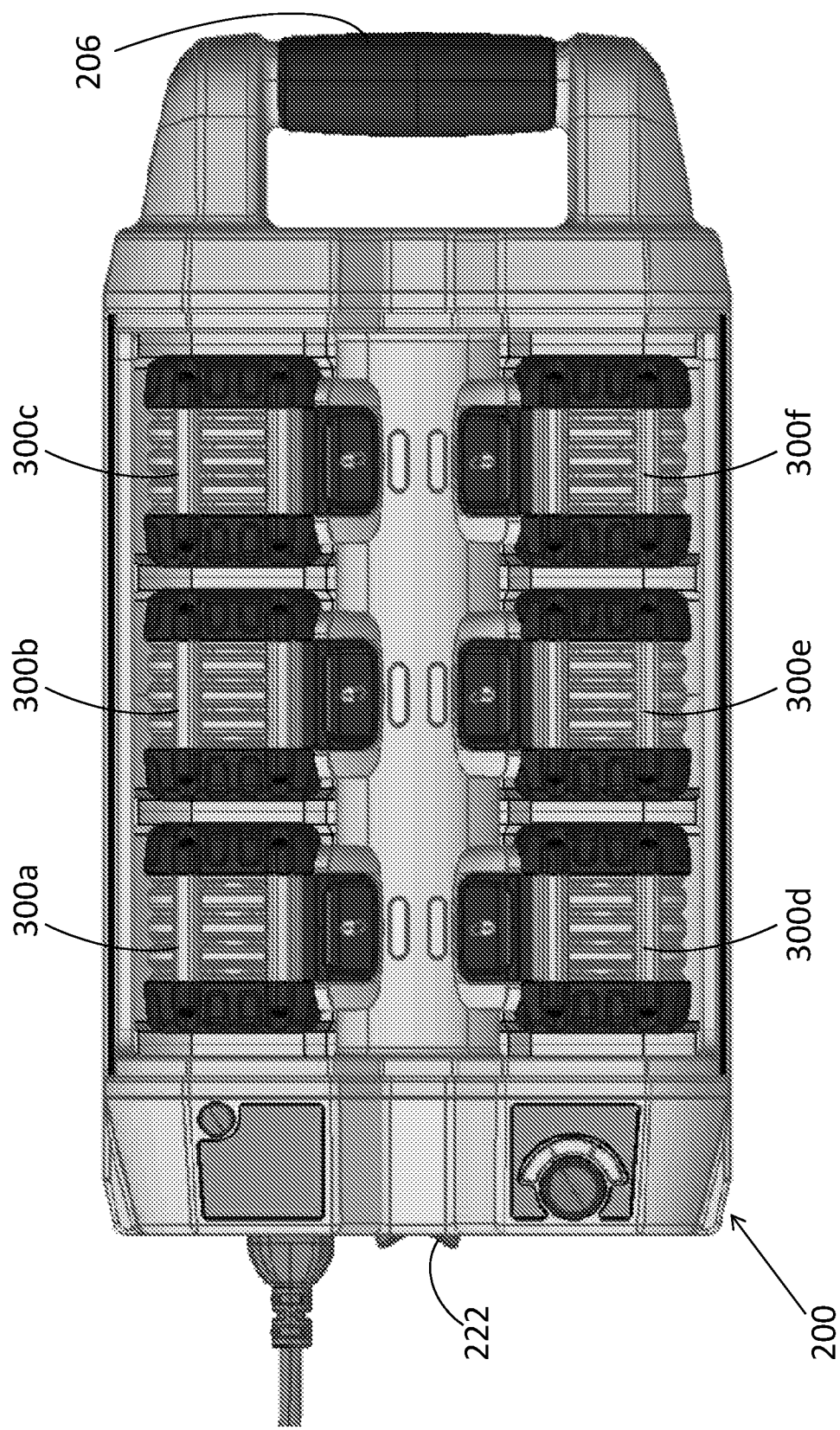
FIG. 29A is a plan view of an exemplary embodiment of the carrier of FIG. 25 including six battery packs.
Figure 29B:
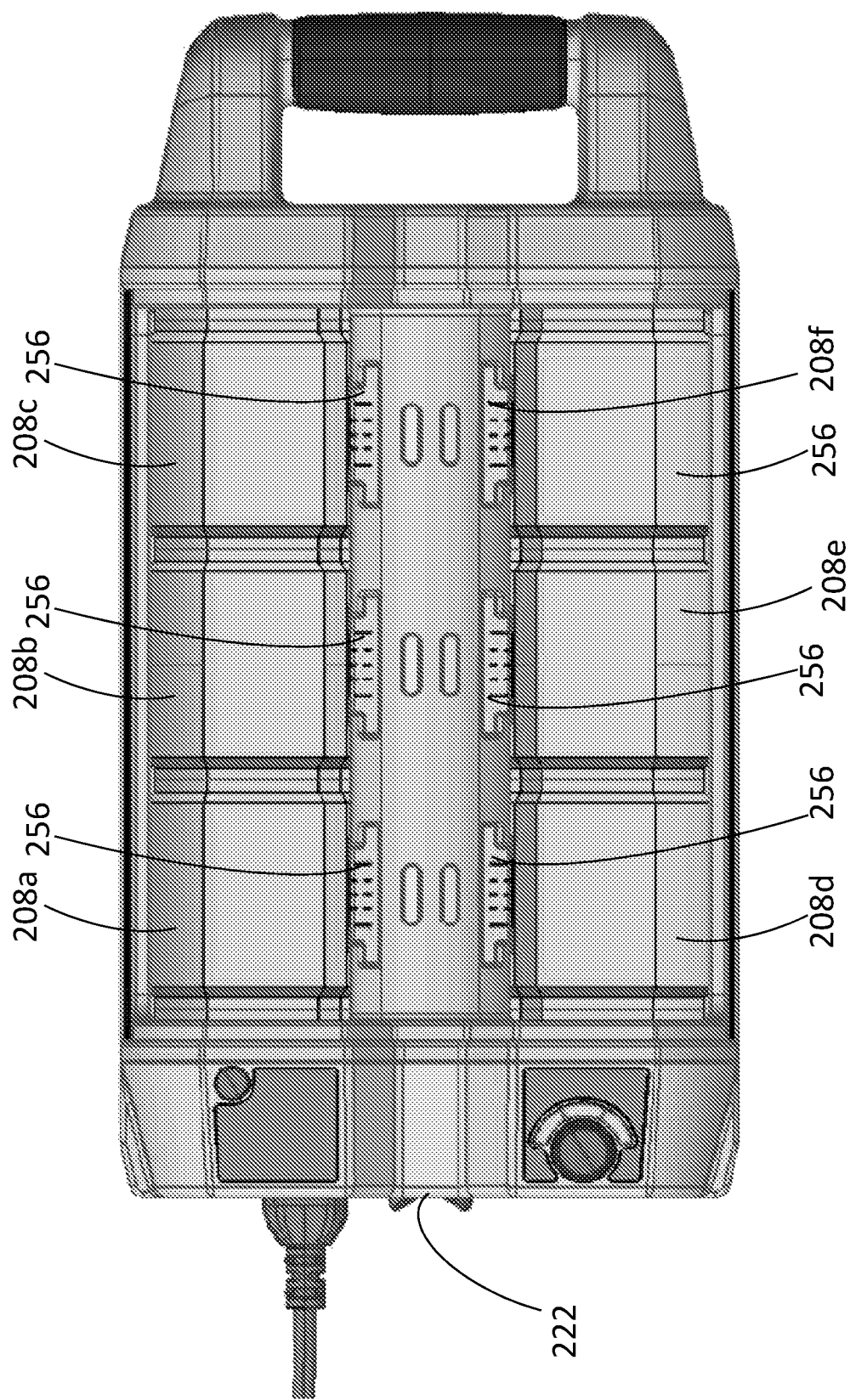
FIG. 29B is a plan view of the exemplary embodiment of the carrier of FIG. 25 without battery packs.

As illustrated in FIGS. 29A and 29B, each receptacle 208 includes a terminal block 256 for electrically coupling the battery pack 300 to the internal circuitry of the carrier 200. In the illustrated exemplary embodiment, the battery packs 300 may be convertible battery packs, as disclosed and described in provisional U.S. Patent Application Nos. 61/944,953 filed May 18, 2014, 62/000,112 filed May 19, 2014 and 62/046,546 filed Sep. 5, 2014, and in U.S. patent application Ser. No. 14/715,258, filed May 18, 2015, each of which is incorporated herein by reference. The battery packs 300 may be any one of the embodiments described in the aforementioned provisional applications. As such, the carrier terminal block would be configured in the same manner as the power tool terminal block for a corresponding convertible battery pack as disclosed and described in the aforementioned U.S. Provisional Applications. The exemplary battery packs 300 are 20V/60V rated voltage battery packs, however battery packs 300 having other rated voltages are contemplated and encompassed by the present disclosure. Additionally, in alternate exemplary embodiments, the battery packs 300 may be non-convertible battery packs such as the battery packs disclosed and described in U.S. Pat. No. 8,653,787, which is incorporated herein by reference. These battery packs 300 may be any of a variety of rated voltages, for example 20V, 40V, 60V, etc.

The housing 202 also includes an AC power input connector 212, e.g., a 3 prong 120 VAC male plug or female receptacle, a universal DC power input connector 214 for connecting to a DC power supply, e.g., a 12V car charger port, a USB port, and/or a trailer adapter port, and a communications connector 216, e.g., a USB port, a serial port, or a set of electrical contacts. The carrier 200 also includes a power output connector 218. In a first exemplary embodiment, the power output connector 218 is an AC power output connector. In a second exemplary embodiment, the power output connector 218 is a DC power output connector. The carrier 200 also includes a switch 222 for switching between a charging mode of operation that charges the battery packs 300 using electrical power input through the power input connectors 212, 214, and a discharging mode of operation that outputs electrical power from the battery packs 300 through the power output connector 218. Alternatively, the external switch 222 may be replaced with an automatic internal switch and a current sensor for the AC and DC power inputs such that the internal switch switches to charging mode when the current sensor senses an input current and switches to discharge mode when the current sensor does not sense an input current.

As noted above, the kiosk 100 includes the power supply line 135 coupled to the bin power connector 180 of each bin 114. The bin power connector 180 is configured to electrically and mechanically couple with the carrier AC power input connector 212 when the carrier 200 is received in the bin 114. Also as noted above, the kiosk 100 includes the communications line 137 coupled to the bin communications connector 178. The bin communications connector is configured to electrically and mechanically couple with the carrier communications connector 216 when the carrier 200 is received in the bin 114. As described in greater detail below, when the carrier 200 is received in the bin 114, the communications line 137 and the communications connectors 178, 216 enable communications between the kiosk 100 and the carrier 200 to manage and/or control when and how the power delivered through the power input line 135 is used to charge the battery packs 300.

Figure 30:
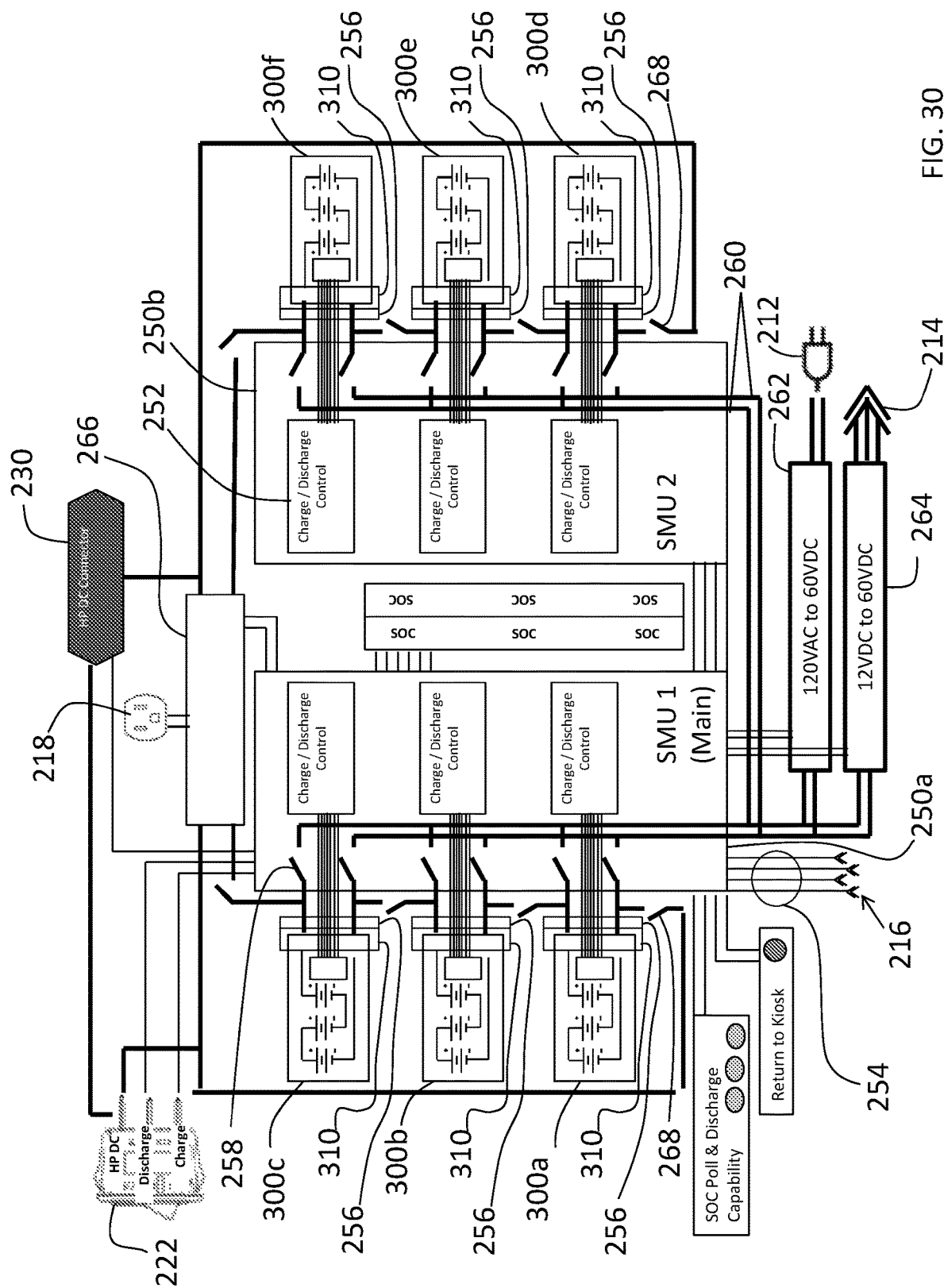
FIG. 30 is a simplified schematic diagram of an exemplary embodiment of a carrier and battery packs.

As illustrated in the simplified schematic of FIG. 30, the carrier 200 includes a plurality of electrical and electronic components for monitoring, managing and/or controlling the charging and discharging of the battery packs 300. More particularly, the carrier 200 includes a system management unit (SMU) 250. The SMU 250 may be configured as a single printed circuit assembly or may be configured as two printed circuit assemblies 250a, 250b—as illustrated in FIG. 30—or may be configured as more than two printed circuit assemblies. The SMU 250 may include a processor and may include a charge/discharge control module 252. The carrier 200 may be configured to include a charge/discharge control module 252 for each battery 300—as illustrated in FIG. 30—or may include a single charge/discharge control module 252 for all of the batteries 300 or may include some other number of charge/discharge control modules. As discussed in more detail below, the charge/discharge control modules 252 communicate with the SMU 250 which in turn communicates with the kiosk 100 through a plurality of communication lines 254 connected to the communication connector 216.

Each receptacle 208 includes a terminal block 256 and each battery pack 300 includes a terminal block 310. Furthermore, the charge/discharge control modules 252 are electrically connected to the battery packs 300 via the receptacle terminal block 256 and the battery pack terminal block 310. The charge/discharge control module 252 controls a plurality of switches 258 to provide a charging current to the battery packs 300 through the carrier power supply lines 260, the receptacle terminal block 256 and the battery pack terminal block 310—as will be discussed in more detail below.

The SMU 250 also communicates with a power supply 262 coupled to the AC power input connector 212 and a power supply 264 coupled to the DC power input connector 214. The AC power supply 262 may be, for example, a 120 VAC to 60 VDC power supply and the DC power supply 264 may be, for example, a 12 VDC to 60 VDC power supply to supply power to the battery packs 300. The power supplies 262, 264 will be configured to provide a charging voltage equal to the rated charging voltage of the battery pack configuration of a particular carrier 200. For example, if all of the battery packs are 60 V battery packs then the power supplies will be configured to provide a 60 VDC output. Alternatively, if all of the battery packs are 20 V battery packs then the power supplies will be configured to provide a 20 VDC output.

The SMU 250 also communicates with an inverter 266. The inverter 266 may be a pure sine wave inverter, a modified sign wave inverter, a pulse wave inverter or any other inverter capable of providing an AC output signal or an approximated AC output signal for providing power to AC electrical and electronic devices. The inverter 266 is electrically connected to the power output connector 218. In the exemplary embodiment, the inverter is a 189 VDC to 120 VAC, square wave approximation of sine wave inverter. In an alternate embodiment, the carrier 200 does not include an inverter and only provides DC output power.

The SMU 250 is also electrically connected to the discharge/charge mode switch 222. Generally speaking, when the switch 222 is in the charge position, a charge signal is sent to the SMU 250. In turn, the SMU 250 sends a signal to the inverter 266 to turn the inverter 266 off, sends a signal to the power supply 262, 264 to turn the power supply 262, 264 on, and selectively sends a signal to the switches 258 to close the switches 258 to selectively connect the battery packs 300 to the power supplies 262, 264. Depending upon the battery pack 300 status and the carrier 200 status, the SMU 250 and the charge/discharge control modules 252 will operate to charge the appropriate carriers 200 and battery packs 300.

Generally speaking, when the switch 222 is in the discharge position, a discharge signal is sent to the SMU 250. In turn, the SMU 250 sends a signal to the inverter 266 to turn the inverter 266 on, sends a signal to the power supply 262, 264 to turn the power supply 262, 264 off, and selectively sends a signal to the switches 258 to selectively open the switches 258 to disconnect the battery packs 300 from the power supplies 262, 264.

The carrier 200 may also include a plurality of door switches 268. The door switches 268 ensure that the terminal blocks of an empty receptacle are not of a dangerous electrical potential when the door 204 is open. More particularly if the door 204 is open and two receptacles 208*a*, 208*b* have fully charged battery packs 300*a*, 300*b* inserted therein and a third receptacle 208*c* does not have a battery pack 300*c* inserted therein a voltage across the empty terminal block could be approximately 60V. And if the door was open and the door switches were not present a user could conceivably touch the terminals at a dangerous electrical potential and receive a potentially dangerous shock. As such, when the door 204 is open all three door switches 268*a*, 268*b*, 268*c* will be open. This will provide an open circuit between carrier receptacle terminal blocks and prevent potential shocks when not all of the receptacles include battery packs 300.

In an alternate exemplary embodiment, the carrier 200 does not include a charger and the kiosk 100 does include a charger. In this embodiment, the battery packs 300 may only be charged when the carrier 200 is in the kiosk bin 114 or connected to a separate charger that could provide equivalent charging functionality to that of the kiosk 100.

The carrier 200 can communicate with each of the plurality of battery packs 300 for purposes of identifying a particular battery pack 300, performing a status diagnosis of the battery pack 300 and/or reporting data logging associated with the battery pack 300. The carrier 200 can communicate with the kiosk 100 through the carrier communication lines 306, the carrier communication connector 216, the bin communication connector 178 and the kiosk communication lines 137 when the carrier 200 is in the kiosk bin 114 for transferring information regarding the status and health of the battery packs 300 and carrier 200, regarding the identification of the battery packs 300, regarding the data logging information associated with the battery packs 300, and for receiving charge instructions from the kiosk 100.

When the carrier 200 is received in the bin 114 the kiosk 100 may provide charging power to the carrier 200 through the kiosk power supply lines 135, the bin power connector 180, the carrier AC power input connector 212, the AC power supply 262, and the carrier power supply lines 260. When the carrier 200 is not in the kiosk 100, alternate power sources may provide charging power to the carrier 200. For example, an AC mains line power supply may provide charging power to the carrier 200 through a power supply cord connected to the carrier AC power input connector 212, the carrier AC power supply 262 and the carrier power supply lines 260. Alternately, for example, an automotive power supply, a solar power supply or a trailer power supply may provide charging power to the carrier 200 through a supply cord connected to the carrier DC power input connector 214, the carrier DC power supply 264 and the carrier power supply lines 260.

Figure 32:
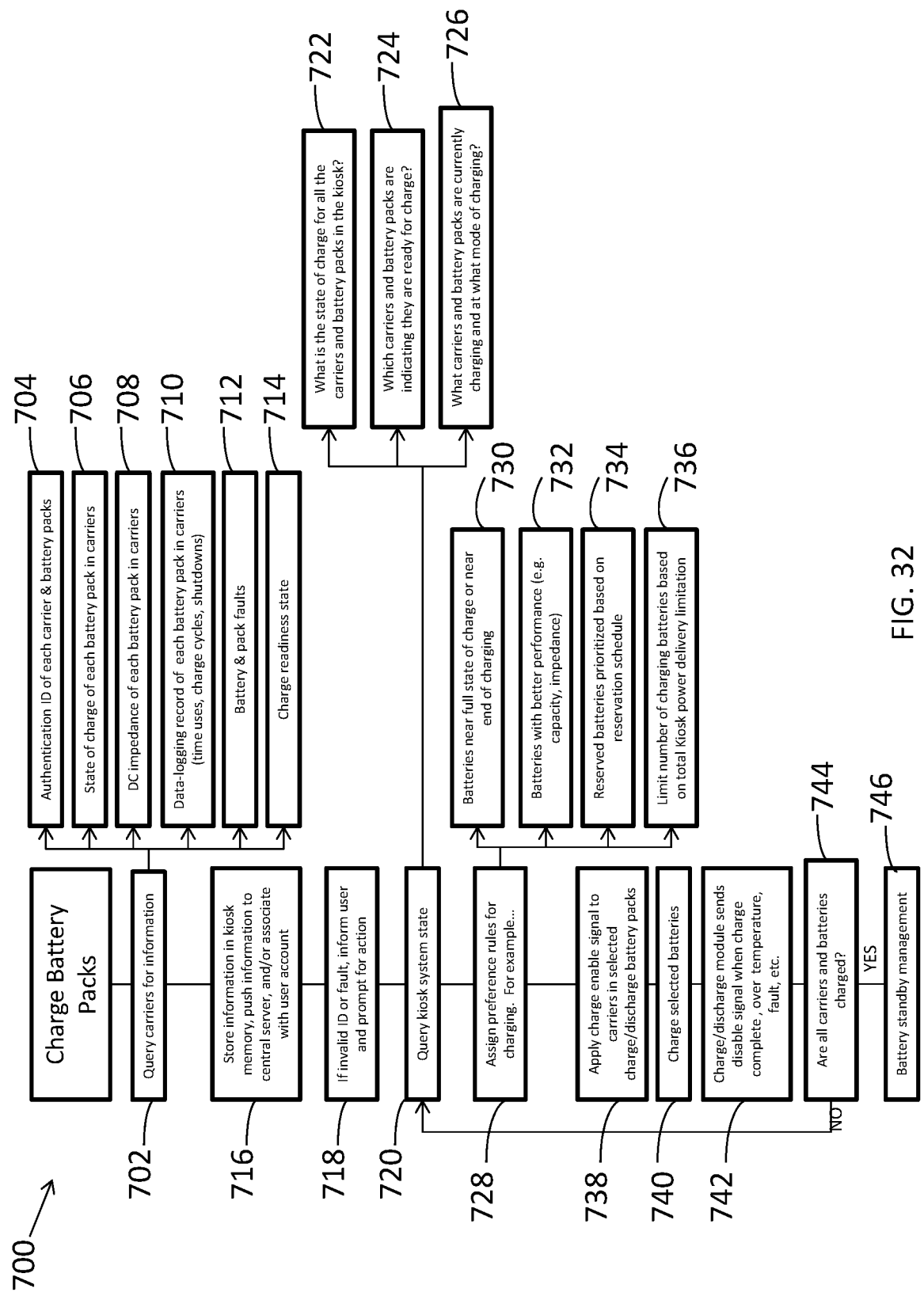
FIG. 32 is an exemplary flow chart for charging battery packs in a carrier in a kiosk of the rental system of FIG. 1.

Referring to FIG. 32, in an exemplary embodiment, the kiosk 100 may include software and/or hardware programmed to implement a process 700 to actively manage the charging of multiple carriers 200 and battery packs 300 received in the bins 114. At step 702, each time a carrier 200 is returned to the kiosk 100, the kiosk CPU 140 queries returned carrier 200 for information about the authentication ID (step 704), the state of charge (step 706), the DC impedance (step 708), data-logging information (e.g., time uses, charge cycles, shutdowns, etc.) (step 710), faults (step 712), and charge readiness state (step 714) for each pack in each carrier. At step 716, this information is stored in the kiosk memory/database module 138, transmitted to the central server 160, and/or associated with one or more user accounts. At step 718, if there is an invalid pack ID or fault, the user is informed of the fault and prompted for action (e.g., prompting the user to remove the faulty carrier and battery packs and to insert the correct carrier and battery packs into the bins).

At step 720, the kiosk CPU 140 queries each of the carriers 200 stored in the kiosk 100 for their system state. For example, at step 722, the kiosk CPU 140 queries the state of charge for each of the carriers 200 and battery packs 300 stored in the kiosk 100. At step 724, the kiosk CPU 140 queries which carriers 200 and battery packs 300 are ready for charging. At step 726, the kiosk CPU 140 queries which carriers 200 and battery packs 300 are currently charging and in which mode of charging. At step 730, the kiosk CPU 140 prioritizes the charging order of the carriers 200 based on a variety of preference rules, such as, for example, which battery packs 300 are near full state of charge or end of charging (step 730), which battery packs 300 have better performance (e.g., capacity, impedance) (step 732), when certain carriers 200 and battery packs 300 are reserved for future rental (step 734), and limits on total power delivery capability of the kiosk (step 736).

At step 738, a charge enable signal is delivered via the communications connectors 176, 216 to the carrier(s) that have been selected for priority charging according to the preference rules. At step 740, the carriers 200 that have received the charge enable signals charge the battery packs 300 located in those carriers 200. At step 742, each carrier 200 sends a disable signal to the kiosk CPU 140 when the charging is complete, when the battery packs 300 or carriers 200 exceed a temperature threshold, or when there is a fault in the charging. Upon sending the disable signal, the carrier 200 will stop charging the battery packs, and the CPU 140 will send a charge enable signal to the next carrier 200 in the priority order. At step 744, the CPU 140 queries the carriers 200 as to whether all of the battery packs 300 in each carrier 200 are fully charged. If not, then the CPU 140 returns to step 728 to reassign priority to the carriers 200. If all battery packs 300 are fully charged, then at step 746, the kiosk switches to a battery pack standby management mode in which it maintains the state of charge of all of the battery packs received in the kiosk.

The carrier 200 can output a power supply signal from the power supply output connector 218 in the form of a waveform that is an approximation of an AC mains line power supply allowing the carrier output to operate nearly all corded electrical devices, including for example, power tools and home appliances such as refrigerators, televisions, etc.

Figure 31:
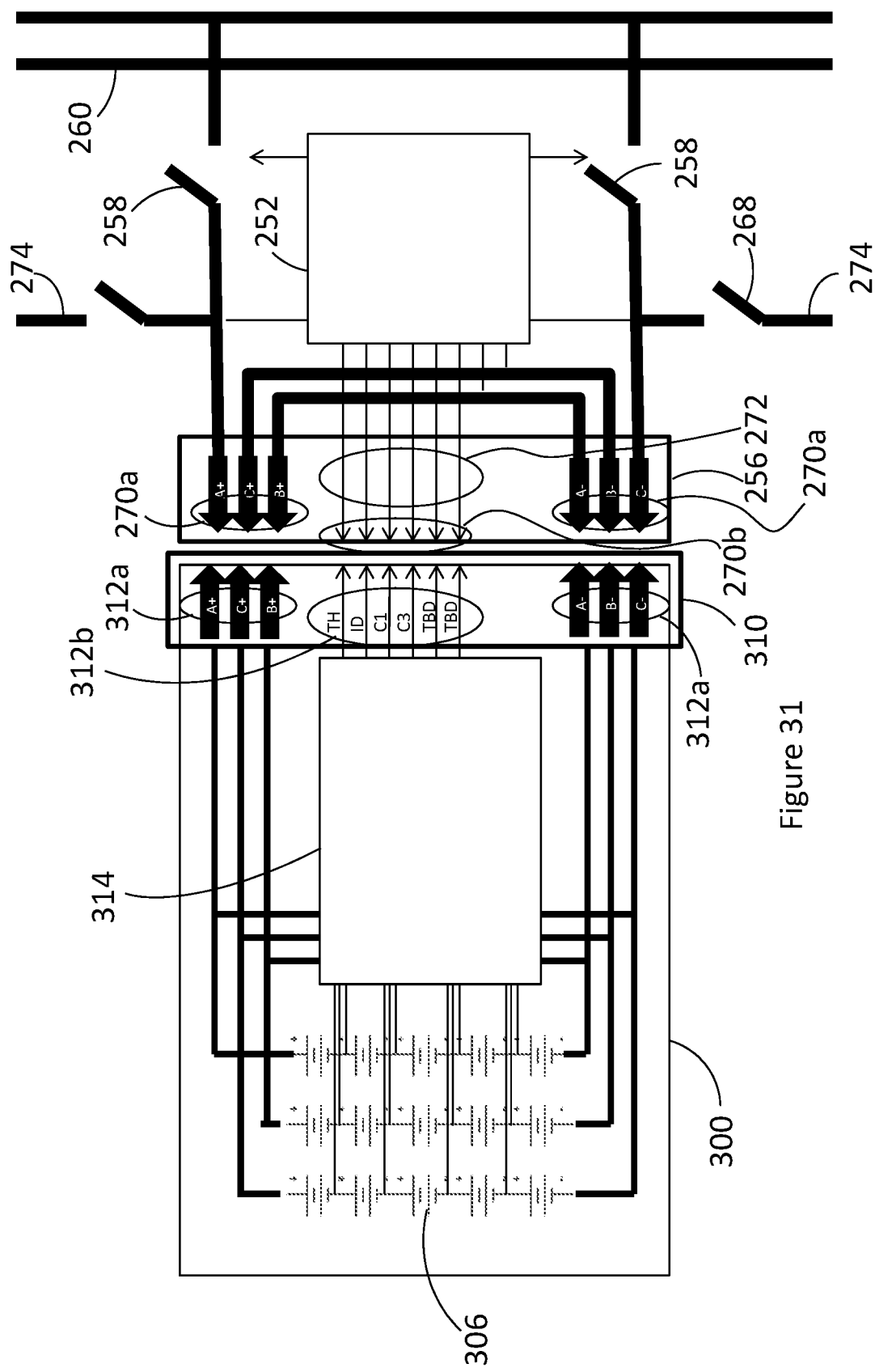
FIG. 31 is a simplified schematic diagram of another exemplary embodiment of a carrier and a battery pack.

Referring to FIG. 31, there is illustrated an exemplary battery pack 300. As noted above, the battery pack 300 may be a convertible battery pack, for example any one of the battery packs disclosed and described in the above-referenced U.S. Provisional Application Nos. 61/944,953 filed May 18, 2014, 62/000,112 filed May 19, 2014 and 62/046,546 filed Sep. 5, 2014. As such, the battery pack 300 will not be described in detail. The battery pack 300 includes a plurality of cells 306. The battery pack 300 also includes a battery terminal block 310. The battery terminal block 310 includes a plurality of battery terminals 312. The battery terminals 312 include a first subset of terminals 312a that serve as power terminals 312a and a second subset of terminals 312b that serve as communications or signal terminals 312b. The battery pack 300 also includes a printed circuit assembly 314. In the illustrated exemplary embodiment, the PCA 314 is unique to a rental battery pack 300. For example, the rental PCA 314 may allow for 60V charging. Furthermore, the rental PCA 314 may include a clock and generate an expiration disable signal to disable the battery pack after a certain rental period has ended. This disable signal could be transmitted from the battery PCA 314 to the carrier 200. The rental PCA 314 may also include authentication and serial number information for communication to the carrier 200 to ensure that only appropriate battery packs are being used in conjunction with the carrier 200. The battery PCA 314 may also include a processor and a memory element, for example, an EEPROM to store the aforementioned information and other battery related information. In alternate embodiments, the battery pack may be a standard retail battery pack with a standard PCA 314 that operates with the carrier 200, the carrier SMU 250 and the charge/discharge control module 252.

The battery pack may also be discharged into an electrical device (e.g., a power tool) independent of the carrier by connecting the battery pack directly to the electrical device via the battery terminal block 310. In this case, the discharge circuitry may be located inside of the electrical device, may be incorporated into the battery pack, or some combination thereof. Further, the battery pack 300 may be able to be charged by a separate charger independent of the carrier 200 by connecting the battery pack 300 directly to the charger via the battery pack terminal block 310. The charging circuitry may be located in the charger, in the battery pack 300, or in some combination thereof. In certain embodiments, the battery pack 300 may be connected to an alternative charging and discharging electrical device such as a radio charger.

Also illustrated in FIG. 31 is a schematic diagram of the receptacle terminal block 256. The receptacle terminal block 256 includes a plurality of carrier terminals 270. The carrier terminals 270 include a first subset of terminals 270a that serve as power terminals 270a and a second subset of terminals 270b that serve as communications or signal terminals 270b. As noted above, the carrier 200 includes the charge/discharge control module 252. The charge/discharge control module 252 is connected to the carrier terminal block 256 by the communication lines 272 which in turn are connected to the carrier communication/signal terminals 270b. The charge/discharge control module 252 also controls the carrier charge control switches 258 to enable/disable charging of the battery packs 300. The charge/discharge control module 252 may also be connected to the power discharge lines 274 to enable/disable discharging of the battery packs 300. The charge/discharge control module 252 may also process and/or transmit the communication signals from the battery pack 300 to the SMU 250.

Referring again to FIG. 30, the carrier 200 may discharge in various configurations. For example, if the receptacles 208a, 208b, 208c have 60V battery packs 300a, 300b, 300c therein, the carrier can output 120V RMS AC, 15 A waveform through the inverter 266—the three battery packs 300a, 300b, 300c produce 180V peak voltage for input to the inverter 266. However, if one of the receptacles, for example 208a, does not have a battery pack 300a therein the circuit will be open and the other two battery packs 300b, 300c will not be able to discharge. While the three battery packs 300a, 300b, 300c are discharging a 120V AC supply, the three other battery packs 300d, 300e, 300f from the carrier 200 may be used to operate various electrical devices for example, the convertible battery packs 300d, 300e could be used to provide power to two 20V rated voltage power tools and the battery pack 300f could be used to provide power to a 60V rated voltage power tool. Alternatively, the battery pack 300d could be used to provide power to a 20V rated voltage power tool and the battery packs 300e, 300f could be used to provide power to a 120V rated voltage AC/DC power tool.

The carrier 200 may also provide an AC power supply when the carrier is connected to an AC input power source. Particularly, when the carrier 200 is connected to an AC power supply, for example an AC mains line, the carrier 200 could operate as a power supply pass through by employing a switch and thereby bypassing the internal power supply 314 and the inverter 318 and providing an AC power supply directly from the AC input connector 212 to the AC output connector 218. Alternatively, when the carrier 200 is connected to an AC power supply, for example an AC mains line, and there are three battery packs 300a, 300b, 300c in the carrier, the carrier 200 can provide AC power supply out from the battery packs 300a, 300b, 300c through the inverter 266 and power output connector 218 and when power is not being drawn from the battery packs 300/inverter 266, the carrier 200 can charge the battery packs 300a, 300b 300c. Alternatively, if there are more than three battery packs 300 in the carrier 200 and the carrier 200 is connected to an AC power supply, the carrier 200 can provide an AC power supply out from three of the battery packs 300a, 300b, 300c while simultaneously charging the remaining battery packs 300d and/or 300e and/or 300f.

The carrier 200 may also provide very high power output to a specialized high power connector 230. In a first exemplary embodiment, if all six of the receptacles 208a-f have 60V battery packs 300a-f, DC power may be sourced directly from the battery packs 300a-f—bypassing the inverter 266—and permitting a larger power output on the specialized high power connector 230 than would otherwise be possible within the limitations of the inverter 266 or the AC mains line with a circuit limitation, e.g., a circuit breaker. The specialized connector 230 may be configured to restrict the DC power supply for a line of power tools specifically configured to operate with the carrier 200 in this mode.

Figure 33:
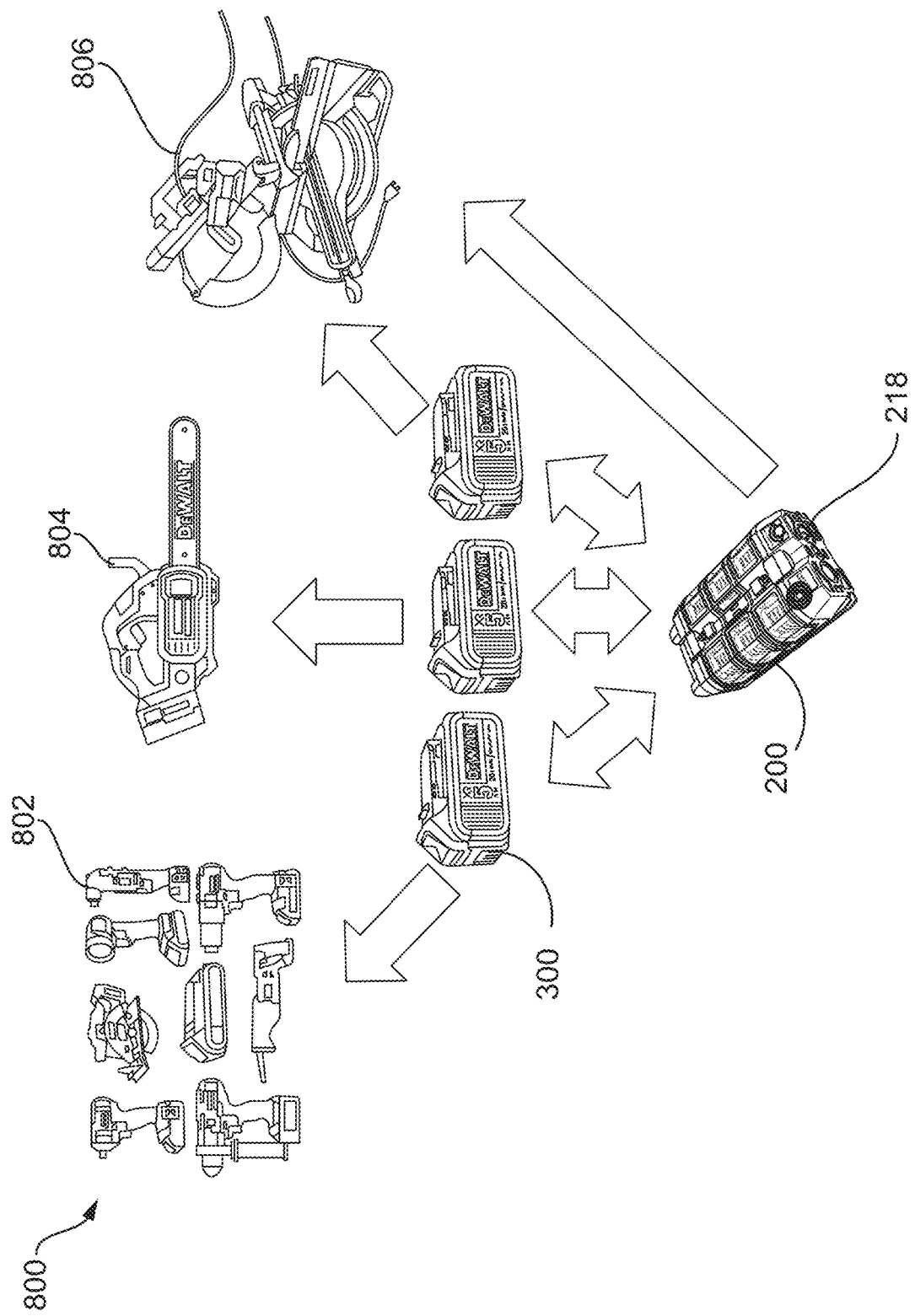
FIG. 33 is an exemplary illustration of a relationship between a carrier, battery packs and power tools.

FIGS. 33-41 schematically illustrate relationships between the carriers 200, the battery packs 300 and a variety of power tools and other electrical devices. FIG. 33 schematically illustrates that the carrier 200 may be used to store and charge a plurality of the battery packs 300. In addition, the battery packs may be used to power a variety of power tools 800 including a set of low rated voltage DC power tools 802 (e.g., under 40V, such as 4V, 8V, 12V, 18V, 20V, 24V and/or 36V), a set of medium rated voltage DC power tools 804 (e.g., 40V to 80V, such as 40V, 54V, 60V, 72V, and/or 80V), and a set of high rated voltage DC-only or AC/DC power tools 806 (e.g., 100V to 240V, such as 100V, 110V, 120V, 220V, 230V and/or 240V). In one embodiment, the battery packs 300 may include one or more convertible battery packs, each of which may be converted between (1) a first rated voltage and a first rated capacity and (2) a second rated voltage and a second rated capacity that are different than the first rated voltage and the first rated capacity. For example, a convertible battery pack may be convertible between a low rated voltage that corresponds to the low rated voltage power tools 802 and a medium rated voltage that corresponds to the medium rated voltage power tools 804. In this case, a convertible battery pack 300 in its low rated voltage configuration can power a low rated voltage power tool 802, a convertible battery pack 300 in its medium rated voltage configuration can power a medium rated voltage power tool 804, and a pair of convertible battery packs 300 in their medium rated voltage configuration can together power a high rated voltage power tool 806. For example, the battery packs 300 may be convertible between a 20V rated voltage and a 60V rated voltage so that one battery pack can power a 20V low rated voltage power tool 802 when the battery pack 300 is in its 20V configuration and can power a 60V medium rated voltage power tool when the battery pack is in its 60V configuration, and a pair of the battery packs 300 in their 60V configuration can power a 120V high rated voltage power tool. In addition, if the high rated voltage power tool 804 is an AC/DC power tool that can be alternatively powered by an AC input, the AC/DC high rated voltage power tool 804 can be powered by connecting an AC cord between the AC power output connector 218 of the carrier 200 and an AC input of the AC/DC high rated voltage power tool 804. Further details about using convertible battery packs to power a system of low, medium, and high rated voltage power tools can be found in the aforementioned provisional U.S. Patent Application Nos. 61/944,953 filed May 18, 2014, 62/000,112 filed May 19, 2014 and 62/046,546 filed Sep. 5, 2014, and in U.S. patent application Ser. No. 14/715,258, filed May 18, 2015, each of which is incorporated herein by reference.

Figure 34:
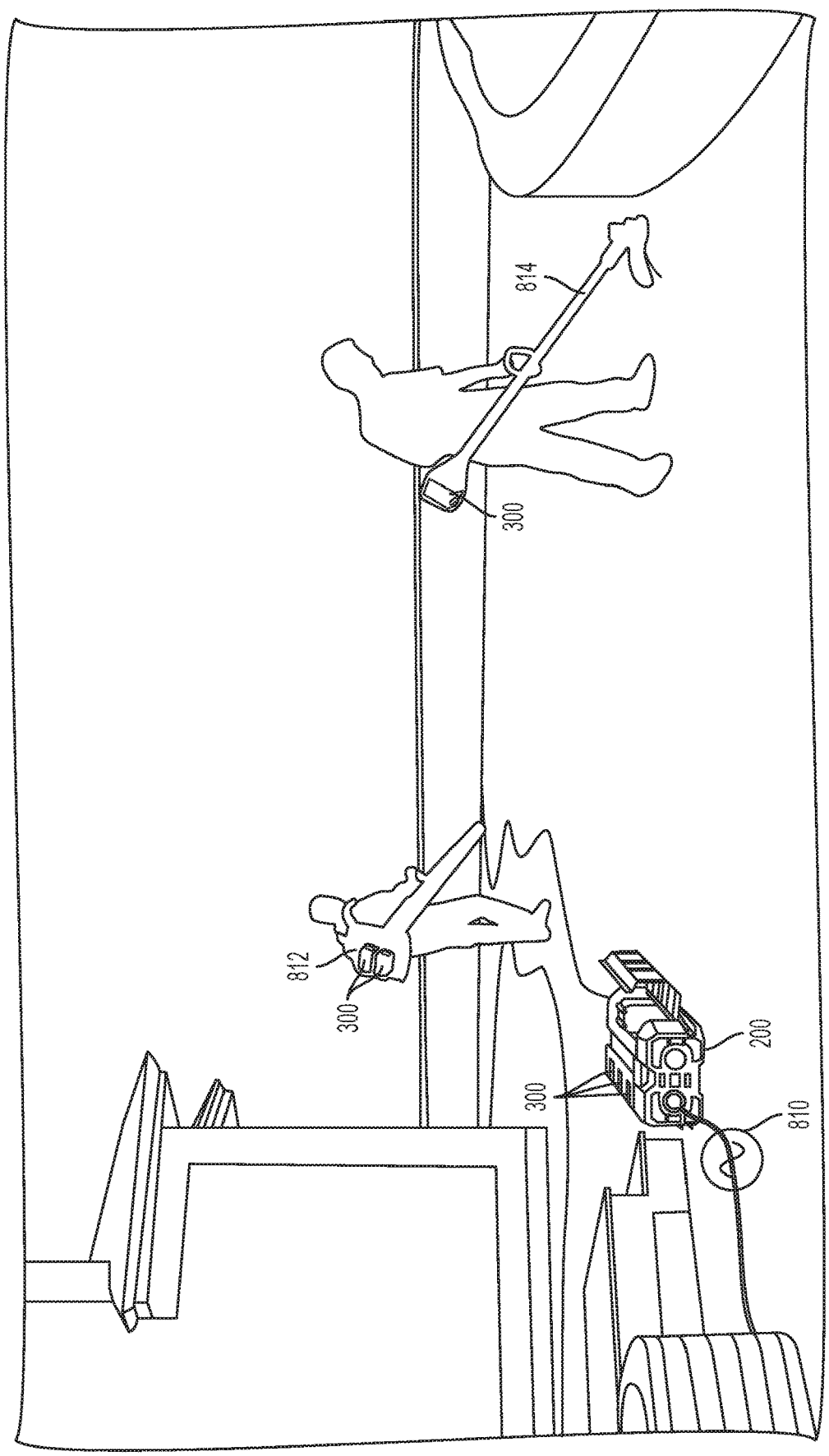
FIG. 34 is another exemplary illustration of a relationship between a carrier, battery packs and power tools.

Referring to FIG. 34 schematically illustrates an exemplary embodiment of a carrier 200, battery packs 300, and power tools 800 in use. In this embodiment, three battery packs 300 are stored and being charged in the carrier 200 by an AC power supply 810. In the meantime, two battery packs 300 are being used to power a first cordless power tool 812 having a first rated voltage (e.g., a 60V or 120V blower) and one battery pack 300 is being used to power a second cordless power tool 814 having a second rated voltage (e.g., a 20V or 40V string trimmer).

Figure 35:
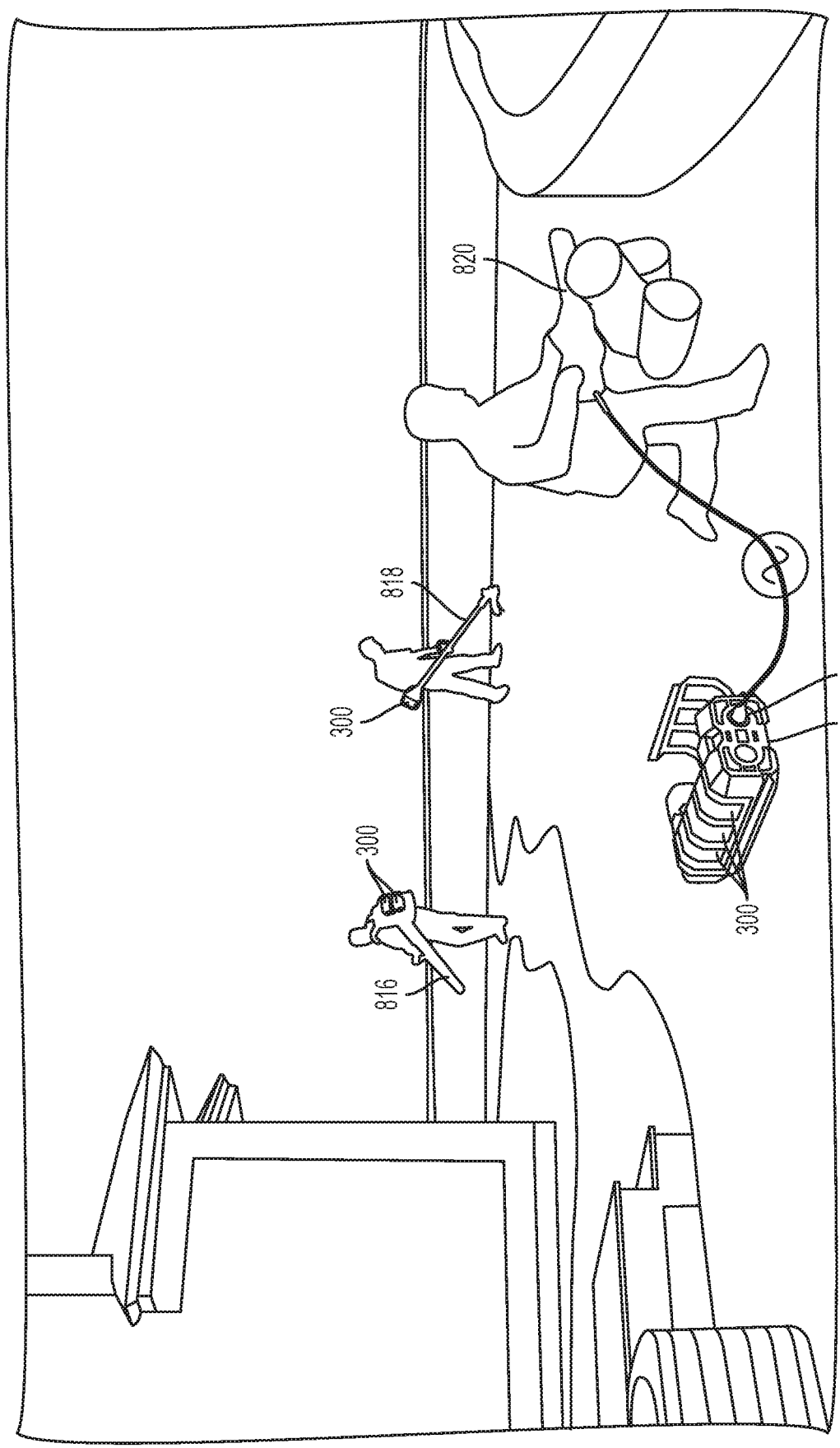
FIG. 35 is another exemplary illustration of a relationship between a carrier, battery packs and power tools.

Referring to FIG. 35, in another embodiment, one battery pack 300 is being used to power a first cordless power tool 816 having a first rated voltage (e.g., a 20V or 40V string trimmer), and two battery packs 300 are being used to power a second cordless power tool 816 having a second rated voltage (e.g., a 60V or 120V blower). Meanwhile, three battery packs stored in the carrier 200 are being used to power an AC-only corded power tool 820 (e.g., an AC chain saw) via a cord connected to the AC power output connector 218 of the carrier.

Figure 36:
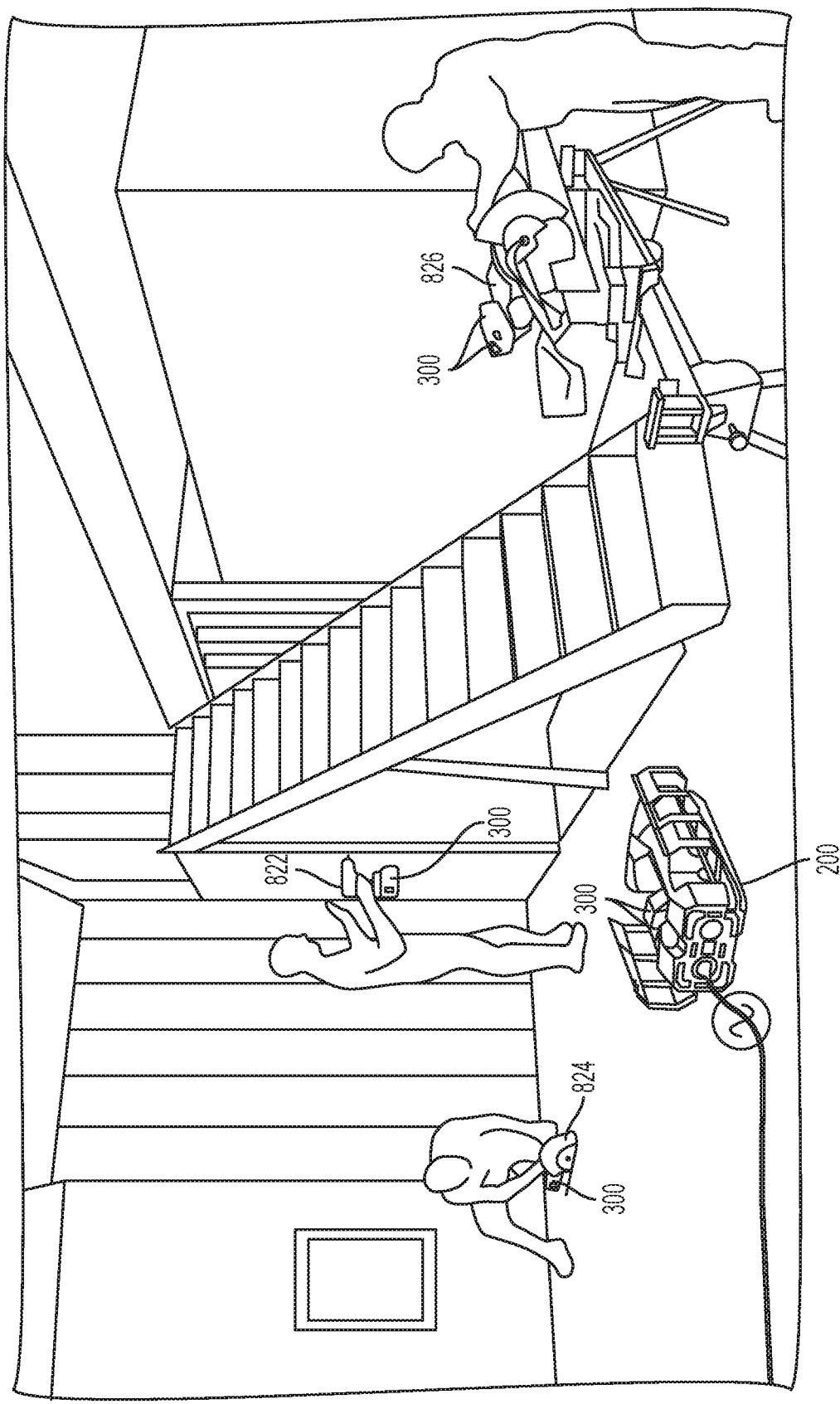
FIG. 36 is another exemplary illustration of a relationship between a carrier, battery packs and power tools.

Referring to FIG. 36, in another embodiment, one convertible battery pack 300 is being used to power a first cordless power tool 822 having a low rated voltage (e.g., a 20V circular saw), one convertible battery pack 300 is being used to power a second cordless power tool 824 having a medium rated voltage (e.g., a 60V circular saw), and two convertible battery packs 300 are being used to power a third cordless or AC/DC power tool 826 having a high rated voltage (e.g., a 120V miter saw). Meanwhile, two battery packs 300 are stored and being charged in the carrier 200 by an AC power supply.

Figure 37:
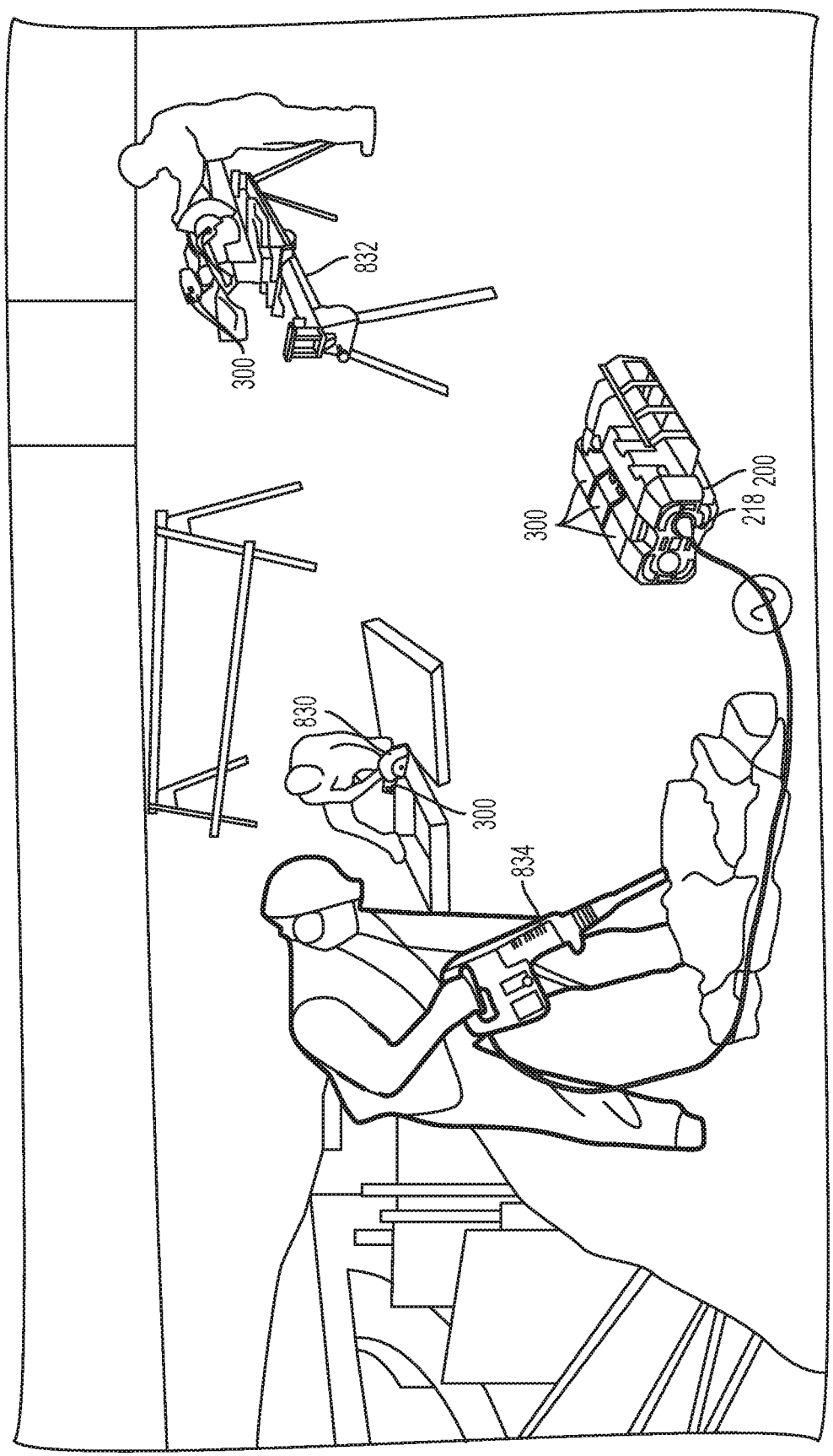
FIG. 37 is another exemplary illustration of a relationship between a carrier, battery packs and power tools.

Referring to FIG. 37, in another embodiment, one battery pack 300 is being used to power a first cordless power tool 830 having a first rated voltage (e.g., a 60V circular saw), and one battery pack 300 is being used to power a second cordless or AC/DC power tool 832 having a second rated voltage (e.g., a 120V miter saw). Meanwhile, three battery packs stored in the carrier 200 are being used to power an AC-only corded power tool 834 (e.g., an AC hammer) via a cord connected to the AC power output connector 218 of the carrier 200.

Figure 38:
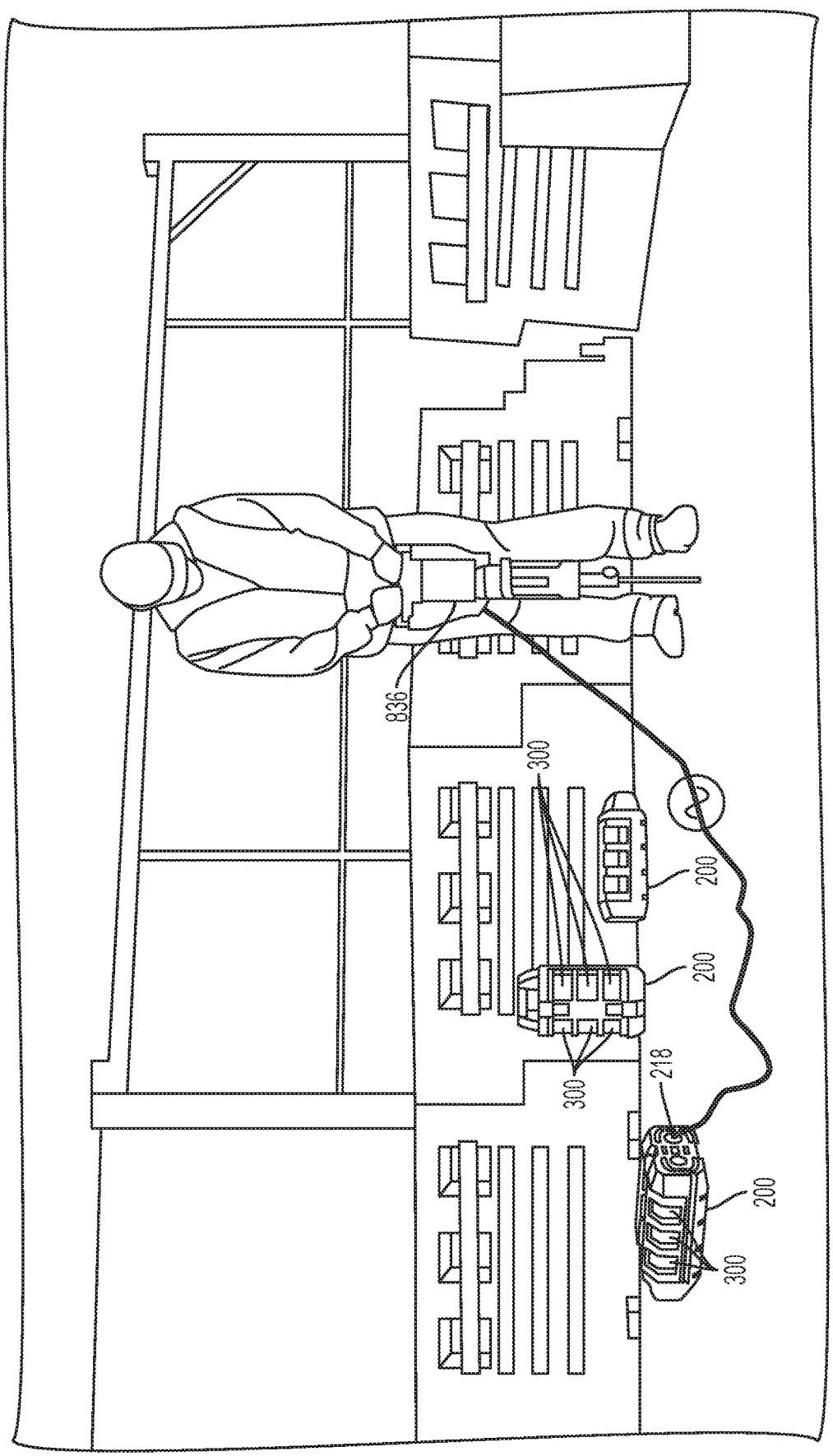
FIG. 38 is another exemplary illustration of a relationship between a carrier, battery packs and power tools.

Referring to FIG. 38, in another embodiment, a plurality of battery packs 300 in a carrier 200 are being used to power a high powered AC tool 836 (e.g., a 120V or 180V jackhammer) via a cord connected to the AC power output connector 218 of the carrier 200. In the meantime, other carriers 200 containing additional battery packs 300 await use. This enables a user to power the high powered AC tool for an entire work day.

Figure 39:
FIG. 39 is another exemplary illustration of a relationship between a carrier, battery packs and power tools.

Referring to FIG. 39, in another embodiment, the carrier 200 disables at the end of a predetermined rental period (e.g., three days). An indicator LED 280 on the carrier flashes to notify the user to return the carrier 200 to the kiosk. In addition, an alert is transmitted wirelessly to an app on the user's cell phone or tablet computer 840. Via the cell phone or tablet computer 840, the user may renew the rental period for an additional amount of time (e.g., one more day).

Figure 40:
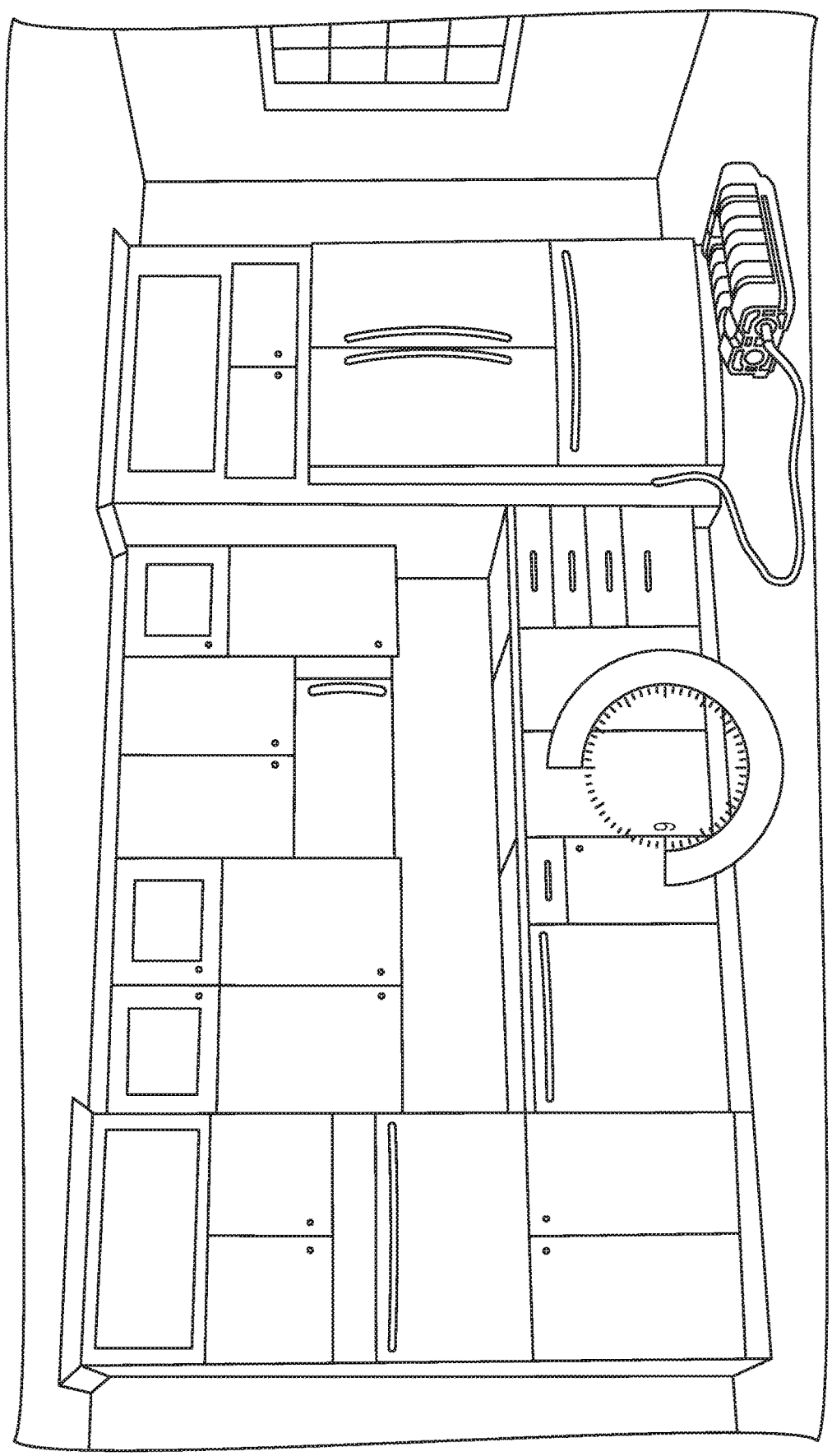
FIG. 40 is an exemplary illustration of a rental return warning system of a carrier.

Referring to FIG. 40, in another embodiment, the carrier 200 containing a plurality of battery packs 300 may be used to power an AC electrical device or appliance 842 (e.g., a refrigerator) via a cord connected to the AC power output connector 218.

Figure 41:
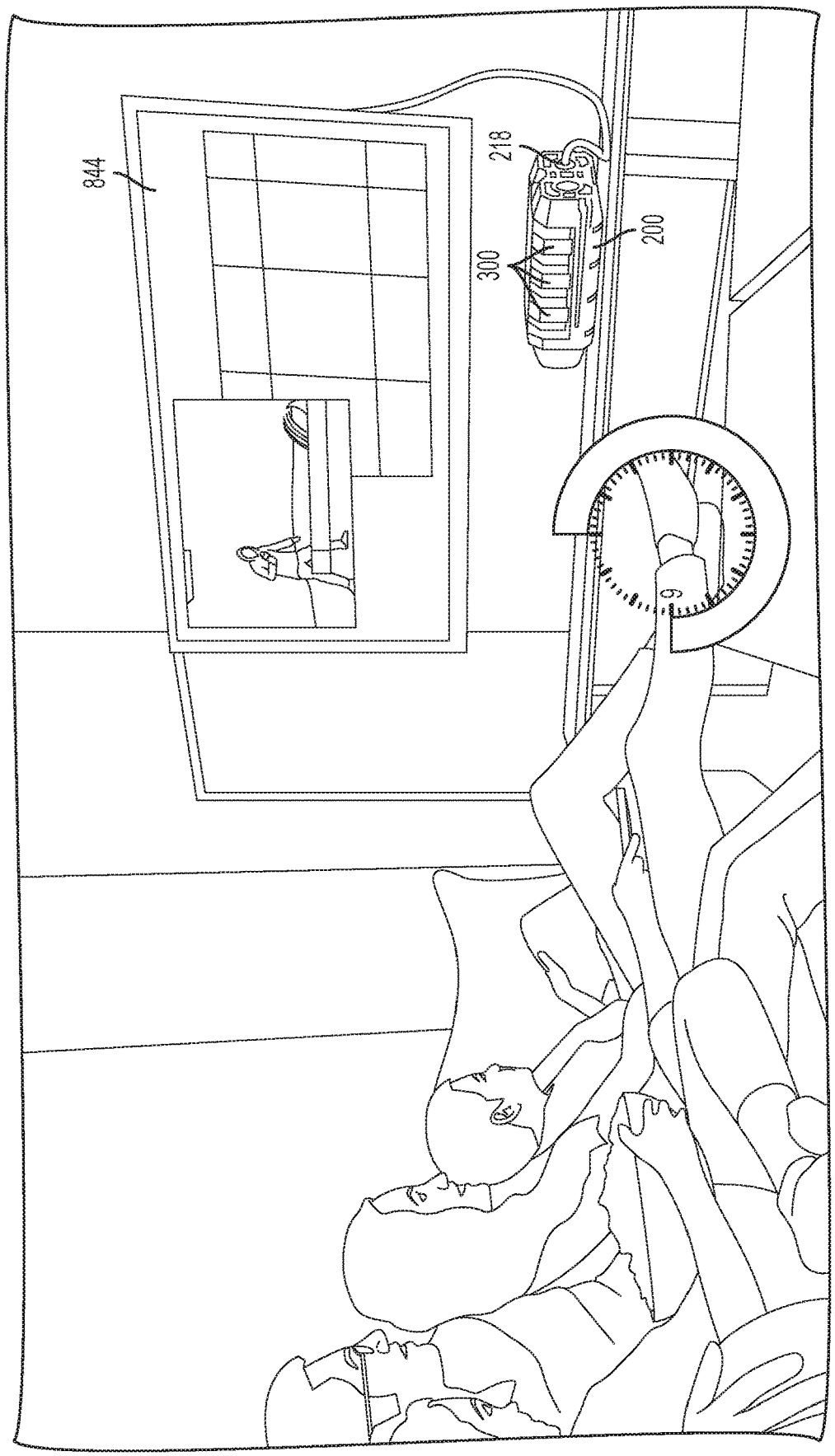
FIG. 41 is an exemplary illustration of a relationship between a carrier, battery packs and other electrical devices.

Referring to FIG. 41, in another embodiment, the carrier 200 containing a plurality of battery packs 300 may be used to power an AC electrical device or appliance 844 (e.g., a television) via a cord connected to the AC power output connector 218.

Figure 42:
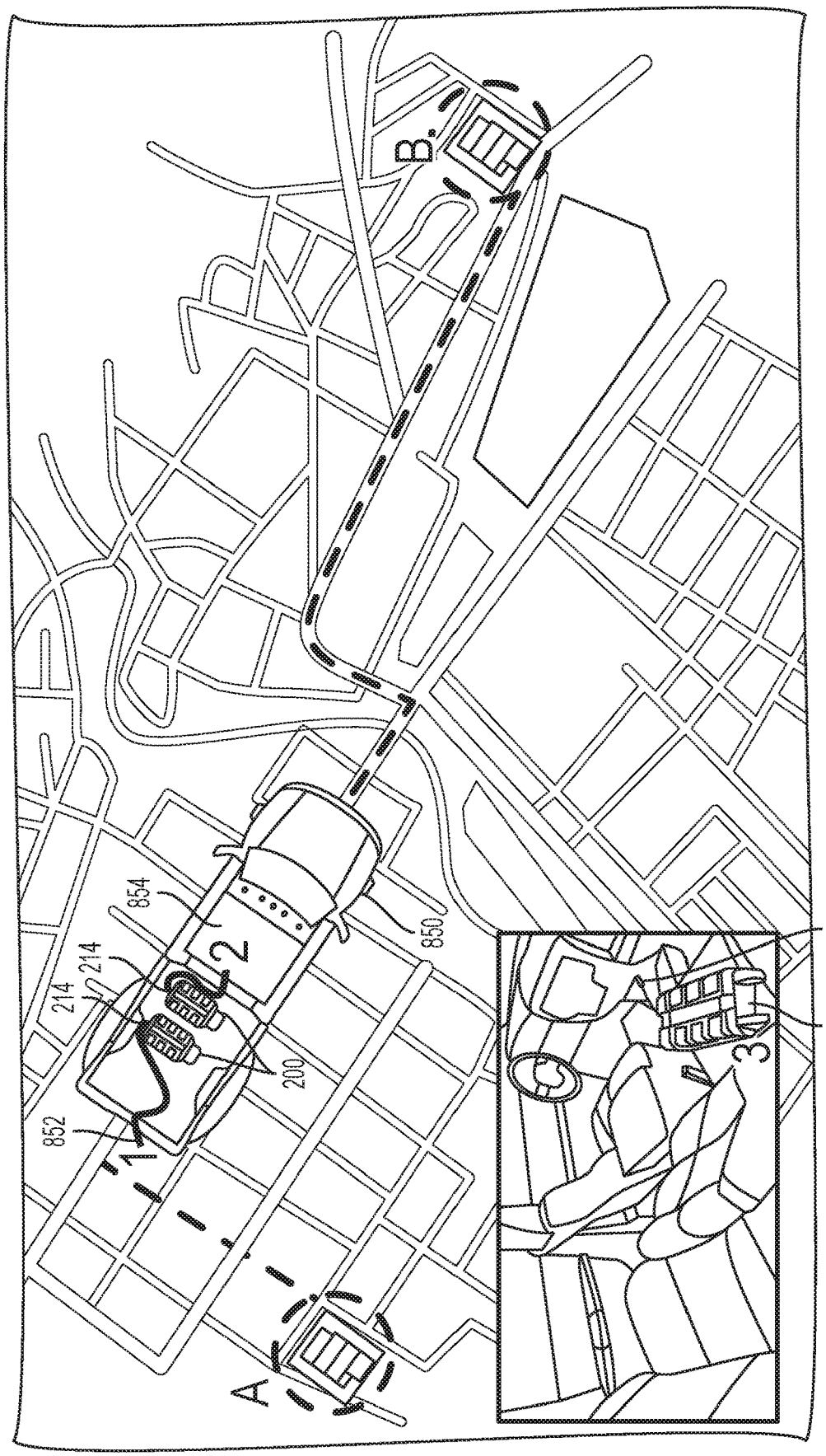
FIG. 42 is an exemplary illustration of various methods for charging battery packs in a carrier.

FIG. 42 schematically illustrates the various ways for a user to charge the battery packs 300 in a carrier 200 while transporting it in a vehicle 850 from a first rental kiosk location A to a second rental kiosk location B. First, the carrier 200 may be used to charge the battery packs 300 by connecting a cord from a trailer adapter port 852 to the universal DC power input connector 214. Second, the carrier 200 may be used to charge the battery packs 300 by connecting a cord from a solar cell array 854 to the universal DC power input connector 214. Third, the carrier 200 may be used to charge the battery packs 300 by connecting a cord from a 12V car charger port 856 to the universal DC power input connector 214.

Numerous modifications may be made to the exemplary implementations described above. These and other implementations are within the scope of the following claims.

What is claimed is:

1. A carrier comprising:
   a housing, the carrier housing including:
   a cover,
   a plurality of receptacles, each receptacle configured to receive one rechargeable, removable battery pack, each receptacle including a terminal block for electrically coupling the battery pack to a plurality of electrical and electronic components for monitoring, managing and/or controlling the charging and discharging of the battery packs, the components including a system management unit (SMU), the SMU including a processor and a charge/discharge control module,
   an AC power input connector for connecting to an AC power supply,
   a power output connector;
   a discharge/charge mode switch for switching between (1) a charging mode of operation that charges the battery packs using electrical power input through at least one of the power input connectors, and (2) a discharging mode of operation that outputs electrical power from the battery packs through the power output connector;
   each battery pack including a terminal block, the charge/discharge control module electrically connected to the battery packs via the receptacle terminal block and the battery pack terminal block, the charge/discharge control module controlling a plurality of charging switches to provide a charging current to the battery packs through carrier power supply lines, the receptacle terminal block and the battery pack terminal block;
   the SMU also communicates with a first power supply coupled to the AC power input connector, the first power supply, configured to provide a charging voltage equal to a rated charging voltage of the battery packs;
   an inverter electrically connected to the power output connector for providing an AC output signal at the power output connector;
   the SMU electrically connected to the discharge/charge mode switch, wherein (1) when the discharge/charge mode switch is in a charge position, a charge signal is sent to the SMU and the SMU sends a signal to the inverter to turn the inverter off, sends a signal to the first power supply to turn the first power supply on, and selectively sends a signal to the charging switches to close the charging switches to selectively connect the battery packs to the first power supply to charge the battery packs and (2) when the discharge/charge mode switch is in the discharge position, a discharge signal is sent to the SMU and the SMU sends a signal to the inverter to turn the inverter on, sends a signal to the first power supply to turn the first power supply off, and selectively sends a signal to the charging switches to selectively open the charging switches to disconnect the battery packs from the first power supply.

2. The carrier, as recited in claim 1, wherein the cover includes latching system configured to operate with a corresponding latching system on the carrier housing to fix the cover to the housing and to allow a user to open and close the cover.

3. The carrier, as recited in claim 1, wherein the power output connector is an AC power output connector.

4. The carrier, as recited in claim 1, wherein the power output connector is a DC power output connector.

5. The carrier, as recited in claim 1, wherein the discharge/charge mode switch is an automatic internal switch and further comprising a current sensor for the AC power input and the DC power input such that the internal switch switches to the charging mode when the current sensor senses an input current and switches to the discharge mode when the current sensor does not sense an input current.

6. The carrier, as recited in claim 1, wherein first power supply is a 120 VAC to 60 VDC power supply and the second power supply is a 12 VDC to 60 VDC power supply to supply power to the battery packs.

7. The carrier, as recited in claim 1, wherein when all of the battery packs are 60 V battery packs then the first and second power supplies are configured to provide a 60 VDC output.

8. The carrier, as recited in claim 1, wherein when all of the battery packs are 20 V battery packs, then the first and second power supplies will be configured to provide a 20 VDC output.

9. The carrier, as recited in claim 1, wherein the inverter is one of a pure sine wave inverter, a modified sign wave inverter, a pulse wave inverter or any other inverter capable of providing an AC output signal or an approximated AC output signal for providing power to AC electrical and electronic devices.

10. The carrier, as recited in claim 1, further comprising a plurality of cover switches coupling the plurality of carrier receptacles, wherein the plurality of cover switches are in an open state when the cover is open to provide an open circuit between carrier receptacle terminal.

11. The carrier, as recited in claim 10, wherein the battery pack may also be coupled to and discharged into an electrical device independent of the carrier by connecting the battery pack directly to the electrical device via the battery terminal block.

12. The carrier, as recited in claim 1, wherein a 60 volt battery pack is received in three of the receptacles and the carrier provides a 120V RMS AC, 15 A output waveform through the inverter 266.

13. The carrier, as recited in claim 1, further comprising a bypass switch that bypasses the internal power supply and the inverter to provide AC power directly from the AC input connector to the AC output connector.

* * * * *